(12) United States Patent
Utsumi et al.

(10) Patent No.: US 7,650,112 B2
(45) Date of Patent: Jan. 19, 2010

(54) METHOD AND SYSTEM FOR EXTENDING COVERAGE OF WLAN ACCESS POINTS VIA OPTICALLY MULTIPLEXED CONNECTION OF ACCESS POINTS TO SUB-STATIONS

(75) Inventors: Kuniaki Utsumi, Sanda (JP); Hiroaki Yamamoto, Osaka (JP); Kouichi Masuda, Hirakata (JP); Tsutomu Niiho, Katano (JP); Mariko Nakaso, Suita (JP); Hiroyuki Sasai, Katano (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 10/530,651

(22) PCT Filed: Oct. 17, 2003

(86) PCT No.: PCT/JP03/13285

§ 371 (c)(1),
(2), (4) Date: Apr. 7, 2005

(87) PCT Pub. No.: WO2004/036832

PCT Pub. Date: Apr. 29, 2004

(65) Prior Publication Data

US 2006/0045054 A1   Mar. 2, 2006

(30) Foreign Application Priority Data

Oct. 17, 2002  (JP) ............. 2002-303463
Jan. 30, 2003  (JP) ............. 2003-022701
Apr. 25, 2003  (JP) ............. 2003-122716
Sep. 4, 2003   (JP) ............. 2003-313063

(51) Int. Cl.
*H04B 7/15* (2006.01)

(52) U.S. Cl. .............. 455/11.1; 455/7; 455/12.1; 455/13.1; 455/13.3; 455/442; 370/338; 370/352; 370/465; 379/56.2

(58) Field of Classification Search ............. 455/7, 455/11.1, 12.1, 13.1, 13.3, 442.1, 561; 370/338, 370/352, 465; 379/56.2; 398/42, 115
See application file for complete search history.

(56) References Cited

U.S. PATENT DOCUMENTS 5,559,866 A * 9/1996 O'Neill ............... 455/447
5,880,863 A   3/1999 Rideout et al.
6,801,767 B1* 10/2004 Schwartz et al. ...... 455/426.2
6,807,374 B1* 10/2004 Imajo et al. ........... 398/115

(Continued)

FOREIGN PATENT DOCUMENTS

| CN | 1372773 | 10/2002 |
|---|---|---|
| EP | 1 227 605 A2 | 7/2002 |
| JP | 2000-324044 | 11/2000 |
| JP | 2002-094597 | 3/2002 |

OTHER PUBLICATIONS

European Search Report issued Feb. 27, 2009 in European Application No. 03 75 4167.

*Primary Examiner*—Sanh D Phu
(74) *Attorney, Agent, or Firm*—Wenderoth, Lind & Ponack, L.L.P.

(57) ABSTRACT

A SW (70) receives an Ethernet® signal from an outside of areas E and F. The SW (70) selects and outputs the obtained Ethernet® signal to any one of APs (91a to 91e) in accordance with a network structure managed by the SW (70). The AP (91a to 91e) converts the Ethernet® signal to an electrical signal type wireless LAN signal, which is in turn output to a main station (10). The main station (10) frequency-multiplexes the signal output from each of the APs (91a to 91e), and converts the signal to an optical signal, which is in turn output to sub-stations (20a and 20b). The sub-station (20a and 20b) transmits the signal transmitted from the main station (10) to a terminal in the form of a wireless radio wave. Thereby, when a plurality of communication areas are present, the accommodation capacity of an AP can be effectively utilized in each communication area.

20 Claims, 44 Drawing Sheets

U.S. PATENT DOCUMENTS

| | | | |
|---|---|---|---|
| 7,177,294 B2* | 2/2007 | Chen et al. | 370/338 |
| 7,209,739 B1* | 4/2007 | Narayanabhatla | 455/426.2 |
| 7,366,150 B2* | 4/2008 | Lee et al. | 370/338 |
| 7,421,203 B2* | 9/2008 | Kim et al. | 398/59 |
| 2002/0003645 A1* | 1/2002 | Kim et al. | 359/145 |
| 2002/0094842 A1* | 7/2002 | Aburakawa et al. | 455/561 |
| 2003/0007214 A1* | 1/2003 | Aburakawa et al. | 359/145 |
| 2003/0202486 A1* | 10/2003 | Anton et al. | 370/329 |
| 2004/0001719 A1* | 1/2004 | Sasaki | 398/115 |
| 2004/0203339 A1* | 10/2004 | Bauman | 455/7 |
| 2005/0157215 A1* | 7/2005 | Minnick et al. | 348/725 |
| 2005/0266854 A1* | 12/2005 | Niiho et al. | 455/445 |

* cited by examiner

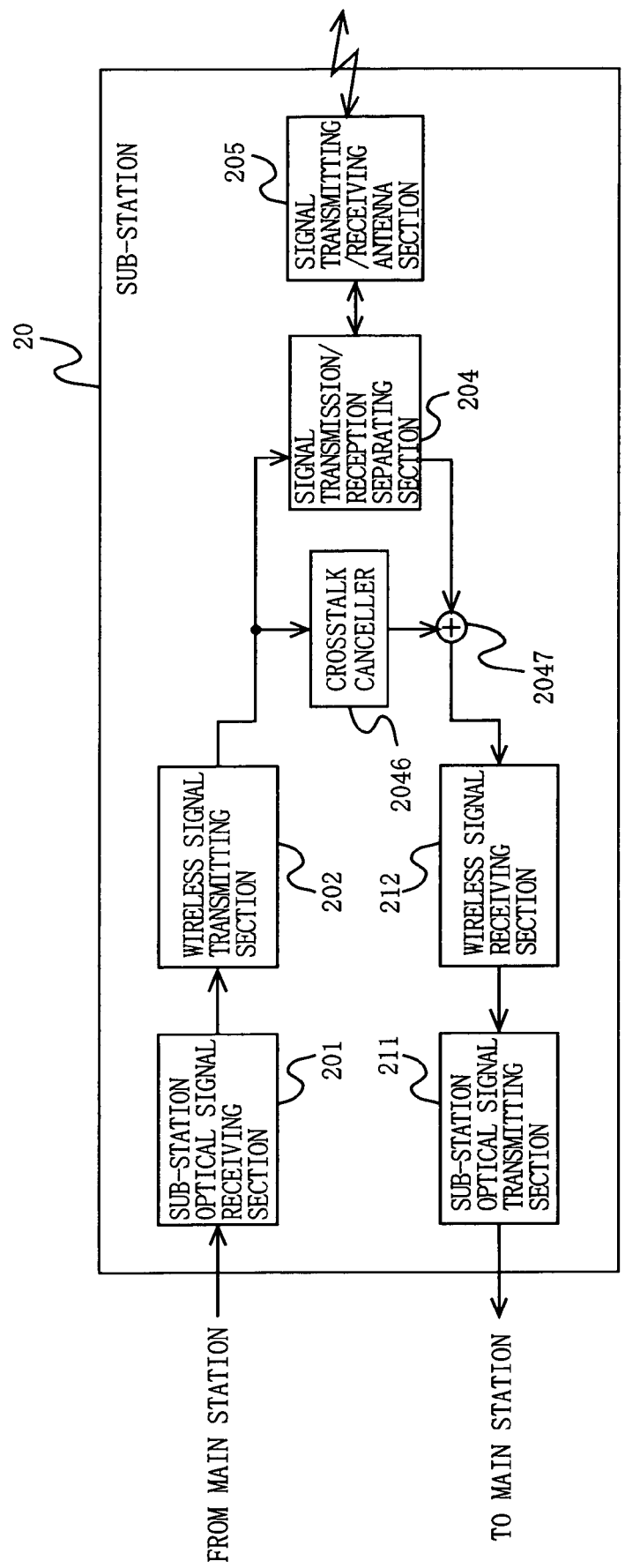
F I G. 6 (a)

F I G. 7
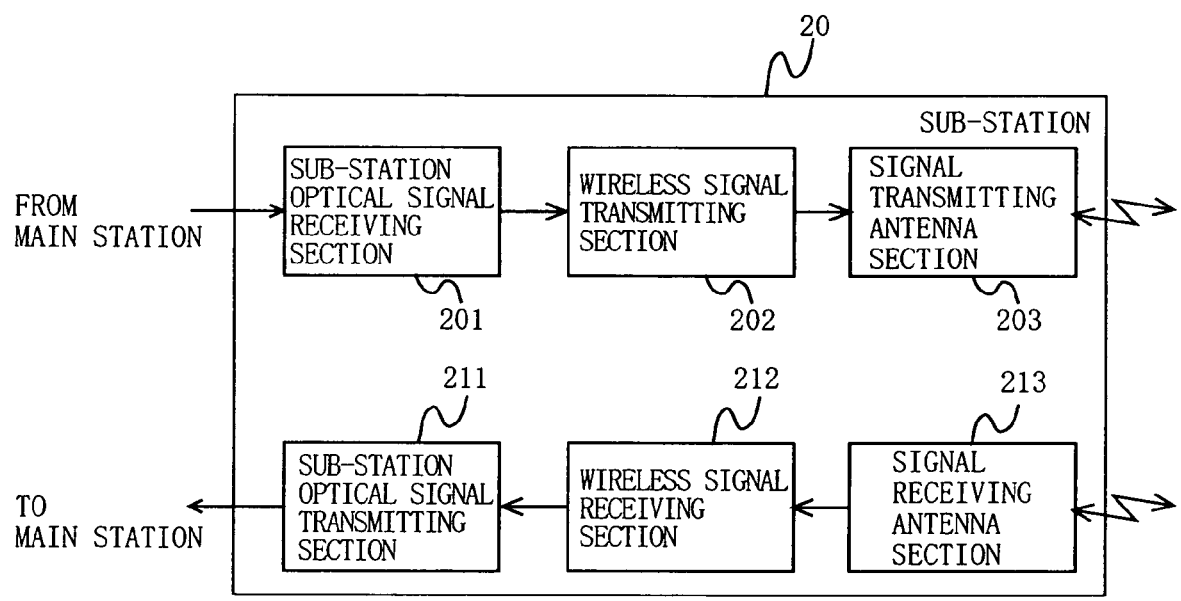

F I G. 8
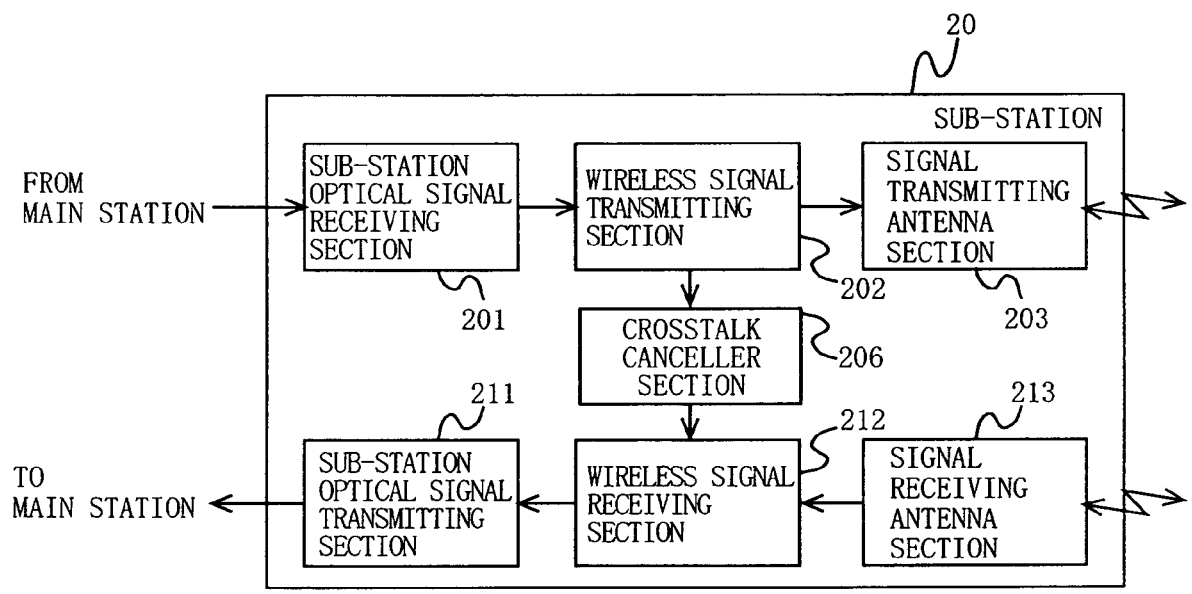

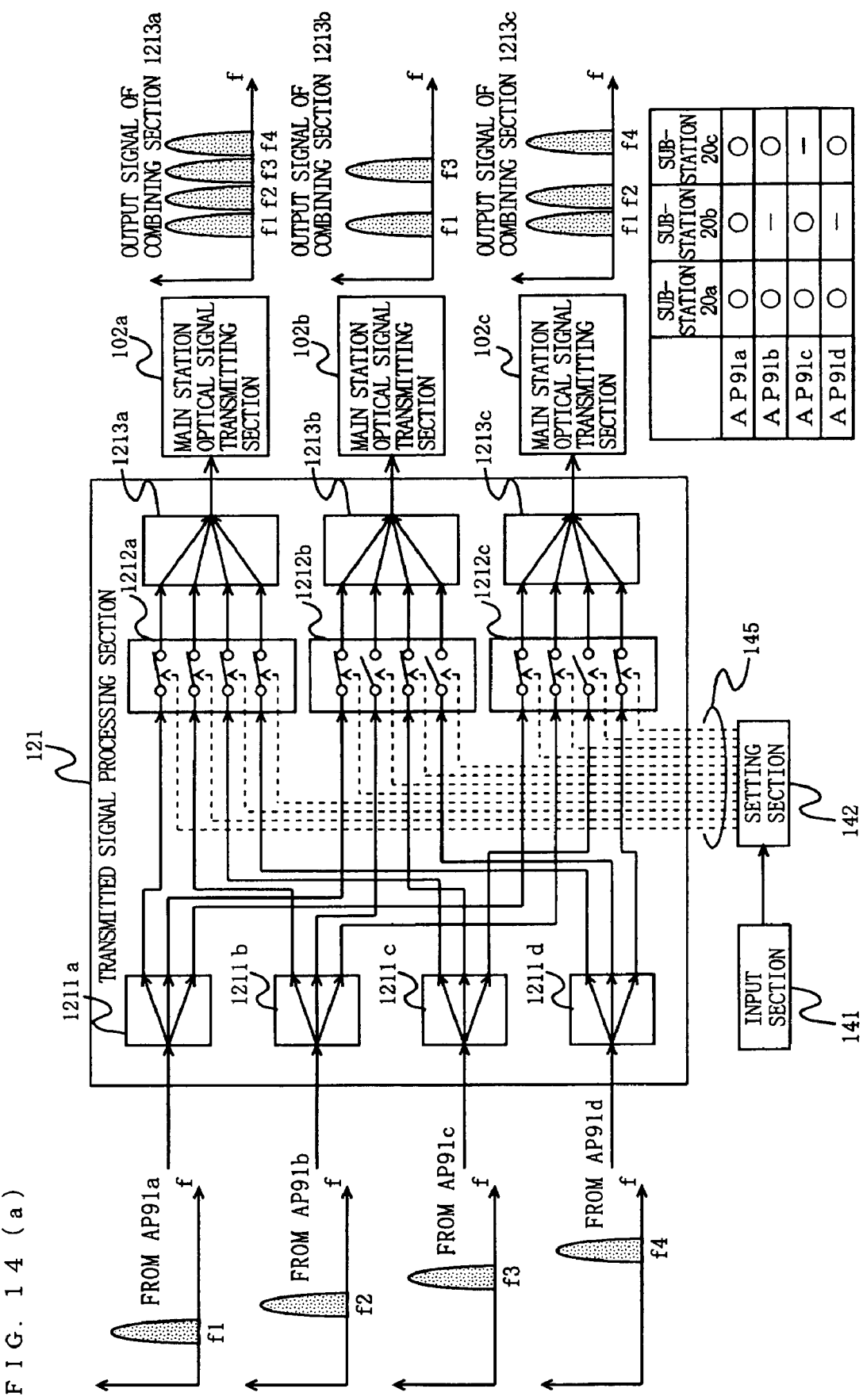

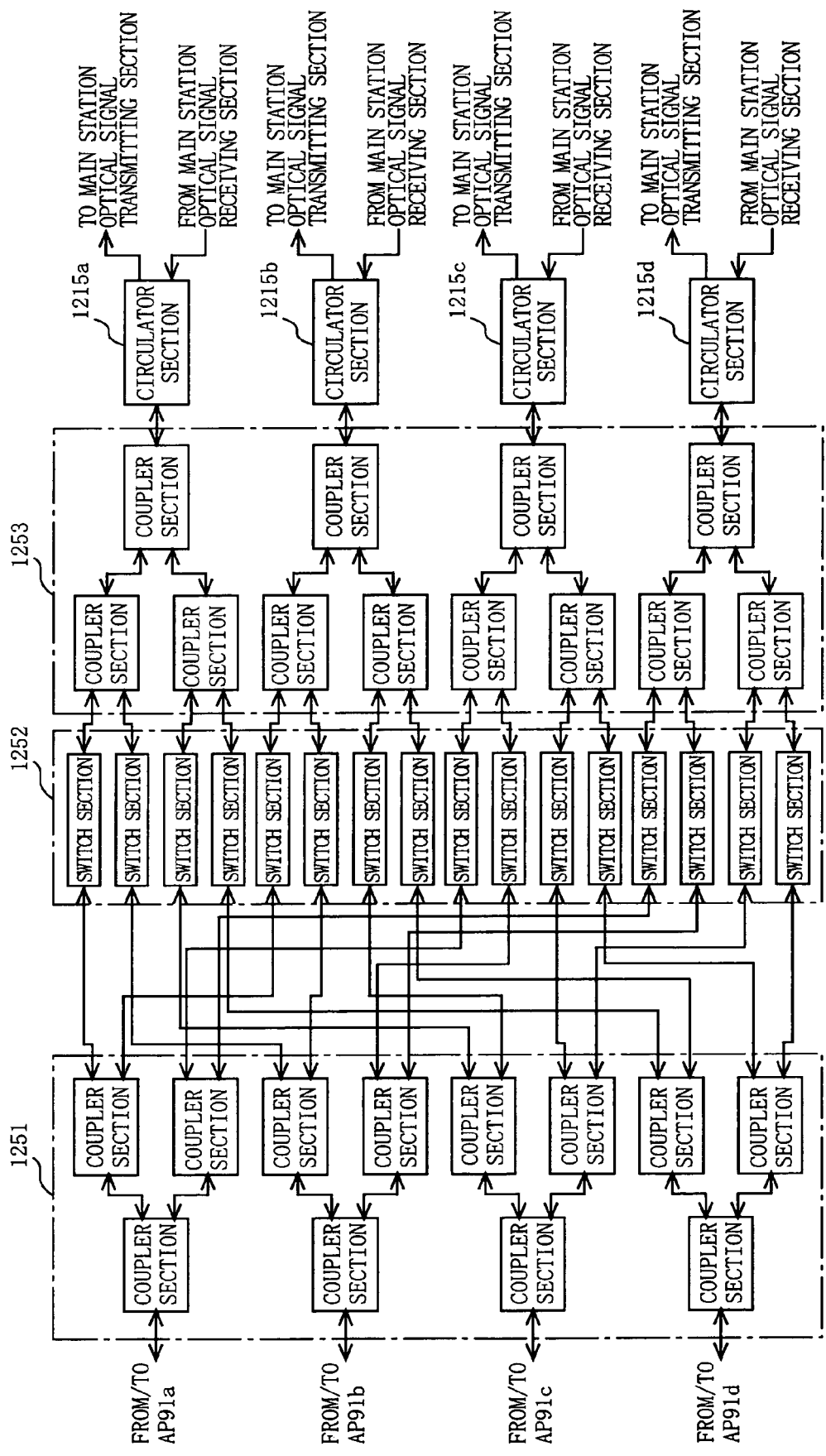

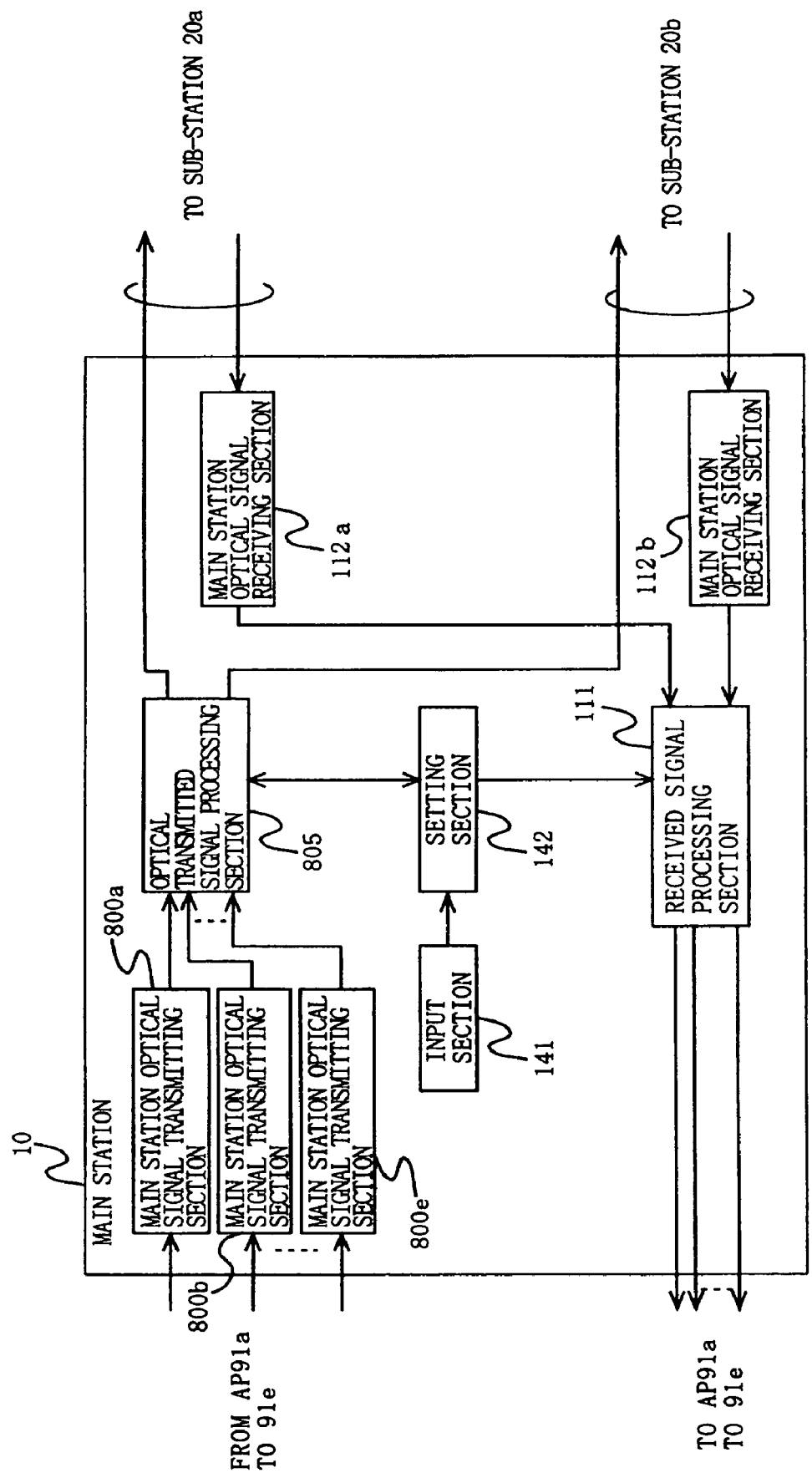

FIG. 21
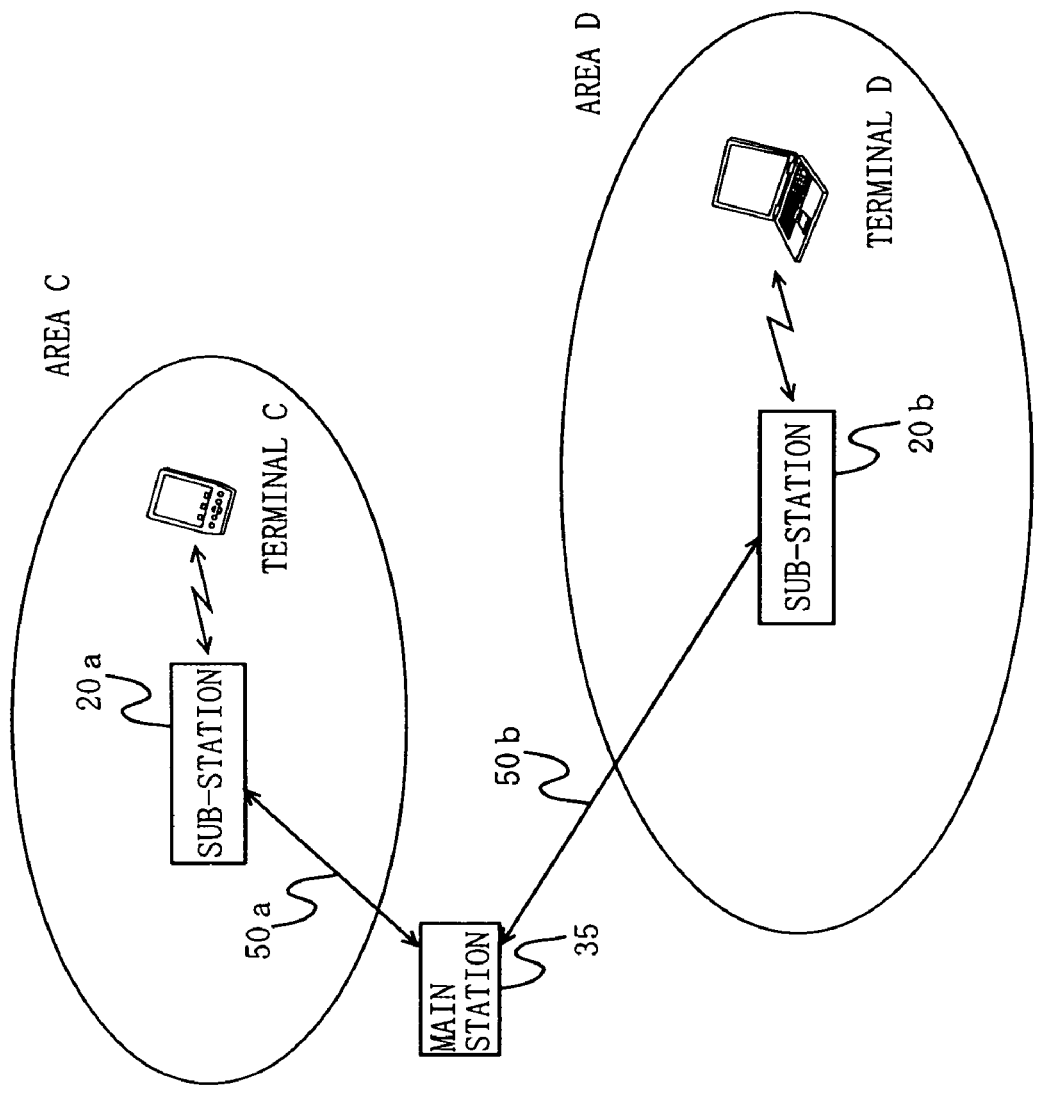
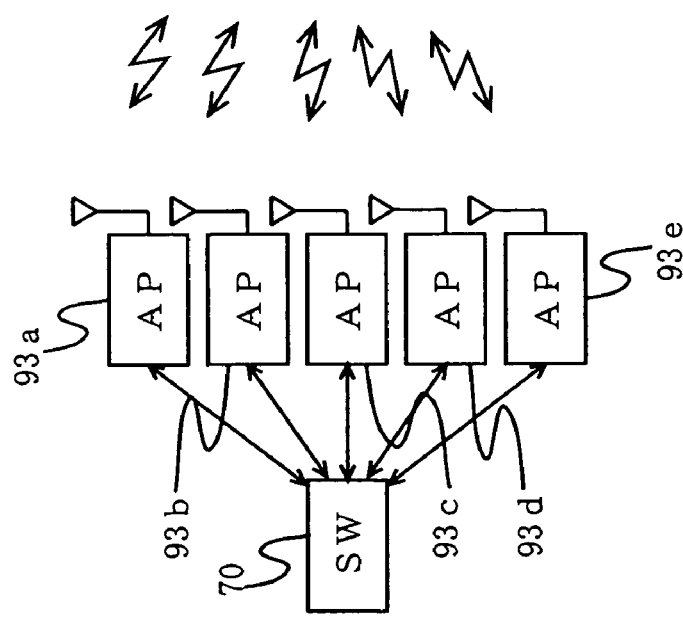

FIG. 27

| | SUB-STATION 20a | SUB-STATION 20b |
|---|---|---|
| AP93a (f₁) | ○ | ○ |
| AP93b (f₂) | ○ | — |
| AP93c (f₃) | — | ○ |
| AP93d (f₄) | ○ | — |
| AP93e (f₅) | ○ | — |

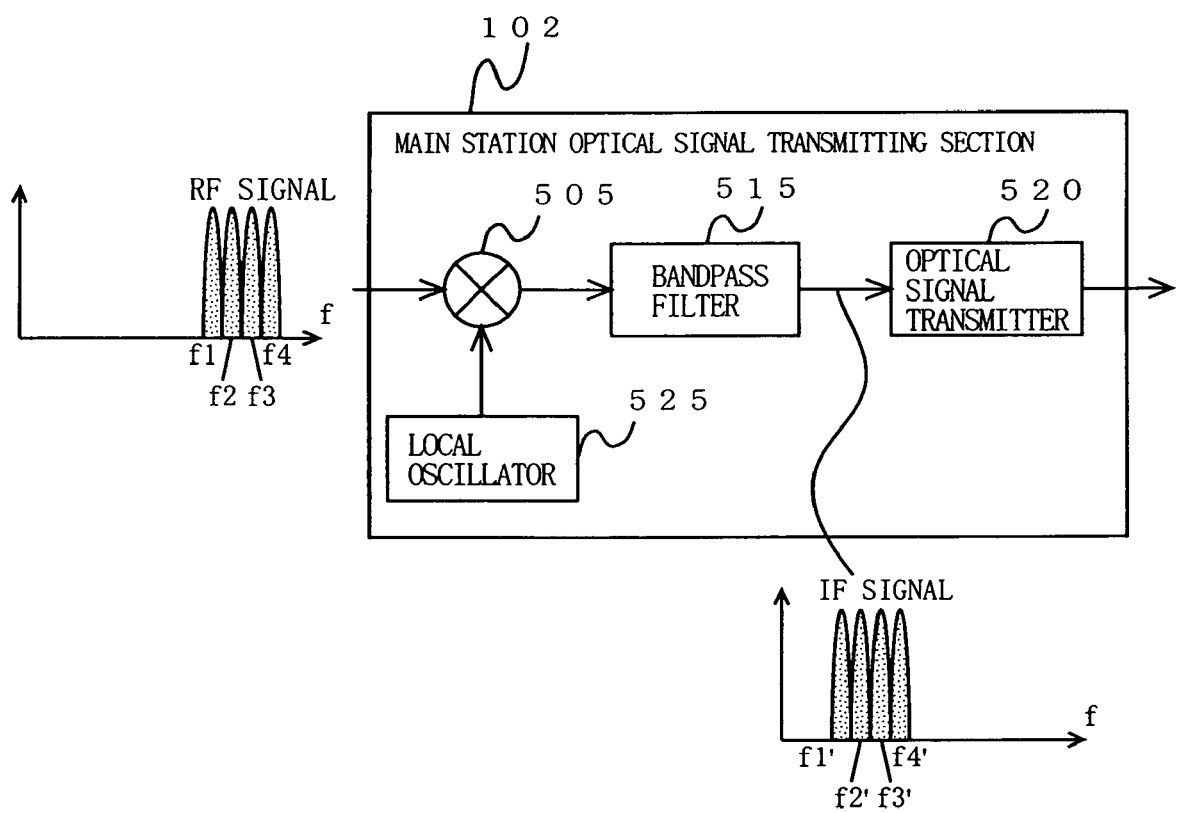

F I G. 3 5
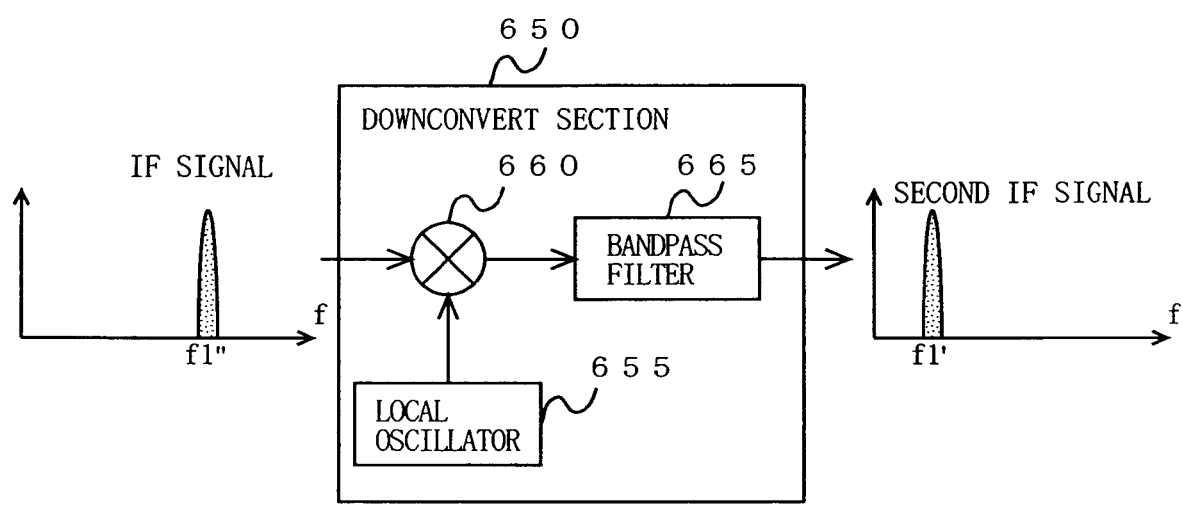

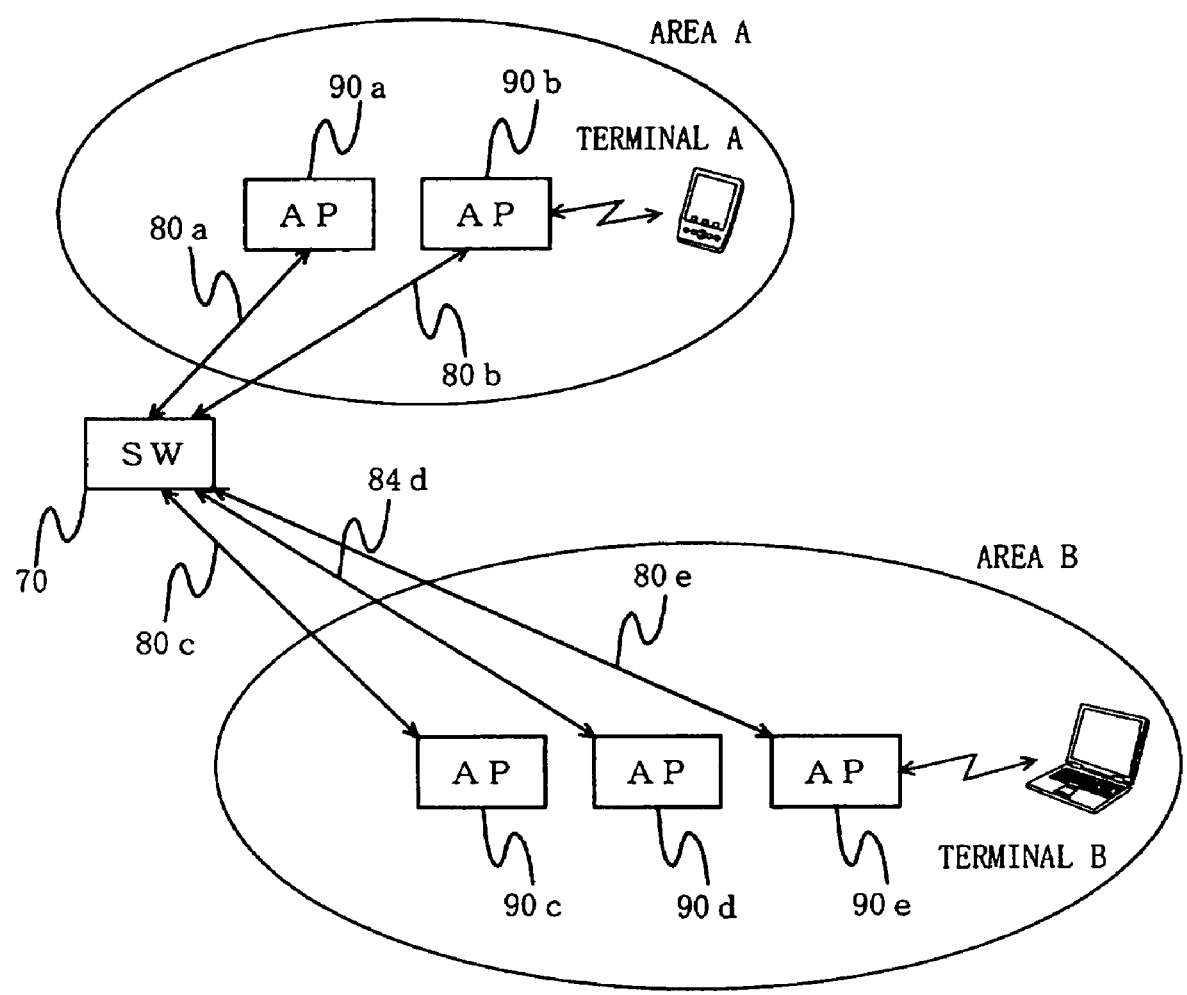
FIG. 39-PRIOR ART

METHOD AND SYSTEM FOR EXTENDING COVERAGE OF WLAN ACCESS POINTS VIA OPTICALLY MULTIPLEXED CONNECTION OF ACCESS POINTS TO SUB-STATIONS

TECHNICAL FIELD

The present invention relates to a wireless communication system. More particularly, the present invention relates to a system which enables a wireless communication terminal present in a local area to communicate with a network outside the local area.

BACKGROUND ART

A conventional, general wireless LAN system is disclosed in "Nikkei Communications", issued on Sep. 2, 2002, Nikkei Business Publications, Inc. (p. 89, FIGS. 1-2).

FIG. 39 is a block diagram showing an exemplary configuration of the conventional wireless LAN system. The wireless LAN system has two communication areas A and B, an SW 70, electric cables 80a to 80e, access points (hereinafter referred to as APs) 90a to 90e, and terminals A and B. Also, the wireless LAN system is connected to the SW 70 to an external network (not shown).

The SW 70 switches an Ethernet® signal, which is input from an external network to the wireless LAN system, to each of the APs 90a to 90e. The electric cables 80a to 80e, which are, for example, Ethernet® twisted-pair cables, connect the SW 70 to the APs 90a to 90e. The APs 90a to 90e communicate with the terminal A or B using a wireless LAN signal. The terminals A and B are personal computers or PDAs (Personal Digital Assistants) which have a wireless LAN interface.

The area A is an area in which the APs 90a and 90b provide services. The area B is an area in which the APs 90c, 90d and 90e provide services. Note that no wireless LAN signal reaches from one of the areas A and B to the other.

Hereinafter, an operation of the wireless LAN system will be described.

Firstly, communication between the terminal A in the area A and the terminal B in the area B will be described. Here, it is assumed that the terminal A is connected to the AP 90b while the terminal B is connected to the AP 90e.

The terminal A transmits a wireless LAN signal, which is in the form of a wireless radio wave, to the AP 90b. In response to this, the AP 90b receives the radio wave type wireless LAN signal. Next, the AP 90b converts the received wireless LAN signal to an Ethernet® signal, and transmits the resultant signal through the electric cable 80b to the SW 70.

The SW 70 memorizes the network structures of the areas A and B. The SW 70 transmits the received Ethernet® signal through the electric cable 80e to the AP 90e with reference to the memorized network structure. The AP 90e converts the Ethernet® signal transmitted from the SW 70 to a radio wave type wireless LAN signal, which is in turn transmitted to the terminal B. In this manner, the radio wave type wireless LAN signal transmitted by the terminal A reaches the terminal B. Note that a wireless LAN signal is transmitted from the terminal B to the terminal A in a manner reverse to that described above.

Next, communication of the terminal A with an external network will be described. The terminal A transmits a radio wave type wireless LAN signal to the AP 90b. In response to this, the AP 90b receives the wireless LAN signal. Next, the AP 90b converts the received radio wave type wireless LAN signal to an Ethernet® signal, which is in turn output to the SW 70. The SW 70 outputs the Ethernet® signal obtained from the AP 90b to the external network. Note that a signal input from an external network is transferred in a reverse direction to the terminal A.

Here, the area A has two APs, while the area B has three APs. If it is assumed that a single AP can accommodate ten terminals, twenty terminals can perform the above-described communication simultaneously in the area A and thirty terminals can perform the above-described communication simultaneously in the area B. Note that when an AP accommodates a plurality of terminals, the AP transmits/receives a signal from each terminal in a time division multiplex manner.

Note that, as used herein, accommodation capacity refers to the number of terminals on a system design. In other words, even if the number of terminals connected to an AP exceeds the accommodation capacity, it does not mean that the terminals can no longer perform communication, and the amount of a signal which can be transmitted to each terminal per unit time is only reduced.

DISCLOSURE OF THE INVENTION

As described above, in conventional configurations, the terminal accommodation capacity of the area A is twenty, while the terminal accommodation capacity of the area B is thirty. Therefore, when the area A has twenty terminals and the area B has thirty terminals, the communication efficiency in the area is highest.

However, in the case of wireless LAN services in, for example, a public place, unlike offices, the number of terminals in each area always varies. Therefore, the number of terminals present in each of the areas A and B is rarely equal to its accommodation capacity. It is likely that a larger number of terminals than the accommodation capacity are concentrated in one area while a much smaller number of terminals than the accommodation capacity are present in the other area. More specifically, for example, the area A has forty terminals while the area B has only ten terminals. In this case, although a total of five APs are present and therefore the total accommodation capacity is fifty, communication quality is extremely lowered in the area A. Thus, in conventional configurations, the efficiency of use of an AP may be reduced.

Also, in conventional wireless LAN systems, a connection between a terminal and an AP is fixed. Therefore, when a terminal is moved from the area A to the area B, the user of the terminal has to newly establish a connection to an AP every time the terminal is moved from one area to another, unless a roaming function is provided between the APs.

Further, in a wireless LAN system for use in a public place, an AP is often placed at a higher position, such as a ceiling or the like. Therefore, it is cumbersome to install and maintain an AP in conventional wireless LAN systems.

Furthermore, in conventional wireless LAN systems, the areas A and B are connected to the network switch via electric cables. Therefore, when the areas A and B are at a distance of several hundreds of meters from the network switch, the network switch cannot transmit a signal to each area.

Therefore, an object of the present invention is to provide a wireless communication system, in which, when a plurality of communication areas are present, the accommodation capacity of APs in each communication area can be effectively utilized.

Another object of the present invention is to provide a wireless communication system, in which, even when a terminal is moved and therefore an AP connected thereto is changed, the user does not have to establish a connection between the terminal and the AP.

Another object of the present invention is to provide a wireless communication system, in which it is easy to install and maintain an AP.

Another object of the present invention is to provide a wireless communication system, in which, even when the above-described plurality of areas are at a distance from a network switch, communication can be achieved between the network switch and each area.

A first invention is a system for enabling a wireless communication terminal present in a local area to communication with a network outside the local area, the system comprising: a plurality of sub-stations for forming respective wireless communication areas individually in the local area, and performing wireless communication with the wireless communication terminal in the respective corresponding wireless communication areas; one or more access relay apparatuses for converting a signal to be input from an outside of the local area to an inside of the local area to a signal form for use in the local area, and converting a signal to be output from the inside of the local area to the outside of the local area to a signal form for use in the outside of the local area; and a main station provided between the sub-stations and the access relay apparatuses, wherein the main station comprises: a managing means for managing a communication route from each of the access relay apparatuses to each of the sub-stations in a state such that the communication route can be set; and a selecting means for selecting and outputting a signal which is input from the outside of the local area, whose form is converted in each of the access relay apparatuses, and which is input to the local area, to the corresponding sub-station in accordance with the communication routes managed by the managing means.

A second invention is an invention which is dependent from the first invention, wherein the selecting means further comprises: one or more splitting means corresponding to the respective access relay apparatuses; and a plurality of switching means corresponding to the respective sub-stations, each of the splitting means splits and outputs the signal to be input to the local area whose form has been converted in the access relay apparatus, to all of the switching means, and each of the switching means is switched to determine which of the signals output from the splitting means is output to the corresponding sub-station based on the communication routes managed by the managing means.

A third invention is an invention which is dependent from the second invention, wherein each of the access relay apparatuses converts the signal to be input to the local area to the signal form for use in the local area using frequencies different from one another, the selecting means further comprises a plurality of multiplexing means corresponding to the respective switching means, and each of the multiplexing means frequency-multiplexes a signal output from the corresponding switching means to create a multiplexed signal to be input to the local area and outputs the multiplexed signal to the corresponding sub-station.

In a fourth invention, the splitting means comprises a coupler for splitting a single signal into a plurality of signals, and the multiplexing means comprises a coupler for combining a plurality of signals into a single signal.

A fifth invention is the first invention further comprising a network switch provided between the access relay apparatuses and the network outside the local area, wherein the network switch manages a state of connection between each of the access relay apparatus and the wireless communication terminal present in the local area, specifies the wireless communication terminal present in the local area with reference to a signal input to the network switch, and based on the connection state, outputs the signal input to the network switch to the access relay apparatus connected to the specified wireless communication terminal.

A sixth invention is the fifth invention in which the wireless communication terminal present in the local area transmits a signal to be transmitted to another wireless communication terminal present in the local area, to the sub-station of the communication area to which the wireless communication terminal belongs, the signal to be transmitted to the other wireless communication terminal is input via the sub-station and the main station to the access relay apparatus, is converted to a signal for use in the outside of the local area in the access relay apparatus, and is output to the network switch, and the network switch specifies the other wireless communication terminal present in the local area with reference to the signal whose form has been converted in the access relay apparatus, and based on the connection state, outputs the signal input to the network switch to the access relay apparatus connected to the specified wireless communication terminal.

A seventh invention is the first invention in which each of the sub-stations receives the signal to be output from the inside of the local area to the outside of the local area, the signal being transmitted from the wireless communication terminal, and outputs the signal to the main station, the main station outputs the signal to be output from the inside of the local area to the outside of the local area, the signal being output from the sub-station, to the access relay apparatus, the access relay apparatus converts the signal to be output from the inside of the local area to the outside of the local area, the signal being output from the main station, to the signal form for use in the outside of the local area, and outputs the converted signal to the outside of the local area.

An eighth invention is the seventh invention in which the main station further comprises: a plurality of main station signal receiving means corresponding to the respective sub-stations, for receiving the signal to be output from the inside of the local area to the outside of the local area, the signal being output from each of the sub-station; and a main station combining means for combining the signals to be output from the inside of the local area to the outside of the local area, the signals being received by the plurality of the main station signal receiving means, and outputting the combined signal to the access relay apparatus.

A ninth invention is the seventh invention in which the access relay apparatus further comprises: an intensity detecting means for detecting an intensity of a signal transmitted from the main station; and a request means for requesting the main station to switch one signal to be transmitted to the access relay apparatus to another signal when the intensity of the signal transmitted from the main station, the intensity being detected by the intensity detecting means, is lower than a predetermined value, when the request from the request means is present and the main station receives a signal having the same contents to be transmitted to the access relay apparatus from two or more of the sub-stations, the main station outputs the signal output from one of the two or more sub-stations, the one sub-station being different from the sub-station being outputting the signal to the access relay apparatus, instead of the signal being output to the access relay apparatus.

A tenth invention is the seventh invention in which each of the sub-stations further comprises a crosstalk canceling means for creating a signal having the same intensity as that of crosstalk occurring in the signal to be output from the inside of the local area to the outside of the local area due to an influence of the signal to be input to the local area, based on the signal to be input to the local area, and inverting the signal having the intensity and adding the inverted signal to the crosstalk.

An eleventh invention is the tenth invention in which the crosstalk canceling means comprises: a first coupler section for splitting a portion of the signal to be input to the local area; and a second coupler section for combining the portion of the signal to be input to the local area which has been split by the first coupler section, with the signal to be output from the inside of the local area to the outside of the local area, the first coupler section changes the phase of a signal to be output to the second coupler section by 90° when splitting the signal to be input to the local area, and the second coupler section changes a phase of the signal to be input to the local area which has been output from the first coupler section, by 90°, when combining the two signals.

A twelfth invention is the seventh invention in which, in each of the sub-station, a signal transmitting/receiving system for outputting the signal to be output from the inside of the local area to the outside of the local area, the signal being output from the wireless communication terminal, to the main station, and a signal transmitting/receiving system for transmitting the signal to be input to the local area, the signal being output from the main station, to the wireless communication terminal, are accommodated in respective separate housings.

A thirteenth invention is the first invention in which the main station and each of the sub-stations are connected via an optical transmission line, the main station further comprises an optical signal conversion means for converting the signal selected by the selecting means to an optical signal, each of the sub-stations converts the optical signal output from the main station to an electrical signal in a form for use in the local area, and transmits the electrical signal in the form of a wireless radio wave to the wireless communication terminal in the corresponding wireless communication area.

A fourteenth invention is the thirteenth invention in which the main station further comprises a main station frequency-converting means for converting a frequency of the signal selected by the selecting means to an intermediate frequency, and the optical signal conversion means converts the signal frequency-converted by the main station frequency-converting means to an optical signal.

A fifteenth invention is the fourteenth invention in which the sub-station further comprises a sub-station frequency-converting means for converting a frequency of the converted electrical signal in the form for use in the local area from the intermediate frequency to a frequency which is when the access relay apparatus has output the electrical signal, and the signal frequency-converted by the sub-station frequency-converting means is transmitted in the form of a wireless radio wave to the wireless communication terminal in the corresponding wireless communication area.

A sixteenth invention is the thirteenth invention in which the main station further comprises a main station frequency-converting means for converting a frequency of the signal to be input to the local area, a form of the signal having been converted by each of the access relay apparatuses, to an intermediate frequency, the selecting means selects the signal to be input to the local area whose form has been converted by each of the access relay apparatuses and which has been frequency-converted by the main station frequency-converting means.

A seventeenth invention is the thirteenth invention in which each of the access relay apparatuses outputs the converted signal to be input to the local area as a signal having a first intermediate frequency to the main station, the main station further comprises a main station frequency-converting means for converting a frequency of the signal to be input to the local area, the signal being output from each of the access relay apparatuses, to a second intermediate frequency, and the selecting means selects the signal to be input to the local area whose form has been converted by each of the access relay apparatuses and which has been frequency-converted by the main station frequency-converting means.

An eighteenth invention is the thirteenth invention in which the optical transmission lines connecting the respective sub-stations and the main station have lengths substantially equal to one another.

A nineteenth invention is the first invention in which the main station and each of the sub-stations are connected via an optical transmission line, the main station further comprises an optical signal conversion means for converting the signal to be input to the local area, a form of the signal having been converted by each of the access relay apparatuses, to an optical signal, and the selecting means selects and outputs the optical signal converted by the optical signal conversion means to the sub-station.

A twentieth invention is the first invention in which the main station further comprises a plurality of signal receiving means corresponding to the respective sub-stations, for receiving all signals which are output from the respective access relay apparatuses, the selecting means comprises: a plurality of splitting means corresponding to the respective sub-stations; and a plurality of selecting/outputting means provided between the respective sub-stations and the respective splitting means, the splitting means split all of the signals to be input to the local area which have been output from the respective access relay apparatuses and have been received by the respective signal receiving means, into signals to be input to the local area for the respective access relay apparatuses, each of the selecting/outputting means outputs the signal to be input to the local area which is to be output to the corresponding sub-station, among the signals to be input to the local area which have been split by the corresponding splitting means, to the corresponding sub-station based on the communication routes managed by the managing means.

A twenty-first invention is the first invention in which the selecting means comprises: a plurality of signal receiving means corresponding to the respective sub-stations; and a plurality of selecting/outputting means provided between the respective sub-stations and the respective signal receiving means, each of the signal receiving means receives only the signal to be input to the local area which is to be transmitted to the corresponding sub-station, among the signals to be input the local area which have been output from the respective access relay apparatuses, based on the communication routes managed by the managing means, and the selecting/outputting means transmit the signal to be input to the local area which has been received by the respective signal receiving means, to the respective corresponding sub-station.

A twenty-second invention is the first invention in which the wireless communication terminal present in the local area comprises a communication start request means for requesting for starting communication via the desired access relay apparatus to the sub-station in the communication area to which the wireless communication terminal belongs, the communication start request reaches via the sub-station to the main station, the main station comprises: a communication request signal receiving means for receiving the communication start request transmitted from the communication start request means; and a communication starting means for starting communication via the access relay apparatus desired by the sub-station based on the communication start request received by the communication request signal receiving means.

A twenty-third invention is the first invention in which the selecting means does not select or output the signal output by the access relay apparatus to the sub-station when the sub-station has not transmitted a signal to the access relay apparatus for a predetermined period of time or more.

A twenty-fourth invention is a system for enabling a wireless communication terminal present in a local area to communication with a network outside the local area, the system comprising: a plurality of sub-stations for forming respective wireless communication areas individually in the local area, and performing wireless communication with a wireless communication terminal in the respective corresponding wireless communication areas; one or more access relay apparatuses for converting a signal to be input from an outside of the local area to an inside of the local area to a signal form for use in the local area, and converting a signal to be output from the inside of the local area to the outside of the local area to a signal form for use in the outside of the local area; and a main station provided between the sub-stations and the access relay apparatuses, wherein the main station comprises a selecting means for selecting and outputting the signal to be input to the local area, the signal having been input from an outside of the local area and a form of the signal having been converted in the access relay apparatus, to all of the sub-stations.

A twenty-fifth invention is the twenty-fourth invention in which a plurality of access relay apparatuses are connected to the main station, the main station further comprises a multiplexing means for frequency-multiplexing the signal to be input to the local area, the signal being output from the access relay apparatus, and the signal to be input to the local area which has been multiplexed by the multiplexing means, is selected and output to all of the sub-stations.

A twenty-sixth invention is the twenty-fourth invention further comprising a network switch provided between the access relay apparatuses and the network outside the local area, wherein the network switch manages a state of connection between each of the access relay apparatus and the wireless communication terminal present in the local area, specifies the wireless communication terminal present in the local area with reference to a signal input to the network switch, and based on the connection state, outputs the signal input to the network switch to the access relay apparatus connected to the specified wireless communication terminal.

A twenty-seventh invention is the twenty-sixth invention in which the wireless communication terminal present in the local area transmits a signal to be transmitted to another wireless communication terminal present in the local area, to the sub-station of the communication area to which the wireless communication terminal belongs, the signal to be transmitted to the other wireless communication terminal is input via the sub-station and the main station to the access relay apparatus, is converted to a signal for use in the outside of the local area in the access relay apparatus, and is output to the network switch, and the network switch specifies the other wireless communication terminal present in the local area with reference to the signal whose form has been converted in the access relay apparatus, and based on the connection state, outputs the signal input to the network switch to the access relay apparatus connected to the specified wireless communication terminal.

A twenty-eighth invention is the twenty-fourth invention in which each of the sub-stations receives the signal to be output from the inside of the local area to the outside of the local area, the signal being transmitted from the wireless communication terminal, and outputs the signal to the main station, the main station outputs the signal to be output from the inside of the local area to the outside of the local area, the signal being output from the sub-station, to the access relay apparatus, the access relay apparatus converts the signal to be output from the inside of the local area to the outside of the local area, the signal being output from the main station, to the signal form for use in the outside of the local area, and outputs the converted signal to the outside of the local area.

A twenty-ninth invention is the twenty-eighth invention in which the main station further comprises: a plurality of main station signal receiving means corresponding to the respective sub-stations, for receiving the signal to be output from the inside of the local area to the outside of the local area, the signal being output from each of the sub-station; and a main station combining means for combining the signals to be output from the inside of the local area to the outside of the local area, the signals being received by the plurality of the main station signal receiving means, and outputting the combined signal to the access relay apparatus.

A thirtieth invention is the twenty-eighth invention in which the access relay apparatus further comprises: an intensity detecting means for detecting an intensity of a signal transmitted from the main station; and a request means for requesting the main station to switch one signal to be transmitted to the access relay apparatus to another signal when the intensity of the signal transmitted from the main station, the intensity being detected by the intensity detecting means, is lower than a predetermined value, and when the request from the request means is present and the main station receives a signal having the same contents to be transmitted to the access relay apparatus from two or more of the sub-stations, the main station outputs the signal output from one of the two or more sub-stations, the one sub-station being different from the sub-station being outputting the signal to the access relay apparatus, instead of the signal being output to the access relay apparatus.

A thirty-first invention is the twenty-eighth invention in which each of the sub-stations further comprises a crosstalk canceling means for creating a signal having the same intensity as that of crosstalk occurring in the signal to be output from the inside of the local area to the outside of the local area due to an influence of the signal to be input to the local area, based on the signal to be input to the local area, and inverting the signal having the intensity and adding the inverted signal to the crosstalk.

A thirty-second invention is the thirty-first invention in which the crosstalk canceling means comprises: a first coupler section for splitting a portion of the signal to be input to the local area; and a second coupler section for combining the portion of the signal to be input to the local area which has been split by the first coupler section, with the signal to be output from the inside of the local area to the outside of the local area, the first coupler section changes a phase of a signal to be output to the second coupler section by 90° when splitting the signal to be input to the local area, and the second coupler section changes a phase of the signal to be input to the local area which has been output from the first coupler section, by 90°, when combining the two signals.

A thirty-third invention is the twenty-eighth invention in which, in each of the sub-station, a signal transmitting/receiving system for outputting the signal to be output from the inside of the local area to the outside of the local area, the signal being output from the wireless communication terminal, to the main station, and a signal transmitting/receiving system for transmitting the signal to be input to the local area, the signal being output from the main station, to the wireless communication terminal, are accommodated in respective separate housings.

A thirty-fourth invention is the twenty-fourth invention in which the main station and each of the sub-stations are connected via an optical transmission line, the main station further comprises an optical signal conversion means for converting the signal selected by the selecting means to an optical signal, each of the sub-stations converts the optical signal output from the main station to an electrical signal in a form for use in the local area, and transmits the electrical signal in the form of a wireless radio wave to the wireless communication terminal in the corresponding wireless communication area.

A thirty-fifth invention is the thirty-fourth invention in which the main station further comprises a main station frequency-converting means for converting a frequency of the signal selected by the selecting means to an intermediate frequency, and the optical signal conversion means converts the signal frequency-converted by the main station frequency-converting means to an optical signal.

A thirty-sixth invention is the thirty-fifth invention in which the sub-station further comprises a sub-station frequency-converting means for converting a frequency of the converted electrical signal in the form for use in the local area from the intermediate frequency to a frequency which is when the access relay apparatus has output the electrical signal, and the signal frequency-converted by the sub-station frequency-converting means is transmitted in the form of a wireless radio wave to the wireless communication terminal in the corresponding wireless communication area.

A thirty-seventh invention is the thirty-fourth invention in which the main station further comprises a main station frequency-converting means for converting a frequency of the signal to be input to the local area, a form of the signal having been converted by each of the access relay apparatuses, to an intermediate frequency, the selecting means selects the signal to be input to the local area whose form has been converted by each of the access relay apparatuses and which has been frequency-converted by the main station frequency-converting means.

A thirty-eighth invention is the thirty-fourth invention in which each of the access relay apparatuses outputs the converted signal to be input to the local area as a signal having a first intermediate frequency to the main station, the main station further comprises a main station frequency-converting means for converting a frequency of the signal to be input to the local area, the signal being output from each of the access relay apparatuses, to a second intermediate frequency, and the selecting means selects the signal to be input to the local area whose form has been converted by each of the access relay apparatuses and which has been frequency-converted by the main station frequency-converting means.

A thirty-ninth invention is the thirty-fourth invention in which the optical transmission lines connecting the respective sub-stations and the main station have lengths substantially equal to one another.

A fortieth invention is the twenty-fourth invention in which the main station and each of the sub-stations are connected via an optical transmission line, the main station further comprises an optical signal conversion means for converting the signal to be input to the local area, a form of the signal having been converted by each of the access relay apparatuses, to an optical signal, and the selecting means selects and outputs the optical signal converted by the optical signal conversion means to the sub-station.

A forty-first invention is the twenty-fourth invention in which the main station further comprises: a plurality of signal receiving means corresponding to the respective sub-stations, for receiving all signals to be input to the local area which are output from the respective access relay apparatuses; and a signal transmitting means provided between each of the sub-stations and each of the signal receiving means, for transmitting all of the signals to be input to the local area which have been output from the respective access relay apparatuses and have been received by the respective corresponding signal receiving means, to the corresponding sub-station.

A forty-second invention is a main station, provided between a plurality of sub-stations for forming respective wireless communication areas in a local area and performing wireless communication with a wireless communication terminal in the respective wireless communication areas, and one or more access relay apparatuses for outputting a signal to be input from an outside of the local area to an inside of the local area, the main station comprising: a managing means for managing a communication route from each of the access relay apparatuses to each of the sub-stations in a state such that the communication route can be set; and a selecting means for selecting and outputting the signal to be input to the local area which has been received by the access relay apparatuses, in accordance with the communication routes managed by the managing means.

A forty-third invention is a main station, provided between a plurality of sub-stations for forming respective wireless communication areas in a local area and performing wireless communication with a wireless communication terminal in the respective wireless communication areas, and one or more access relay apparatuses for outputting a signal to be input from an outside of the local area to an inside of the local area, the main station comprising: a signal receiving means for receiving the signal to be input to the local area which has been received by the access relay apparatus; and a selecting means for selecting and outputting the signal to be input to the local area which has been received by the access relay apparatus, to all of the sub-stations.

A forty-fourth invention is a sub-station for use in a wireless communication system, wherein the sub-station forms a wireless communication area in a local area, and communicates with a wireless communication terminal present in the wireless communication area formed by the sub-station, in the wireless communication system, a signal to be input from an outside of the local area to an inside of the local area is converted to a signal form for use in the local area, and is selected and output to the corresponding sub-station, the sub-station comprising: a signal receiving means for receiving a corresponding signal among the selected and output signals, a radio wave signal transmitting means for transmitting the signal received by the signal receiving means to the corresponding wireless communication terminal present in the wireless communication area in the form of a wireless radio wave.

A forty-fifth invention is the forty-fourth invention in which the signal to be input from the outside of the local area to the inside of the local area is converted to a signal in an optical signal form, and the optical signal is selected and output, the signal receiving means receives the signal converted to the optical signal form, the sub-station further comprises an electrical conversion means for converting the signal received by the signal receiving means to an electrical signal form, the radio wave signal transmitting means transmits the signal converted by the electrical conversion means to the wireless communication terminal in the form of a wireless radio wave.

A forty-sixth invention is the forty-fourth invention in which the wireless communication terminal transmits a signal to be output from the inside of the local area to the outside of the local area in the form of a wireless radio wave, the sub-station further comprises: a radio wave signal receiving means for receiving the signal transmitted by the wireless communication terminal; and a signal transmitting means for transmitting the signal received by the radio wave signal receiving means to an outside of the wireless communication area formed by the sub-station.

A forty-seventh invention is the forty-sixth invention further comprising an optical conversion means for converting the signal received by the radio wave signal receiving means to an optical signal form, wherein the signal transmitting means transmits the optical signal converted by the optical conversion means to the outside of the wireless communication area formed by the sub-station.

A forty-eighth invention is the forty-sixth invention further comprising a crosstalk canceling means for creating a signal having the same intensity as that of crosstalk occurring in the signal to be output from the inside of the local area to the outside of the local area due to an influence of the signal to be input to the local area, based on the signal to be input to the local area, and inverting the signal having the intensity and adding the inverted signal to the crosstalk.

A forty-ninth invention is the forty-eighth invention in which the crosstalk canceling means comprises: a first coupler section for splitting a portion of the signal to be input to the local area; and a second coupler section for combining the portion of the signal to be input to the local area which has been split by the first coupler section, with the signal to be output from the inside of the local area to the outside of the local area, the first coupler section changes a phase of a signal to be output to the second coupler section by 90° when splitting the signal to be input to the local area, and the second coupler section changes a phase of the signal to be input to the local area which has been output from the first coupler section, by 90°, when combining the two signals.

A fifty invention is the forty-sixth invention in which the signal receiving means and the radio wave signal transmitting means are accommodated in a first housing, and the signal transmitting means and the radio wave signal receiving means are accommodated in a second housing.

According to the present invention, the main station outputs a signal output from each access relay apparatus to one or more sub-stations based on communication routes managed by the managing means. Therefore, the user's communication terminal can receive the signal from each access relay apparatus in one or more areas.

Further, the main station frequency-multiplexes the signal output from the access relay apparatus and transfers the resultant signal to each sub-station. Therefore, even when a plurality of signals are simultaneously input from the access relay apparatuses to the main station, it is possible to transfer the signals to the sub-stations.

Further, each access relay apparatus converts a signal to be input to a local area using frequencies from one another. Therefore, the main station can frequency-multiplex the obtained signal without frequency-conversion.

Further, the network switch is provided. Therefore, a signal input from an outside of a local area can be selected and output to each AP. In other words, the wireless communication system can be applied to wireless LAN.

Further, the network switch has a function to return a signal from an inside of a local area into the local area. Therefore, it is possible to achieve communication between each communication terminal in the local area.

Further, in the present invention, a wireless communication terminal in a local area can transmit a signal to a network outside the local area.

Further, the main station is provided with a main station signal receiving means corresponding to each sub-station. Therefore, the main station can subject each received signal individually to various processes. The various processes include, for example, diversity reception performed in the main station when the same signal is transmitted from two or more sub-stations.

Further, if main station receives a signal having a predetermined level or more, the access relay apparatus can continuously receive a signal having the predetermined level or more. Therefore, the data transfer quality of the wireless communication system is improved.

Further, the crosstalk canceling means extracts a signal to be input to a local area, which is output from the selecting means, and adjusts the intensity and phase of the signal to be input to the local area, and adds the resultant signal to a signal to be output from the inside of the local area to the outside of the local area, which is transmitted from a wireless communication terminal. Therefore, a crosstalk between the signal to be input to the local area and the signal to be output from the inside of the local area to the outside of the local area, is reduced.

Further, the crosstalk canceling means is implemented using coupler sections. The coupler section is a passive circuit which can operate without power supply. Therefore, the power consumption of the crosstalk canceling means can be reduced.

Further, the signal transmitting/receiving systems are accommodated in respective separate housings. Therefore, a crosstalk between each signal transmitting/receiving system can be reduced.

Further, the main station and the sub-station are connected via an optical transmission line. Therefore, the main station and the sub-station can be separated by a distance of the order of kilometers.

Further, a signal is transmitted from the main station to the sub-station in an intermediate frequency. Therefore, as compared to when the signal is transmitted in a high frequency, a frequency limitation on parts of the transmission system, such as the main station and the like, is relaxed. As a result, the wireless communication system can be produced with low cost. Further, according to the above-described twelfth invention, a signal is converted to an intermediate frequency between the selecting means and the optical signal conversion means. Therefore, a plurality of signals can be collectively frequency-converted.

Further, a signal transmitted in an intermediate frequency is converted to an original frequency. Therefore, the sub-station can transmit the signal to a signal receiving terminal.

Further, a signal is transmitted in an intermediate frequency from the main station to the sub-station. Therefore, as compared to when a signal is transmitted in a high frequency, a frequency limitation on parts of the transmission system, such as the main station and the like, is relaxed. As a result, the wireless communication system can be produced with low cost.

Further, a signal is transmitted in an intermediate frequency from the main station to the sub-station. Therefore, as compared to when a signal is transmitted in a high frequency, a frequency limitation on parts of the transmission system, such as the main station and the like, is relaxed. As a result, the wireless communication system can be produced with low cost. Further, according to the fifteenth invention, the access relay apparatus and the main station communicate using an intermediate frequency signal. Therefore, the structure of a cable or implementation can be simplified.

Further, the optical transmission lines have lengths substantially equal to one another. Therefore, a transmission loss between the main station and the sub-station is equalized.

Further, the selecting means selects optical signals. Therefore, as compared to when selection is performed using electrical signals, crosstalk performance can be excellent.

Further, a splitting means and a selecting/outputting means are provided for each sub-station. Therefore, by additionally providing one more set of a splitting means and a selecting means without modifying the other splitting means and selecting means, an additional sub-station can be provided. Furthermore, in the main station, it is possible to avoid interference between signals output to the sub-stations.

Further, no signal is split in the main station. Therefore, a degradation in the intensity of a signal when the signal is split can be prevented.

Further, the terminal comprises a communication start request means. Therefore, in response to a request from the terminal, the main station can be caused to set a communication route.

Further, a signal from an access relay apparatus, which is not used for a predetermined period of time or more, is automatically blocked. Therefore, no unnecessary signal is output to the communication area of the sub-station, thereby making it possible to improve security and reduce power consumption.

Further, the main station transmits a signal received from each access relay apparatus to all sub-stations. The user's communication terminal can receive a signal in all communication areas.

Further, the main station frequency-multiplexes a signal from each access relay apparatus, and outputs the resultant signal to each sub-station. Therefore, even when receiving a plurality of signals simultaneously from the access relay apparatuses, the main station can transmit the signals to the respective sub-stations.

According to another aspect of the present invention, a network switch is provided. Therefore, it is possible to select and output a signal input from the outside of a local area to each AP. In other words, the wireless communication system can be applied to wireless LAN.

Further, the network switch has a function to return a signal from an inside of a local area into the local area. Therefore, it is possible to achieve communication between each communication terminal in the local area.

Further, in the present invention, a wireless communication terminal in a local area can transmit a signal to a network outside the local area.

Further, the main station is provided with a main station signal receiving means corresponding to each sub-station. Therefore, the main station can subject each received signal individually to various processes. The various processes include, for example, diversity reception performed in the main station when the same signal is transmitted from two or more sub-stations.

Further, if main station receives a signal having a predetermined level or more, the access relay apparatus can continuously receive a signal having the predetermined level or more. Therefore, the data transfer quality of the wireless communication system is improved.

Further, the crosstalk canceling means extracts a signal to be input to a local area, which is output from the selecting means, and adjusts the intensity and phase of the signal to be input to the local area, and adds the resultant signal to a signal to be output from the inside of the local area to the outside of the local area, which is transmitted from a wireless communication terminal. Therefore, a crosstalk between the signal to be input to the local area and the signal to be output from the inside of the local area to the outside of the local area, is reduced.

Further, the crosstalk canceling means is implemented using coupler sections. The coupler section is a passive circuit which can operate without power supply. Therefore, the power consumption of the crosstalk canceling means can be reduced.

Further, the signal transmitting/receiving systems are accommodated in respective separate housings. Therefore, a crosstalk between each signal transmitting/receiving system can be reduced.

Further, the main station and the sub-station are connected via an optical transmission line. Therefore, the main station and the sub-station can be separated by a distance of the order of kilometers.

Further, a signal is transmitted from the main station to the sub-station in an intermediate frequency. Therefore, as compared to when the signal is transmitted in a high frequency, a frequency limitation on parts of the transmission system, such as the main station and the like, is relaxed. As a result, the wireless communication system can be produced with low cost. Further, according to the above-described twenty-eighth invention, a signal is converted to an intermediate frequency between the selecting means and the optical signal conversion means. Therefore, a plurality of signals can be collectively frequency-converted.

Further, a signal transmitted in an intermediate frequency is converted to an original frequency. Therefore, the sub-station can transmit the signal to a signal receiving terminal.

Further, a signal is transmitted in an intermediate frequency from the main station to the sub-station. Therefore, as compared to when a signal is transmitted in a high frequency, a frequency limitation on parts of the transmission system, such as the main station and the like, is relaxed. As a result, the wireless communication system can be produced with low cost.

Further, a signal is transmitted in an intermediate frequency from the main station to the sub-station. Therefore, as compared to when a signal is transmitted in a high frequency, a frequency limitation on parts of the transmission system, such as the main station and the like, is relaxed. As a result, the wireless communication system can be produced with low cost. Further, according to the thirty-first invention, the access relay apparatus and the main station communicate using an intermediate frequency signal. Therefore, the structure of a cable or implementation can be simplified.

Further, the optical transmission lines have lengths substantially equal to one another. Therefore, a transmission loss between the main station and the sub-station is equalized.

Further, the selecting means selects optical signals. Therefore, as compared to when selection is performed using electrical signals, crosstalk performance can be excellent.

Further, a signal receiving means and a selecting/outputting means are provided for each sub-station. Therefore, by additionally providing one more set of a signal receiving means and a selecting means without modifying the other signal receiving means and selecting means, an additional sub-station can be provided. Furthermore, in the main station, it is possible to avoid interference between signals output to the sub-stations.

Further, the main station outputs a signal output from each access relay apparatus to one or more sub-stations based on the communication routes managed by the managing means.

Therefore, the user's communication terminal can receive a signal from each access relay apparatus in one or more areas.

Further, the main station transmits a signal received from each access relay apparatus to all sub-stations. The user's communication terminal can receive a signal in all communication areas.

According to another aspect of the present invention, the main station outputs a signal output from each access relay apparatus to one or more sub-stations based on communication routes managed by the managing means. Therefore, the user's communication terminal can receive the signal from each access relay apparatus in one or more areas.

Further, the main station and the sub-station are connected via an optical transmission line. Therefore, the main station and the sub-station can be separated by a distance of the order of kilometers.

Further, a wireless communication terminal in a local area can transmit a signal to a network outside the local area.

Further, the main station and the sub-station are connected via an optical transmission line. Therefore, the main station and the sub-station can be separated by a distance of the order of kilometers.

Further, the crosstalk canceling means extracts a signal to be input to a local area, which is output from the selecting means, and adjusts the intensity and phase of the signal to be input to the local area, and adds the resultant signal to a signal to be output from the inside of the local area to the outside of the local area, which is transmitted from a wireless communication terminal. Therefore, a crosstalk between the signal to be input to the local area and the signal to be output from the inside of the local area to the outside of the local area, is reduced.

Further, the crosstalk canceling means is implemented using coupler sections. The coupler section is a passive circuit which can operate without power supply. Therefore, the power consumption of the crosstalk canceling means can be reduced.

Further, the signal transmitting/receiving systems are accommodated in respective separate housings. Therefore, a crosstalk between each signal transmitting/receiving system can be reduced.

BRIEF DESCRIPTION OF THE DRAWINGS

FIG. 7 is a block diagram showing another exemplary configuration of the sub-station 20 according to Embodiment 1 of the present invention.

FIG. 8 is a block diagram showing another exemplary configuration of the sub-station 20 according to Embodiment 1 of the present invention.

FIG. 14(a) is a block diagram showing a configuration of a transmitted signal processing section 121 provided in the main station 10 according to Embodiment 2 of the present invention.

FIG. 14(c) is a diagram showing an exemplary configuration of the transmitted/received signal processing section of FIG. 14(b).

FIG. 15 is a block diagram showing another exemplary configuration of the main station 10 according to Embodiment 2 of the present invention.

FIG. 21 is a block diagram showing an exemplary entire configuration of a wireless communication system according to Embodiment 4 of the present invention.

FIG. 27 is a diagram showing an example of area information.

FIG. 32 is a block diagram showing a configuration of a main station optical signal transmitting section 102 when the main station 10 and the sub-station 20 communicate using an optical signal having a frequency band of an IF signal, in the wireless communication system of the present invention.

FIG. 35 is a block diagram showing a configuration of a downconvert section 600 for frequency-converting a signal to a second IF signal in the main station 10 when the signal is transmitted in the form of an IF signal from an AP 91.

FIG. 39 is a block diagram showing an entire configuration of a conventional wireless LAN system.

BEST MODE FOR CARRYING OUT THE INVENTION

Embodiment 1

Figure 1:
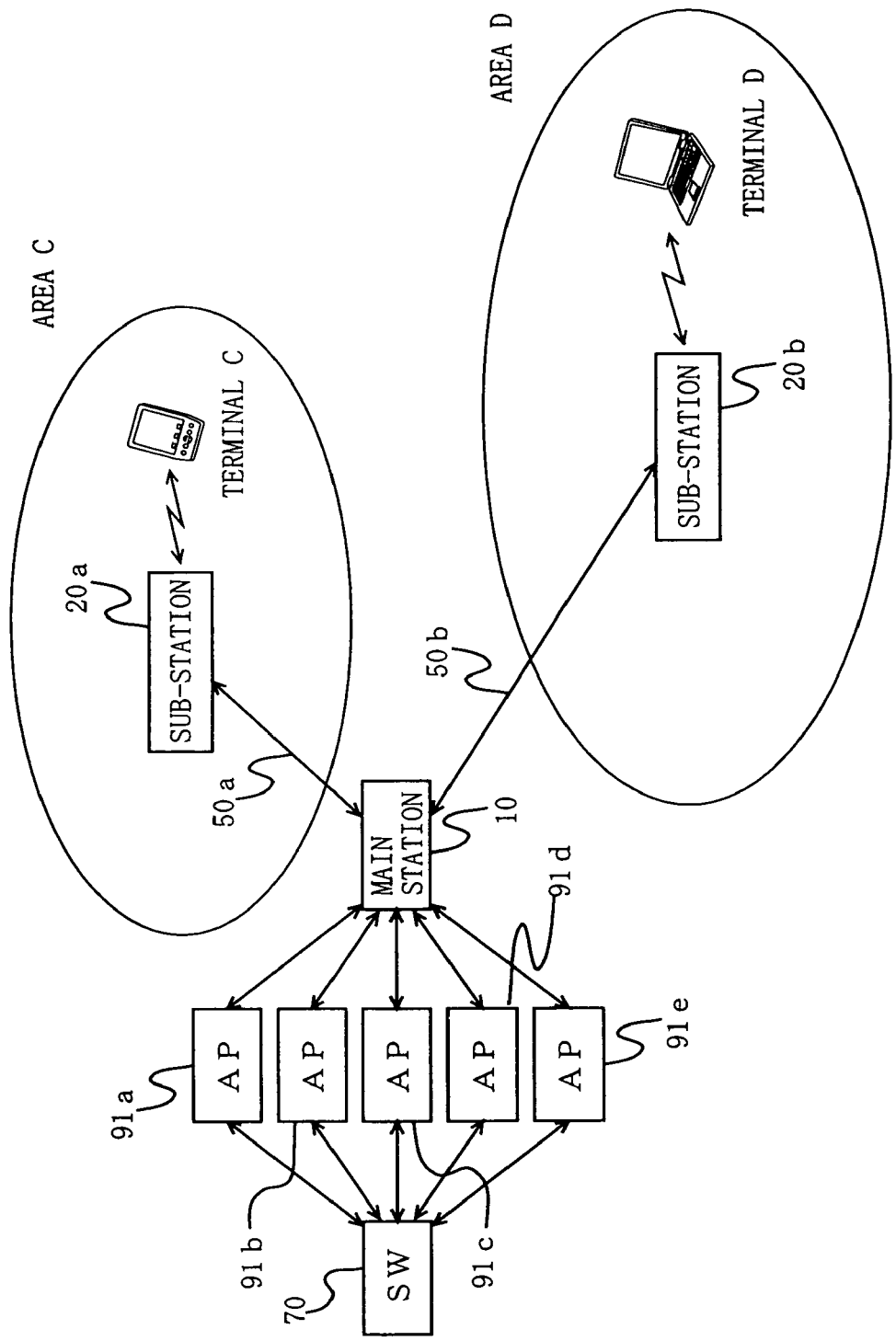
FIG. 1 is a block diagram showing an exemplary entire configuration of a wireless communication system according to the present invention.

Hereinafter, an entire structure of a wireless communication system according to Embodiment 1 of the present invention will be described with reference to the accompanying drawings. FIG. 1 is a block diagram showing the entire configuration of the wireless communication system.

The wireless communication system of Embodiment 1 has areas C and D (in the claims, the areas C and D are each referred to as a wireless communication area, and collectively referred to as a local area), and comprises a main station 10, sub-stations 20a and 20b, optical fiber transmission paths 50a and 50b, a network switch (abbreviated as SW in FIG. 1) 70, access points (abbreviated as AP in FIG. 1) 91a to 90e, and terminals C and D. Note that the terminals C and D are representative terminals which are present in the respective areas. Therefore, a number of terminals are present in the actual areas C and D in addition to the terminals C and D.

The area C is an area in which the sub-station 20a provides services, and more specifically, an area within a reach of a signal transmitted from the sub-station a. The area D is an area in which the sub-station 20b provides services, and more specifically, an area with in a reach of a signal transmitted from the sub-station 20b. The SW 70 manages a network structure of a wireless LAN, and switches an Ethernet® signal which is input from an external network to the wireless communication system, to each of the APs 91a to 91e. The APs 91a to 91e convert an Ethernet® signal which is input from the SW 70, to a wireless LAN signal in the form of an electrical signal, which is in turn output to the main station 10. The APs 91a to 91e also convert a wireless LAN signal in the form of an electrical signal which is output from the main station 10, to an Ethernet® signal, which is in turn output to the SW 70. The APs 91a to 91e has substantially the same structure as that of APs for use in general wireless LAN. The APs 91a to 91e are different from general wireless LAN APs in that a wireless LAN signal is output onto an electric cable in the form of an electrical signal instead of a radio wave.

The main station 10 converts the electrical signal type wireless LAN signal, which has been output from the APs 91a to 91e, to an optical signal type wireless LAN signal (hereinafter, the optical signal type wireless LAN signal is referred to as an optical signal). The main station 10 also converts an optical signal which is output from the sub-stations 20a and 20b, to an electrical signal type wireless LAN signal. The sub-stations 20a and 20b communicate with the terminals C and D via a radio wave. More specifically, the sub-stations 20a and 20b convert an optical signal which is output from the main station 10, to an electrical signal type wireless LAN signal, and transmits the electrical signal type wireless LAN signal in the form of a wireless electrical signal to the terminals C and D. The sub-stations 20a and 20b also receive and convert a wireless electrical signal type wireless LAN signal which is transmitted from the terminals C and D, to an electrical signal wireless LAN signal and further convert the electrical signal type wireless LAN signal to an optical signal, which is in turn transmitted to the main station 10. The terminals C and D are a computer or PDA which has a wireless LAN interface.

Here, the APs 91a to 91e will be described in detail. The APs 91a to 91e can each relay communication to a plurality of terminals. In this case, when the APs 91a to 91e have to individually transmit signals to a plurality of terminals, the signals to be transmitted are distributed in a time direction and then output to the main station 10. Also, similarly, the APs 91a to 91e distribute signals which are transmitted from a plurality of terminals, in a time direction and then output the resultant signal to the SW 70.

Also, the APs 91a to 91e create a wireless LAN signal using channels having different frequencies in order to prevent interference between each output signal. Note that the function of distributing an output signal in a time direction and the function of creating a wireless LAN signal using a plurality of channels that are possessed by the APs 91a to 91e are also possessed by conventional APs.

Figure 2:
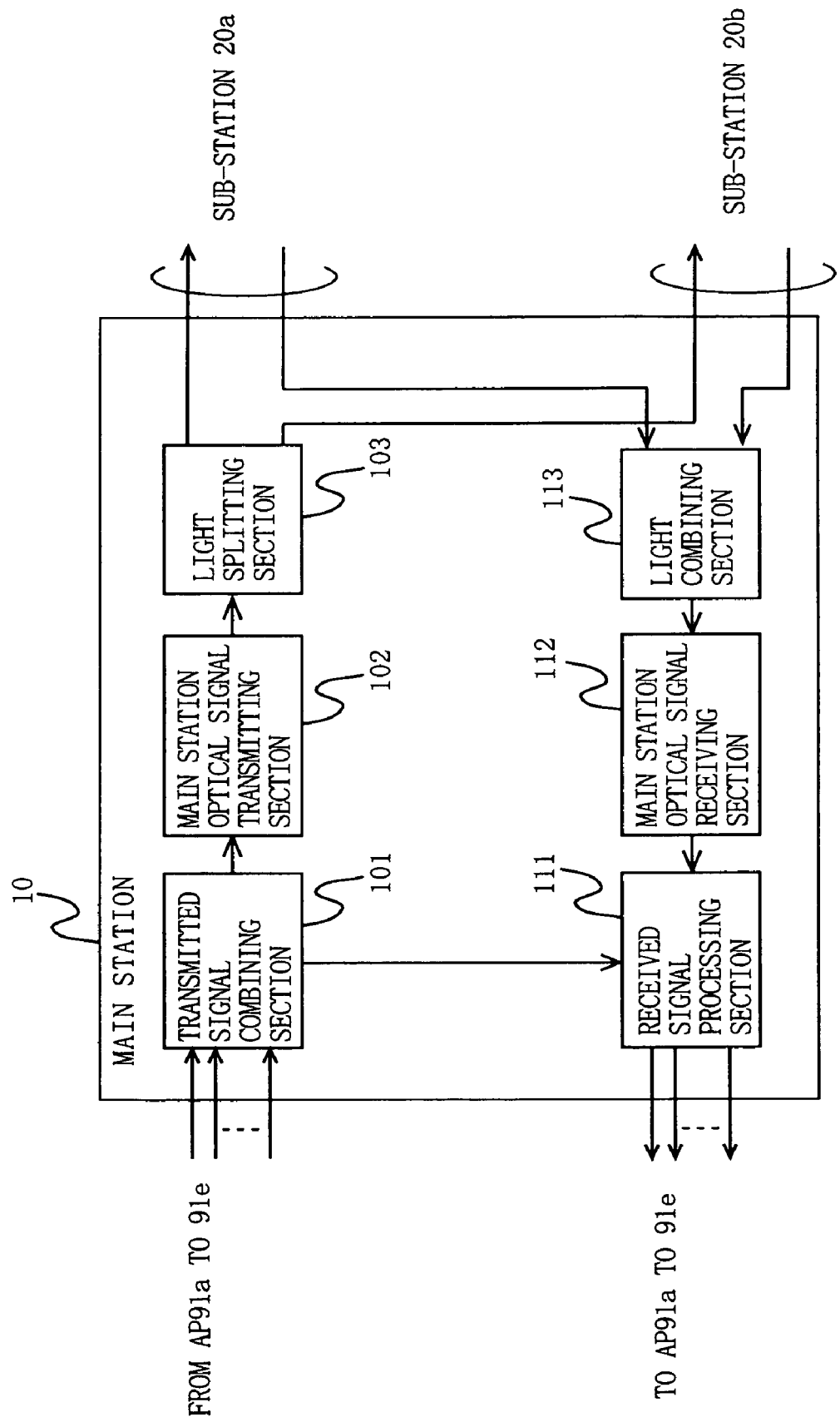
FIG. 2 is a block diagram showing an exemplary configuration of a main station 10 according to Embodiment 1 of the present invention.

Next, the main station 10 will be described in detail. FIG. 2 is a block diagram showing a detailed configuration of the main station 10. The main station 10 comprises a transmitted signal combining section 101, a main station optical signal transmitting section 102, a light splitting section 103, a received signal processing section 111, a main station optical signal receiving section 112, and a light combining section 113.

The transmitted signal combining section 101 receives electrical signal type wireless LAN signals from the APs 91a to 91e. The transmitted signal combining section 101 frequency-multiplexes each input signal to create a combined signal. The main station optical signal transmitting section 102 converts the signal created by the transmitted signal combining section 101 to an optical signal. The light splitting section 103 splits the optical signal output by the main station optical signal transmitting section 102 and outputs the resultant signals to the sub-stations 20a and 20b. Note that, in Embodiment 1, the sub-stations 20a and 20b receive an optical signal having the same information.

The light combining section 113 is connected to the sub-stations 20a and 20b, and frequency-multiplexes and combines optical signals output by the sub-stations 20a and 20b. This is achieved using an optical coupler or a WDM (Wavelength Division Multiplexing) coupler. When the light combining section 113 is achieved using an optical coupler, it is advantageously possible to produce the light combining section 113 inexpensively. When the light combining section 113 is achieved using a WDM coupler, it is advantageously possible to prevent beat interference.

The main station optical signal receiving section 112 converts the optical signal output by the light combining section 113 to an electrical signal type wireless LAN signal. The received signal processing section 111 separates the signal input from the main station optical signal receiving section 112 into individual frequency bands, and outputs the separated signals to the desired APs 91a to 91e, respectively.

Figure 3:
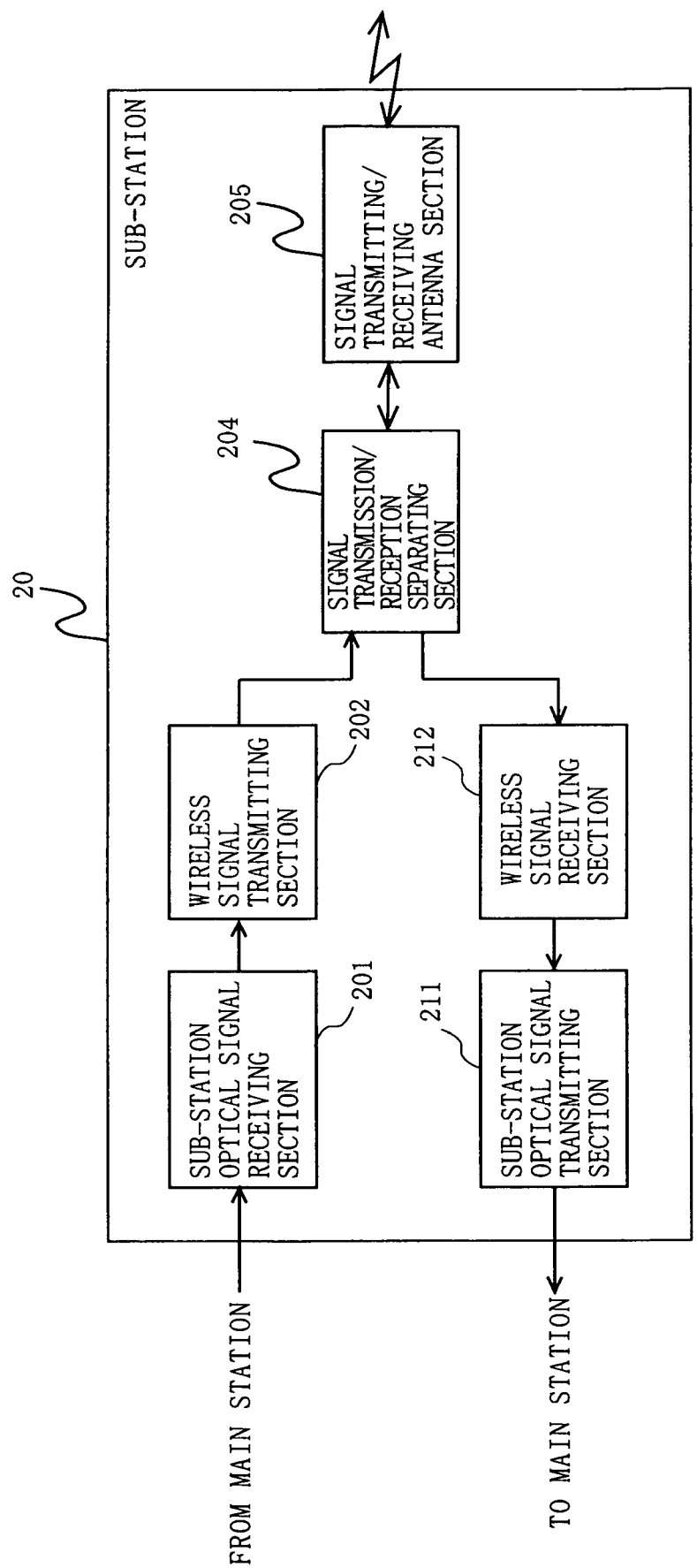
FIG. 3 is a block diagram showing an exemplary configuration of a sub-station 20 according to Embodiment 1 of the present invention.

Next, the sub-stations 20a and 20b will be described. FIG. 3 is a block diagram showing a detailed configuration of the sub-stations 20a and 20b. The sub-stations 20a and 20b comprise a sub-station optical signal receiving section 201, a wireless signal transmitting section 202, a signal transmission/reception separating section 204, a signal transmitting/receiving antenna section 205, a sub-station optical signal transmitting section 211, and a wireless signal receiving section 212.

The sub-station optical signal receiving section 201 converts an optical signal which is transmitted from the main station 10 through the optical fiber transmission paths 50a and 50b, to an electrical signal type wireless LAN signal. The wireless signal transmitting section 202 amplifies the signal output from the sub-station optical signal receiving section 201. The signal transmission/reception separating section 204 outputs the signal from the wireless signal transmitting section 202 to the signal transmitting/receiving antenna section 205, and outputs a signal from the signal transmitting/receiving antenna section 205 to the wireless signal receiving section 212. The signal transmitting/receiving antenna section 205 receives a radio wave type wireless LAN signal transmitted from the terminals C and D, and also transmits an electrical signal type wireless LAN signal which is output from the signal transmission/reception separating section 204, in the form of a radio wave, to the terminals C and D.

Note that the signal transmitting/receiving antenna section 205 needs to have a function to transmit a frequency-multiplexed wireless LAN signal as a radio wave. In other words, the signal transmitting/receiving antenna section 205 needs to have a function to transmit and receive signals having a plurality of frequencies simultaneously. This is because signals output from the APs 91a to 91e are frequency-multiplexed by the main station 10.

The wireless signal receiving section 212 converts the signal output from the signal transmission/reception separating section 204 to a signal suitable for the sub-station optical signal transmitting section 211. The converted signal is output to the sub-station optical signal transmitting section 211. The sub-station optical signal transmitting section 211 converts the electrical signal type wireless LAN signal output from the wireless signal receiving section 212 to an optical signal, which is in turn transmitted to the main station 10.

An operation of the wireless communication system thus constructed will be described.

Hereinafter, the case where data is transmitted from an external network to the terminal C will be described. An Ethernet® signal is input from the external network to the SW 70. Here, the SW 70 memorizes the network configuration of the wireless LAN as described above. Therefore, the SW 70 determines an output destination of the network signal with reference to the received Ethernet® signal and the network structure. Here, the SW 70 is assumed to output the Ethernet® signal to the AP 91a, and hereinafter, the description is continued.

The AP 91a converts the received Ethernet® signal to an electrical signal type wireless LAN signal having a frequency of a predetermined channel, which is in turn output to the main station 10 through an electric cable. Note that the predetermined channel is a channel which has a frequency different from those which are used by the APs 91b to 91e. The reason why the APs 91a to 91e have frequencies different form one another is that signals output by the APs are prevented from interfering with one another.

Note that the operations until the AP 91a converts an Ethernet® signal to an electrical signal type wireless LAN signal are similar to those of conventional wireless communication systems.

Next, the main station 10 receives the electrical signal type wireless LAN signal using the transmitted signal combining section 101. The transmitted signal combining section 101 also receives electrical signal type wireless LAN signals from the APs 91b to 91e. Thereafter, the transmitted signal combining section 101 combines the electrical signal type wireless LAN signal received from the AP 91a with the electrical signal type wireless LAN signals received from the APs 91b to 91e by frequency-multiplexing, and outputs the resultant signal to the main station optical signal transmitting section 102. The main station optical signal transmitting section 102 receives the combined signal and then converts the combined signal to an optical signal, which is in turn output to the light splitting section 103. The light splitting section 103 splits the received optical signal and transmits the split signals to both the sub-stations 20a and 20b.

The sub-station 20a receives the optical signal using the sub-station optical signal receiving section 201. The sub-station optical signal receiving section 201 converts the received optical signal to an electrical signal type wireless LAN signal, which is in turn output to the wireless signal transmitting section 202. The wireless signal transmitting section 202 receives the electrical signal type wireless LAN signal and then amplifies the received electrical signal type wireless LAN signal, and then outputs the resultant signal to the signal transmission/reception separating section 204. Next, the signal transmission/reception separating section 204 outputs the signal output from the wireless signal transmitting section 202, to the signal transmitting/receiving antenna section 205. Next, the signal transmitting/receiving antenna section 205 transmits the obtained electrical signal type wireless LAN signal, in the form of a radio wave, to the terminal C.

Here, the radio wave type wireless LAN signal output from the signal transmitting/receiving antenna section 205 is multiplexed with not only a signal to be transmitted to the terminal C but also signals to be transmitted to other terminals using frequency-multiplexing and time division multiplexing. Therefore, the terminal C selectively receives only a desired signal. Thereby, the terminal C can receive data transmitted from an external network. Thus, the transmission of data from an external network to the terminal C has been described.

Next, the case where data output from the terminal C is transmitted to an external network will be described. The terminal C transmits a wireless LAN signal to the sub-station 20*a* in the form of a radio wave. In response to this, the sub-station 20*a* receives the radio wave type wireless LAN signal using the signal transmitting/receiving antenna section 205. The signal transmitting/receiving antenna section 205 outputs the received radio wave type wireless LAN signal as an electrical signal type wireless LAN signal to the signal transmission/reception separating section 204. Next, the signal transmission/reception separating section 204 outputs the obtained electrical signal type wireless LAN signal to the wireless signal receiving section 212. Next, the wireless signal receiving section 212 converts the obtained electrical signal type wireless LAN signal to a signal suitable for the sub-station optical signal transmitting section 211, and outputs the resultant signal to the sub-station optical signal transmitting section 211. Next, the sub-station optical signal transmitting section 211 converts the electrical signal type wireless LAN signal output from the wireless signal receiving section 212 to an optical signal, which is in turn transmitted to the main station 10.

The main station 10 receives the optical signal using the light combining section 113. The light combining section 113 combines the optical signal transmitted from the sub-station 20*a* with an optical signal transmitted from the other sub-station 20*b*, and outputs the resultant signal to the main station optical signal receiving section 112. Next, the main station optical signal receiving section 112 converts the optical signal obtained from the light combining section 113 to an electrical signal type wireless LAN signal, which is in turn output to the received signal processing section 111. In response to this, the received signal processing section 111 outputs the electrical signal type wireless LAN signal to an AP 91 which is communicating with the terminal C.

Here, a method will be described in detail, with which the received signal processing section 111 outputs the electrical signal type wireless LAN signal to the AP.

The received signal processing section 111 separates the signal input from the main station optical signal receiving section 112 into individual frequency bands, and outputs the separated signals to the respective desired APs. Thereby, it is advantageously possible to prevent an extra signal from being input to the AP.

To achieve this, in a certain method, I/O ports of the main station 10 are fixedly assigned to the respective APs 91. More specifically, a frequency which is used in each port is previously fixed, and each port is connected to an invariably determined AP 91. Therefore, an AP 91 through which the electrical signal type wireless LAN signal is output, is uniquely determined based on the frequency of the electrical signal type wireless LAN signal output from the received signal processing section 111, thereby solving the above-described problem. Note that the received signal processing section 111 may output the received, frequency-multiplexed electrical signal type wireless LAN signal to each AP without frequency separation. In this case, each AP 91 selectively receives only an electrical signal type wireless LAN signal having a frequency which should be received by the AP 91.

Note that, in order to enable the user to easily change a frequency used in each AP 91, the transmitted signal combining section 101 detects which port receives what signal. When the frequency has been changed, the transmitted signal combining section 101 informs the received signal processing section 110 of the change. In response to this, the received signal processing section 110 is the ports to which it outputs signals. For example, when a frequency used by an AP 91 connecting to a first port for an input signal and a first port for an output signal has been changed, the transmitted signal combining section 101 detects the change and informs the received signal processing section 111 of the change. The received signal processing section 111 outputs a signal having a desired frequency, among the signals from the main station optical signal receiving section 112, to the first port for an output signal. Therefore, the AP can perform normal communication even when the frequency used is changed. Needless to say, when a frequency has been changed as described above, the user may change manually settings of the received signal processing section 111.

Here, the case where data is output from the terminal C is transmitted to an external network will be described again. The AP 90*a* receives the electrical signal type wireless LAN signal output from the main station 10 and converts the signal to an Ethernet® signal, which is in turn output to the SW 70. In response to this, the SW 70 receives the Ethernet® signal, which is in turn output to the external network. As a result, a signal transmitted from the terminal C flows to the external network. Thus, the case where data is output from the terminal C is transmitted to an external network has been described.

Next, the case where the terminal C transmits a signal to the terminal D will be described. The process from when the terminal C transmits a wireless LAN signal to the sub-station 20*a* in the form of a radio wave until when the AP 90*a* outputs an Ethernet® signal to the SW 70 is similar to when data output from the terminal C is transmitted to an external network, and will not be explained.

The SW 70 which has received the Ethernet® signal references the obtained Ethernet® signal. Here, the Ethernet® signal is a signal to be transmitted to the terminal D. Therefore, the SW 70 recognizes that the Ethernet® signal is data to be transmitted to the terminal D. Next, the SW 70 references a network structure managed by itself to specify an AP 91 to which the Ethernet® signal is to be output. Here, the terminal D is designed to communicate with the AP 91*b*. Therefore, the SW 70 outputs the Ethernet® signal to the AP 91*b*.

Thereafter, the Ethernet® signal reaches the terminal D through the AP 91*b*, the main station 10 and the sub-station 20*b*. Note that the operation of each section during this period of time is the same as that described for the transmission of data from an external network to the terminal C, except that the terminal C is replaced with the terminal D, and therefore, will not be explained 4. Also, when data is transmitted from the terminal C to the terminal D, signals flow in a direction reverse to that described above, and the description is omitted.

Here, the wireless communication system of Embodiment 1 is compared with a conventional wireless LAN system. Note that, in the following description, it is assumed that the accommodation capacity of each AP 91 is ten, which is the same as that of the conventional technique.

In the conventional wireless LAN system, an AP(s) 91 is provided for each area. Therefore, the accommodation capacity of each area is determined based on the number of APs 91 provided for the area. More specifically, in the case of the wireless LAN system of FIG. 39, the accommodation capacity of the area A is twenty while the accommodation capacity of the area B is thirty. Therefore, for example, when twenty-five terminals are present in the area A and twenty-five terminals are present in the area B, the total number of terminals is fifty and is equal to the total accommodation capacity of the APs in both of the areas, however, the communication quality of the area A is reduced.

In contrast to this, in the case of the wireless communication system of Embodiment 1, the main station 10 transmits all signals received from the APs 91a to 91e to both the sub-stations 20a and 20b. Therefore, all terminals can receive the signal irrespective of whether the terminal is present in the area C or D. As a result, for example, even when the area C has fifty terminals and the area D has no terminal, it is possible to avoid a reduction in communication quality of the area C, which otherwise occurs in conventional wireless LAN systems. In other words, according to the wireless communication system of Embodiment 1, the accommodation capacity of each AP 91 can be freely distributed to a plurality of areas. The number of APs 91 is five in Embodiment 1, but is not limited to this.

Also in the wireless communication system of Embodiment 1, each terminal can receive a desired signal in either the area C or the area D. Therefore, even when a terminal is moved from one area to another, it is not necessary for the user to reset the connection of the terminal. As a result, the AP 91 does not require a roaming function.

Also in the wireless communication system of Embodiment 1, the AP function for wireless LAN is centralized in the main station 10. As a result, it is easy to manage and maintain APs. Further, when an additional AP is provided, the AP is installed on the main station side. Therefore, a task of providing wirings on a ceiling or the like is not required, thereby making it easy to install the AP.

Also in the wireless communication system of Embodiment 1, the sub-station 20 can transmit/receive a wireless LAN signal to/from a plurality of APs 91. Therefore, by providing a single sub-station 20, a plurality of wireless LAN signals can be handled. Therefore, even in the conventional case where a plurality of APs need to be installed at a place, a single sub-station 20 is only required. For example, even in the conventional case where a plurality of APs need to be installed on the same utility pole, a single sub-station is only installed in the wireless communication system of Embodiment 1.

Also in the wireless communication system of Embodiment 1, the main station 10 and the sub-station 20 are connected via an optical fiber transmission path, and therefore, can be easily separated by a distance of about several kilometers. Therefore, in a railway station, an underground shopping mall, a building, a train or the like, services can be easily provided by installing the main station 10 and the AP 91 at one place while providing the sub-station 20 in each place. If a wider range is conceived for providing public services, a center station can be provided, in which the main station 10 and the AP 91 are installed, and the center station can be connected to the sub-station 20 in each service area via an optical fiber. For example, the main station 10 and the AP 91, and other network apparatuses are installed in an Internet data center, while the Internet data center is connected to a sub-station in a wireless LAN service area, such as a railway station, an underground shopping mall, a public place or the like, via a rental dark fiber. Thereby, a wide-range wireless LAN service can be achieved.

Also in the wireless communication system of Embodiment 1, when a service area is located outdoors, a main station and an AP(s) can be installed indoors while only a sub-station is for outdoor use. Commercially available APs for indoor use can be used, thereby making it possible to construct the wireless communication system inexpensively.

When the wireless communication system of Embodiment 1 is used outdoors in a 5-GHz band, interference to other wireless apparatuses should be avoided. Particularly when a wide range is covered using a single antenna, the antenna needs to emit a wireless signal having a great power, which easily causes interference to other wireless apparatuses. In contrast to this, according to the wireless communication system of Embodiment 1, a service area is divided into areas, and each area is covered by a sub-station which is connected via an optical fiber transmission path to the area, thereby making it possible to reduce the power of a wireless signal emitted by each sub-station. In addition, no radio wave leaks from the optical fiber transmission path for the connection, whereby interference to other wireless apparatus can be easily prevented from occurring.

In the wireless communication system of Embodiment 1, a wireless LAN signal is optically transmitted in the form of an RF signal. Due to frequency division multiplex, different signals can be optically transmitted simultaneously if they have different frequencies. For example, the wireless LAN 802.11 series include 802.11a and 802.11b, which use frequencies of a 5.2-GHz band and a 2.4-GHz band, respectively. Both the bands can be very easily optically transmitted simultaneously to provide their services simultaneously.

Cellular phone signals are used in an 800-MHz band, a 1.5-GHz band and a 2-GHz band, while PHS signals are used in a 1.9-GHz band. These frequencies are different from frequencies of wireless LAN signals. Therefore, there is no problem in that the cellular phone signals and the PHS signals are frequency-multiplexed with wireless LAN signals for optical transmission. Therefore, it is effective in terms of cost reduction to use the same optical fiber for transmission according to Embodiment 1, compared to when the cellular phone or PHS signals are transmitted separately from wireless LAN signals.

The frequencies of cellular phone signals are increased with an increase in generation to the third generation and the fourth generation. Generally, as the frequency of a radio wave is increased, it is more difficult for the radio wave to reach indoors, leading to a reduction in service area. Although countermeasures for blind zones are even currently required, blind zones tend to be more and more increased. Therefore, if wireless LAN services and cellular phone services can be provided using the same optical fiber transmission path as in the present invention, it is possible to take measures for blind zones with low cost. Thus, such a technique is very practical.

Although the area C and the area D do not overlap each other in the wireless communication system of Embodiment 1, the area C and the area D may partially overlap each other. In this case, the same signal reaches both the area C and the area D, and therefore, a terminal can perform diversity reception in the overlapping portion. In addition, since the same signal similarly reaches a main station from sub-stations located in both the areas, the main station can perform diversity reception with respect to a signal from a terminal.

Note that the transmitted signal combining section 101 may have a function to adjust the intensity of each input signal before combining each signal by frequency-multiplexing. This is because the optimum optical modulation degree in optical transmission varies depending on the type or frequency of a signal, and therefore, each signal should be adjusted to an optimum intensity before being converted to an optical signal. More specifically, the intensity of each signal needs to be adjusted before being combined by the transmitted signal combining section 101. Therefore, in the transmitted signal combining section 101 of Embodiment 1, before combining obtained signals, the intensity of each signal is adjusted so that the amplitude of the signal provides an optimum optical modulation degree. Adjustment may be achieved by the following method, for example. The signal type of an input signal from each AP 91 is detected by the transmitted signal combining section 101, and based on the result, the amplitude of the signal is adjusted. Thereby, an optimum optical modulation degree can be achieved for the optimum main station optical signal transmitting section 102. Generally, a purpose of use is assigned to each frequency. Therefore, is the transmitted signal combining section 101 detects a frequency, the frequency and the type of the signal are known, based on them, an optimum optical modulation degree can be achieved. Specifically, the transmitted signal combining section 101 detects the frequencies of signals input from the APs 91, and based on the result, adjusts the amplitude of each input signal. Thereby, a desired function can be achieved.

The number of areas is assumed to be two in Embodiment 1, but is not limited to this. Similarly, the number of the APs 91 is assumed to be five in Embodiment 1, but is not limited to this.

(Exemplary Configuration of Main Station in Embodiment 1)

Figure 4:
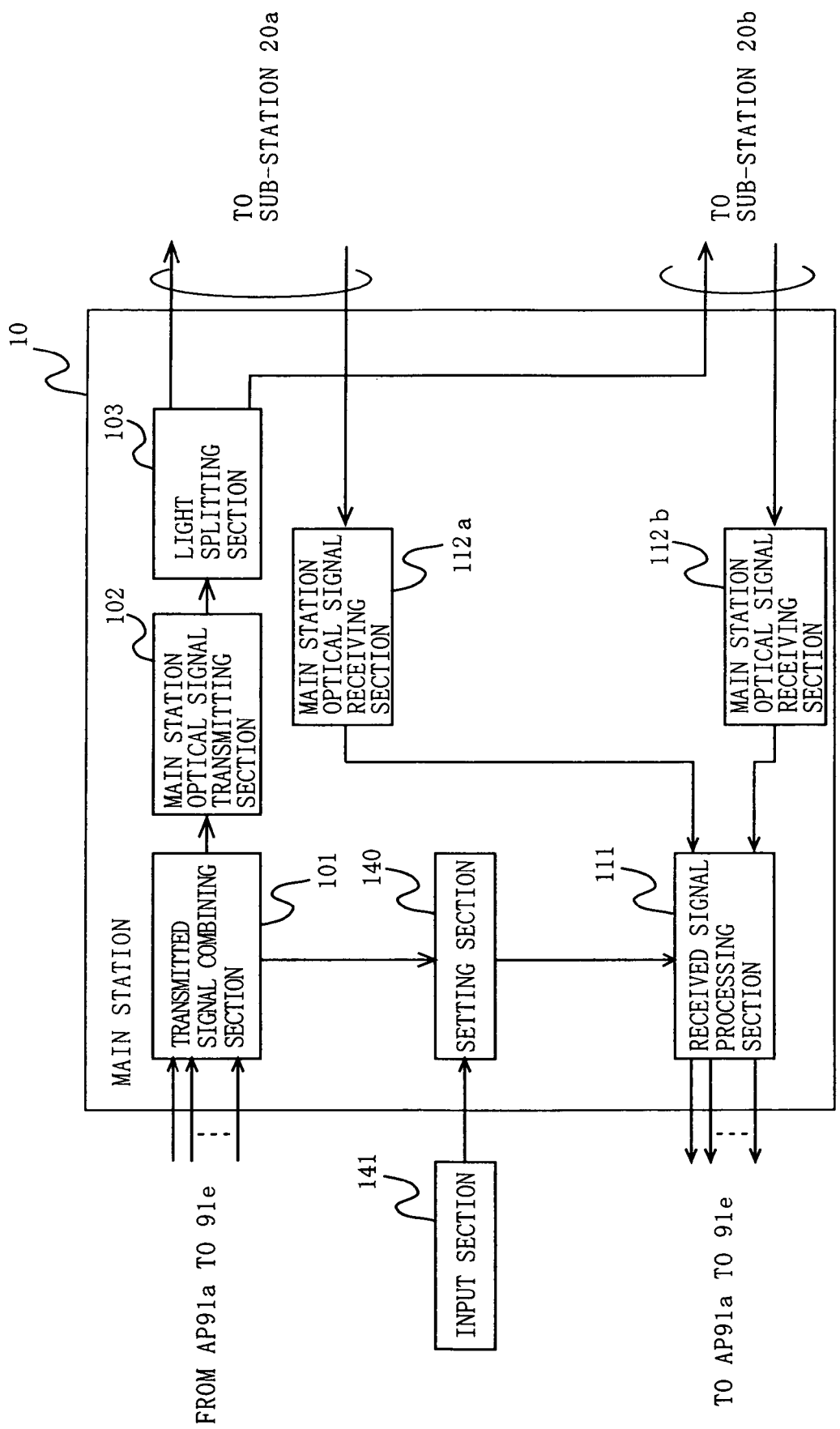
FIG. 4 is a block diagram showing another exemplary configuration of the main station 10 according to Embodiment 1 of the present invention.

Another exemplary configuration of the main station 10 in the wireless communication system of Embodiment 1 will be described with reference to FIG. 4. FIG. 4 is a block diagram showing a detailed configuration of the main station 10 of this configuration example.

The main station 10 of FIG. 4 comprises a transmitted signal combining section 101, a main station optical signal transmitting section 102, a light splitting section 103, a received signal processing section 111, main station optical signal receiving sections 112a and 112b, a setting section 140, and an input section 141. Here, although the input section 141 is shown outside the main station 10, the input section 141 may be provided in the main station 10.

Here, the transmitted signal combining section 101, the main station optical signal transmitting section 102, the light splitting section 103 and the received signal processing section 111 are similar to those shown in FIG. 2 and will not be explained. The main station optical signal receiving sections 112a and 112b convert an optical signal output from each of the sub-stations 20a and 20b separately to an electrical signal type wireless LAN signal. The setting section 140 sets an operation of the received signal processing section 111. The input section 141 is an apparatus with which the user inputs a setting into the setting section 140.

Here, the setting of the setting section 140 will be described. The received signal processing section 111 can receive signals from the main station optical signal receiving sections 112a and 112b separately, and therefore, processes each received signal separately. For example, when the area C and the area D overlap each other, a signal of the same terminal may be transmitted as separate optical signals from different sub-stations. In such a case, when these signals are added together, the amplitude of the signal is increased, so that a signal-to-noise ratio is improved. In addition, by performing the amplitude addition after correcting the phase difference, the signal-to-noise ratio is further improved. If each optical fiber transmission path in the wireless communication system has substantially the same length, a phase difference between each signal is small, so that it is easy to correct the phase difference between each signal. Further, if each optical fiber transmission path in the wireless communication system has substantially the same length, each optical fiber transmission path has substantially the same transmission loss. As a result, an optical signal which is transmitted from each sub-station and reaches the main station has the same size.

Also when the area C and the area D overlap each other, identical signals may be transmitted from the sub-stations 20a and 20b. Therefore, the received signal processing section 111 can select and receive one having the largest amplitude of the identical signals, i.e., can perform diversity reception. Thus, the main station 10 of this configuration example can subject a received signal to various processes. The setting section 140 transmits a control signal to the received signal processing section 111 to instruct it to (or not to) subject the received signal to the above-described process.

Hereinafter, an operation of the main station 10 of this configuration example will be described briefly.

A difference in operation between the main station 10 of FIG. 4 and the main station 10 of FIG. 2 relates to the main station optical signal receiving sections 112a and 112b, the received signal processing section 111, and the setting section 140. The difference will be hereinafter described. Others have the same operations as those of the main station 10 of FIG. 3 and will not be explained.

Optical signals from the optical fiber transmission paths 50a and 50b are received by the main station optical signal receiving sections 112a and 112b, respectively, and are converted to electrical signal type wireless LAN signals, which are in turn output to the received signal processing section 111. The received signal processing section 111 receives a control signal from the setting section 140, processes the wireless LAN signals output from the main station optical signal receiving sections 112a and 112b based on the control signal from the setting section 140, and outputs the resultant signal to each AP 91. Thus, the AP 91 can obtain the electrical signal type wireless LAN signal.

According to this configuration example, the main station 10 converts optical signals transmitted from the sub-stations 20a and 20b separately to electrical signal type wireless LAN signals using the main station optical signal receiving sections 112a and 112b. Therefore, each wireless LAN signal received by the signal processing section 111 can be processed in various manners, thereby making it possible to improve the reception accuracy of a wireless LAN signal.

(Exemplary Configuration of Sub-Station of Embodiment 1)

Figure 5:
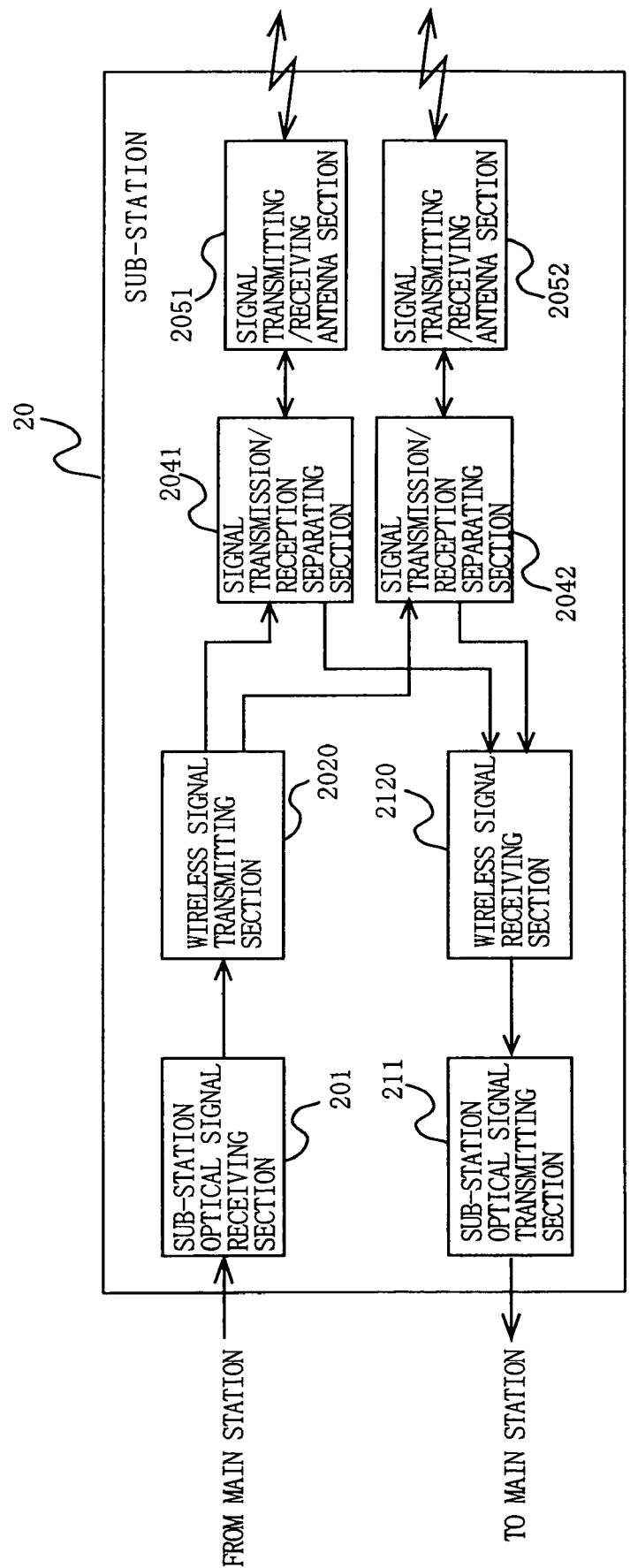
FIG. 5 is a block diagram showing another exemplary configuration of the sub-station 20 according to Embodiment 1 of the present invention.

Another exemplary configuration of the sub-station 20 in the wireless communication system of Embodiment 1 will be described with reference to FIG. 5. FIG. 5 is a block diagram showing a detailed configuration of the sub-station 20 of Embodiment 1. The present exemplary sub-station 20 is applied when APs having two frequency bands are used. Note that, here, the sub-station 20 will be described, assuming that an AP 91 employing a frequency band of 2.4 GHz and an AP 91 employing a frequency band of 5.2 GHz are present.

The sub-station 20 of FIG. 5 comprises a sub-station optical signal receiving section 201, a sub-station optical signal transmitting section 211, a wireless signal transmitting section 2020, a wireless signal receiving section 2120, signal transmission/reception separating sections 2041 and 2042, and signal transmitting/receiving antenna sections 2051 and 2052. Note that the operation of each section is basically similar to that of FIG. 3 and will not be explained. Note that a difference between the sub-station 20 of FIG. 5 and the sub-station 20 of FIG. 3 is the number of signal transmission/reception separating sections and the number of signal transmitting/receiving antenna sections.

An operation of the sub-station 20 of FIG. 5 will be described briefly. Firstly, the case where an optical signal is input from the main station 10 to the sub-station 20 of FIG. 5 will be described. The sub-station optical signal receiving section 201 converts an optical signal output from the main station 10 to an electrical signal type wireless LAN signal, which is in turn output to the wireless signal transmitting section 2020. The wireless signal transmitting section 2020 amplifies the electrical signal type wireless LAN signal output from the sub-station optical signal receiving section 201. The wireless signal transmitting section 2020 outputs a signal in a 2.4-GHz band of the amplified signal to the signal transmission/reception separating section 2041, and a signal in a 5.2-GHz band to the signal transmission/reception separating section 2042. Thereafter, electrical signal type wireless LAN signals output to the signal transmitting/receiving antenna sections 2051 and 2052 are transmitted as radio waves to a terminal. In this manner, an optical signal received by the sub-station 20 is transmitted to a terminal.

Next, the case where a radio wave type wireless LAN signal is input from the main station 10 to the sub-station 20 of FIG. 5 will be described. The signal transmitting/receiving antenna section 2051 receives a radio wave type wireless LAN in the 2.4-GHz frequency band, while the signal transmitting/receiving antenna section 2052 receives a radio wave type wireless LAN signal in the 5.2-GHz frequency band. The signal transmitting/receiving antenna sections 2051 and 2052 output the received signals to the signal transmission/reception separating sections 2041 and 2042. Next, the signal transmission/reception separating sections 2041 and 2042 output the obtained signals to the wireless signal receiving section 2120. The subsequent operations of the wireless signal receiving section 2120 and the sub-station optical signal transmitting section 211 are similar to those of the sub-station 20 of FIG. 3 and will not be explained. Thus, a radio wave type wireless LAN signal received by the sub-station 20 is transmitted to the main station 10.

According to the sub-station 20 of FIG. 5, two antennas, i.e., the signal transmitting/receiving antenna sections 2051 and 2052, are used, whereby signals having two totally different frequencies, such as 2.4 GHz and 5.2 GHz, can be received with high accuracy.

Although the sub-station 20 of Embodiment 1 has two signal transmitting/receiving antenna sections 2051 and 2052, the number of the signal transmitting/receiving antenna sections 2051 and 2052 is not limited to this.

Figure 6:
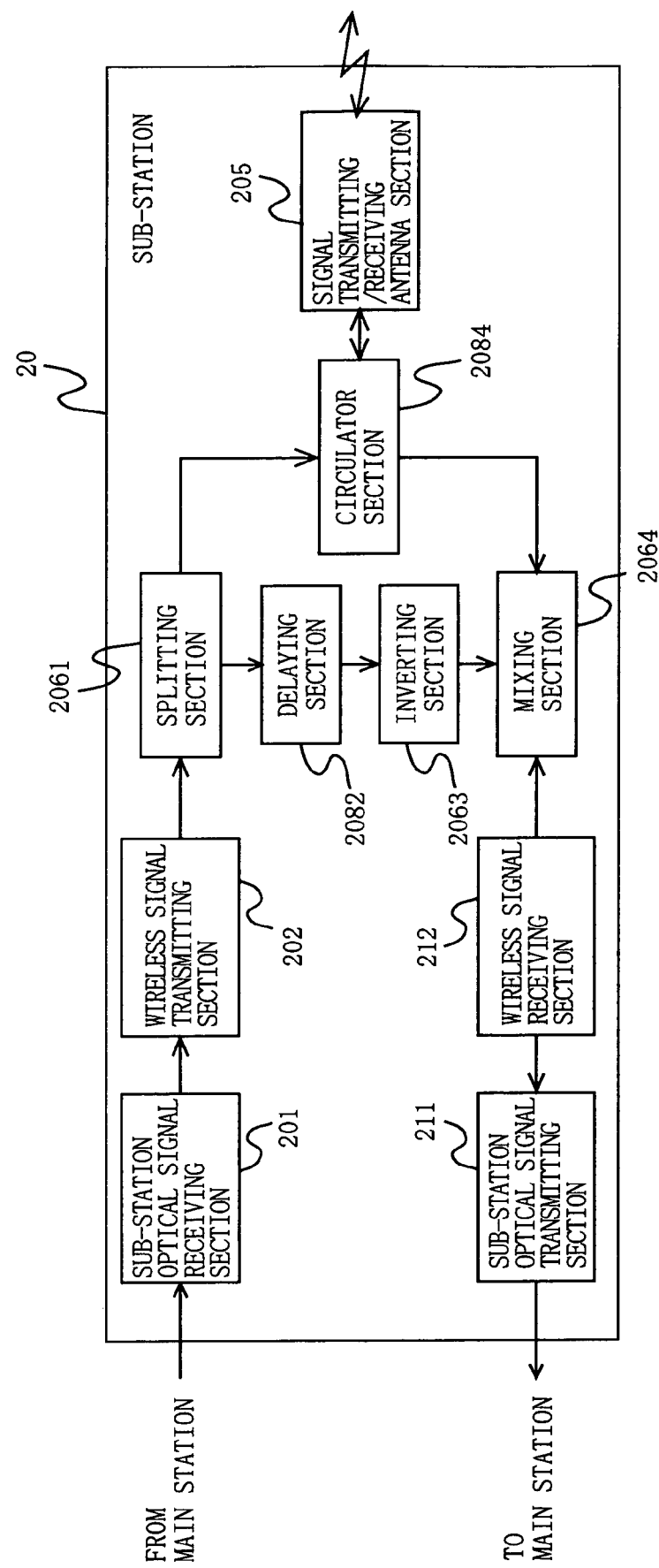
FIG. 6(a) is a block diagram showing another exemplary configuration of the sub-station 20 according to Embodiment 1 of the present invention.
FIG. 6(b) is a block diagram showing another exemplary configuration of the sub-station 20 according to Embodiment 1 of the present invention.
FIG. 6(c) is a block diagram showing another exemplary configuration of the sub-station 20 according to Embodiment 1 of the present invention.

Next, another exemplary configuration of the sub-station 20 in the wireless communication system of Embodiment 1 will be described with reference to FIG. 6(a). FIG. 6(a) is a block diagram showing a detailed configuration of the sub-station 20 of this configuration example. In the sub-station 20, a crosstalk canceller 2046 and an adder 2047 are provided in the sub-station 20 of FIG. 3 so as to reduce crosstalk from a signal transmission system to a signal reception system. Hereinafter, the sub-station 20 of this configuration example will be described in detail.

This exemplary sub-station 20 is similar to the sub-station 20 of FIG. 3, except that the crosstalk canceller 2046 and the adder 2047 are added to the sub-station 20 of FIG. 3. The crosstalk canceller 2046 extracts a signal from the wireless signal transmitting section 202, changes and inverts the amplitude of the extracted signal, and outputs the resultant signal to the adder 2047. The adder 2047 adds a signal output from the signal transmission/reception separating section 204 with the signal output from the crosstalk canceller 2046, and outputs the resultant signal to the wireless signal receiving section 212.

Hereinafter, an operation of the sub-station 20 of this configuration example thus constructed will be described briefly. Note that an operation of the sub-station 20 of this configuration example is basically similar to that of the sub-station 20 of FIG. 3. Therefore, operations of the crosstalk canceller 2046, the adder 2047 and the signal transmission/reception separating section 204 will be mainly described.

The signal transmission/reception separating section 204 outputs a signal from the wireless signal transmitting section 202 to the signal transmitting/receiving antenna section 205, and outputs a signal from the signal transmitting/receiving antenna section 205 to the wireless signal receiving section 212. Here, the signal transmission/reception separating section 204 ideally performs the above-described operation. In fact, however, not only the signal from the wireless signal transmitting section 202 is transmitted via the signal transmission/reception separating section 204 to the signal transmitting/receiving antenna section 205, but also a portion of the signal leaks into the wireless signal receiving section 212 (occurrence of crosstalk).

Therefore, the crosstalk canceller 2046 extracts a signal from the wireless signal transmitting section 202, changes and inverts the amplitude of the signal, and outputs the resultant signal. Next, the adder 2047 adds an output of the crosstalk canceller 2046 with an output of the signal transmission/reception separating section 204, and outputs the resultant signal to the wireless signal receiving section 212. As a result, the above-described crosstalk in the signal transmission/reception separating section 204 is canceled by the adder 2047. Note that, in the crosstalk canceller 2046, the amplitude and phase are adjusted in a manner which cancels crosstalk.

As described above, the sub-station 20 is provided with a crosstalk canceling function, thereby reducing crosstalk from the signal transmission system to the signal reception system. Generally, crosstalk to the signal reception system due to noise occurring in a light receiving system of the sub-station optical signal receiving section 201 often reaches a level which is not negligible compared to a received wireless signal 60. However, it is difficult to remove the noise using a filter or the like. Therefore, it is particularly effective to cancel crosstalk as in this configuration example.

Although what is canceled is represented by a signal, the crosstalk canceling function is also similarly effective for noise.

Next, an exemplary detailed configuration of the sub-station 20 of FIG. 6(a) will be described with reference to FIG. 6(b). FIG. 6(b) is a block diagram showing a detailed configuration of the sub-station 20. Here, the sub-station 20 of this configuration example is similar to the sub-station 20 of FIG. 3, except that a splitting section 2061, a delaying section 2082, an inverting section 2063, and a mixing section 2064 are further provided into the sub-station 20 of FIG. 3. Note that the signal transmission/reception separating section 204 is a circulator section 2084 as a specific example.

The splitting section 2061 splits and outputs a signal output from the wireless signal transmitting section 202 to the circulator section 2084 and the delaying section 2082. The delaying section 2082 delays the phase of the signal output from the splitting section 2061 by a predetermined amount. The inverting section 2063 inverts the amplitude of the signal output from the delaying section 2082. Generally, the inverting section 2063 is implemented as an inverting amplifier. The mixing section 2064 adds a signal from the circulator section 2084 with the signal output from the inverting section 2063.

An operation of the thus-constructed sub-station 20 of FIG. 6(b) will be hereinafter described. Note that an operation of the sub-station 20 of this configuration example is basically the same as that of the sub-station 20 of FIG. 6(a), and therefore, operations of only different portions will be described.

A portion of a signal output from the wireless signal transmitting section 202 is transferred by the splitting section 2061 to the delaying section 2082, while the other portion thereof is mostly output to the circulator section 2084. A signal output from the circulator section 2084 is output to the signal transmitting/receiving antenna section 205. A signal output from the signal transmitting/receiving antenna section 205 to the circulator section 2084 is output from the circulator section 2084 via the mixing section 2064 to the wireless signal receiving section 212. Here, the circulator section 2084 ideally operates as described above. In fact, however, not only a signal output from the splitting section 2061 is output by the circulator section 2084 to the signal transmitting/receiving antenna section 205, but also a portion of the signal leaks as crosstalk to the mixing section 2064.

Therefore, the splitting section 2061 splits the signal output from the wireless signal transmitting section 202 and outputs a portion thereof to the delaying section 2082. The delaying section 2082 provides an optimum delay to the signal, and outputs the resultant signal to the inverting section 2063. The inverting section 2063 inverts the amplitude of the signal. Next, as with the adder 2047, the mixing section 2064 adds an output of the circulator section 2084 with an output of the inverting section 2063, and outputs the resultant signal to the wireless signal receiving section 212. As a result, the above-described crosstalk in the circulator section 2084 is canceled in the mixing section 2064. Note that the amplitude is adjusted in the splitting section 2061, the delaying section 2082, the inverting section 2063 and the mixing section 2064, and the phase is optimized in the delaying section 2082, in a manner which cancels the crosstalk. Even if the delaying section 2082 and the inverting section 2063 are in reverse positions, the same function is achieved.

Figure 6C:
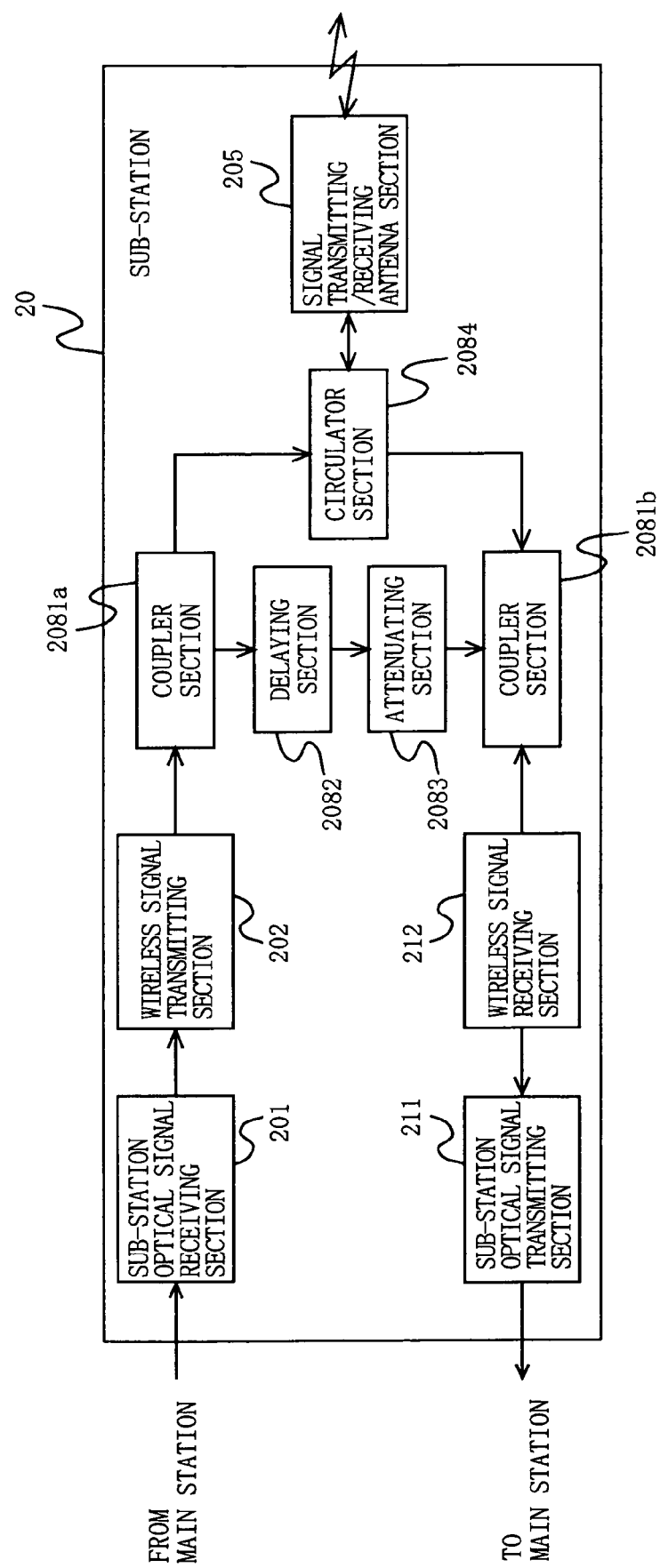

Next, another exemplary detailed configuration of the sub-station 20 of FIG. 6(a) will be described with reference to FIG. 6(c). In FIG. 6(c), the sub-station 20 comprises a sub-station optical signal receiving section 201, a wireless signal transmitting section 202, a signal transmitting/receiving antenna section 205, a sub-station optical signal transmitting section 211, a wireless signal receiving section 212, coupler sections 2081a and 2081b, a delaying section 2082, an attenuating section 2083, and a circulator section 2084. Here, the sub-station optical signal receiving section 201, the wireless signal transmitting section 202, the signal transmitting/receiving antenna section 205, the sub-station optical signal transmitting section 211, and the wireless signal receiving section 212 are similar to those of FIG. 6(a) and will not be explained. Also, the delaying section 2082 and the circulator section 2084 are similar to those of FIG. 6(b) and will not be explained.

The coupler section 2081a splits a signal from the wireless signal transmitting section 202 and outputs a portion of the signal to the delaying section 2082. The delaying section 2082 provides an optimum delay to the signal output from the coupler section 2081a, and outputs the resultant signal to the attenuating section 2083. The attenuating section 2083 adjusts the amplitude of the signal output from the delaying section 2082 and outputs the resultant signal. Next, the coupler section 2081b adds the signal output from the circulator section 2084 with the signal output from the attenuating section 2083, and outputs a signal obtained by the addition to the wireless signal receiving section 212.

Here, the coupler sections 2081a and 2081b are implemented as directional couplers. The directional coupler provides the phase difference of 90 degrees to a signal when splitting or combining signal waves. Therefore, by passing a signal through the two coupler sections 2081a and 2081b, the phase of the signal is shifted by 180 degrees. In other words, the amplitude of the signal is inverted.

As described above, according to the exemplary configuration of FIG. 6(c), crosstalk occurring in the circulator section 2084 is canceled in the coupler section 2081b. Note that the amplitude is adjusted in the coupler sections 2081a and 2081b, the delaying section 2082 and the attenuating section 2083, while the phase is adjusted in the delaying section 2082, in a manner which cancels the crosstalk. If a ratio for splitting or combining signal waves is optimum in the two coupler sections 2081a and 2081b, the attenuating section 2083 is not required.

According to the configuration of FIG. 6(c), the coupler sections 2081a and 2081b, the delaying section 2082, and the attenuating section 2083 are passive parts which can operate without power supply. Therefore, the sub-station 20 of FIG. 6(c) advantageously resists aging and changing its temperature in addition to no requirement of power source.

Next, another exemplary configuration of the sub-station 20 in the wireless communication system of Embodiment 1 will be described with reference to FIG. 7. FIG. 7 is a block diagram showing a detailed configuration of the sub-station 20 of this configuration example. This sub-station 20 is different from the sub-station of FIG. 3 in that the signal transmitting/receiving antenna section 205 is divided into a transmitting antenna section 203 and a receiving antenna section 213 and the signal transmission/reception separating section 204 is not provided. The sub-station 20 is directed to reduction of crosstalk. Hereinafter, the sub-station 20 will be described in detail.

The sub-station 20 of this configuration example comprises a sub-station optical signal receiving section 201, a wireless signal transmitting section 202, a transmitting antenna section 203, a sub-station optical signal transmitting section 211, a wireless signal receiving section 212, and a receiving antenna section 213. Note that the sub-station optical signal receiving section 201, the wireless signal transmitting section 202, the sub-station optical signal transmitting section 211 and the wireless signal receiving section 212 are similar to those of FIG. 3 and will not be explained. Here, the transmitting antenna section 203 transmits a wireless LAN signal output from the wireless signal transmitting section 202 to a terminal in the form of a radio wave. The receiving antenna section 213 receives the wireless LAN signal transmitted in the form of a radio wave, and outputs the received signal to the wireless signal receiving section 212.

Hereinafter, an operation of the thus-constructed sub-station 20 of this configuration example will be described.

The sub-station optical signal receiving section 201 converts an optical signal input from an optical fiber transmission path to an electrical signal type wireless LAN signal, which is in turn output to the wireless signal transmitting section 202. Next, the wireless signal transmitting section 202 subjects the electrical signal type wireless LAN signal output from the sub-station optical signal receiving section 201 to amplification or the like, and outputs the resultant signal to the transmitting antenna section 203. The transmitting antenna section 203 transmits the electrical signal type wireless LAN signal output from the wireless signal transmitting section 202 to the air in the form of a radio wave. As a result, the wireless LAN signal is transmitted to a terminal.

The radio wave type wireless LAN signal received by the receiving antenna section 213 is output to the wireless signal receiving section 212. The wireless signal receiving section 212 converts the signal from the receiving antenna section 213 to a signal suitable for the sub-station optical signal transmitting section 211, and outputs the resultant signal to the sub-station optical signal transmitting section 211. Next, the sub-station optical signal transmitting section 211 converts the electrical signal type wireless LAN signal from the wireless signal receiving section 212 to an optical signal, which is in turn transmitted through an optical fiber transmission path to the main station 10. As a result, the optical signal reaches the main station 10.

In the sub-station 20 of this configuration example, an antenna for signal transmission and an antenna for signal reception are separately provided, so that the signal transmission system and the signal reception system are separate circuits. Therefore, it is possible to reduce crosstalk between the signal transmission system and the signal reception system.

Directional antennas are used as the transmitting antenna and the receiving antenna, and the directional antennas are oriented into optimum directions, thereby making it possible to reduce crosstalk between the two antennas (crosstalk from the signal transmission system to the signal reception system). Note that the directional antenna can be applied to sub-stations in other embodiments.

In the sub-station 20 of this configuration example, the signal transmission system and the signal reception system are separate circuits, and therefore, can be accommodated in separate housings. As a result, crosstalk between the signal transmission system and the signal reception system is further reduced. Note that, in this case, the sub-station 20 has two housings, and therefore, two optical fibers are required to connect the housings.

According to the sub-station 20 of this configuration example, the optical fiber transmission path is composed of two optical fibers for upload and download, and therefore, the above-described two housings can be provide data distance. Here, when installing the sub-station 20, if a person installs the housings in a manner which reduces crosstalk between the signal transmission system and the signal reception system, i.e., crosstalk from the transmitting antenna section 203 to the receiving antenna section 213, to a desired level or less, a degradation in performance in the signal reception system due to the crosstalk can be at a negligible level. As a result, the crosstalk problem is completely solved.

Note that the sub-station 20 of FIGS. 6(a) to (c) and the sub-station 20 of FIG. 7 can be combined. FIG. 8 is a block diagram showing a configuration of the sub-station 20 in this case.

In the configuration example of FIG. 7, as described above, the signal transmission system and the signal reception system are separate systems, thereby making it difficult for crosstalk to occur. However, when the signal transmission system and the signal reception system are accommodated in the same housing, crosstalk occurs even though the signal transmission system and the signal reception system are separate systems. To avoid this, by providing a crosstalk canceling section 206 in the sub-station 20 as shown in FIG. 8, the crosstalk between the signal transmission system and the signal reception system is effectively reduced.

Figure 9:
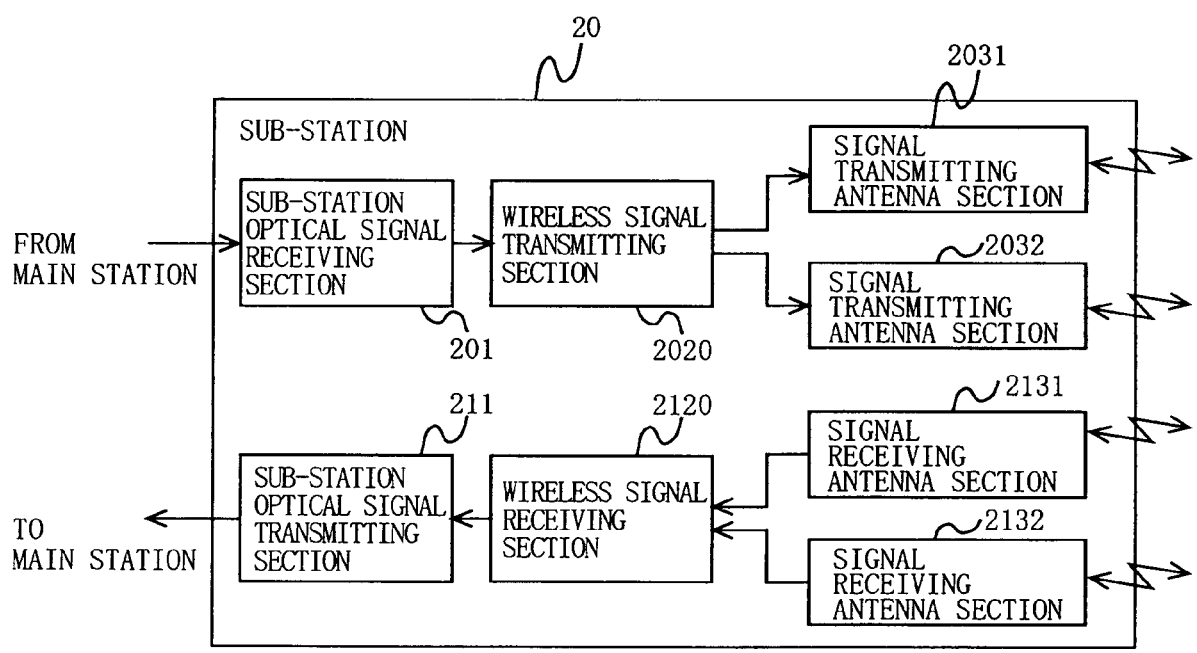
FIG. 9 is a block diagram showing another exemplary configuration of the sub-station 20 according to Embodiment 1 of the present invention.

Note that a plurality of the sub-station 20 of Embodiment 1 may be provided for each signal frequency received by the transmitting antenna section 203 and the receiving antenna section 213 of FIG. 7. FIG. 9 is a block diagram showing a configuration of the sub-station 20 in this case. With this configuration, similar to the sub-station 20 of FIG. 5, two antennas are employed for each system (i.e., transmitting antenna sections 2031 and 2032 and receiving antenna sections 2131 and 2132), so that signals in two completely different frequency bands, such as 2.4 GHz and 5.2 GHz, can be received with high accuracy. Further, crosstalk occurring between the signal transmission system and the signal reception system is reduced.

Figure 10:
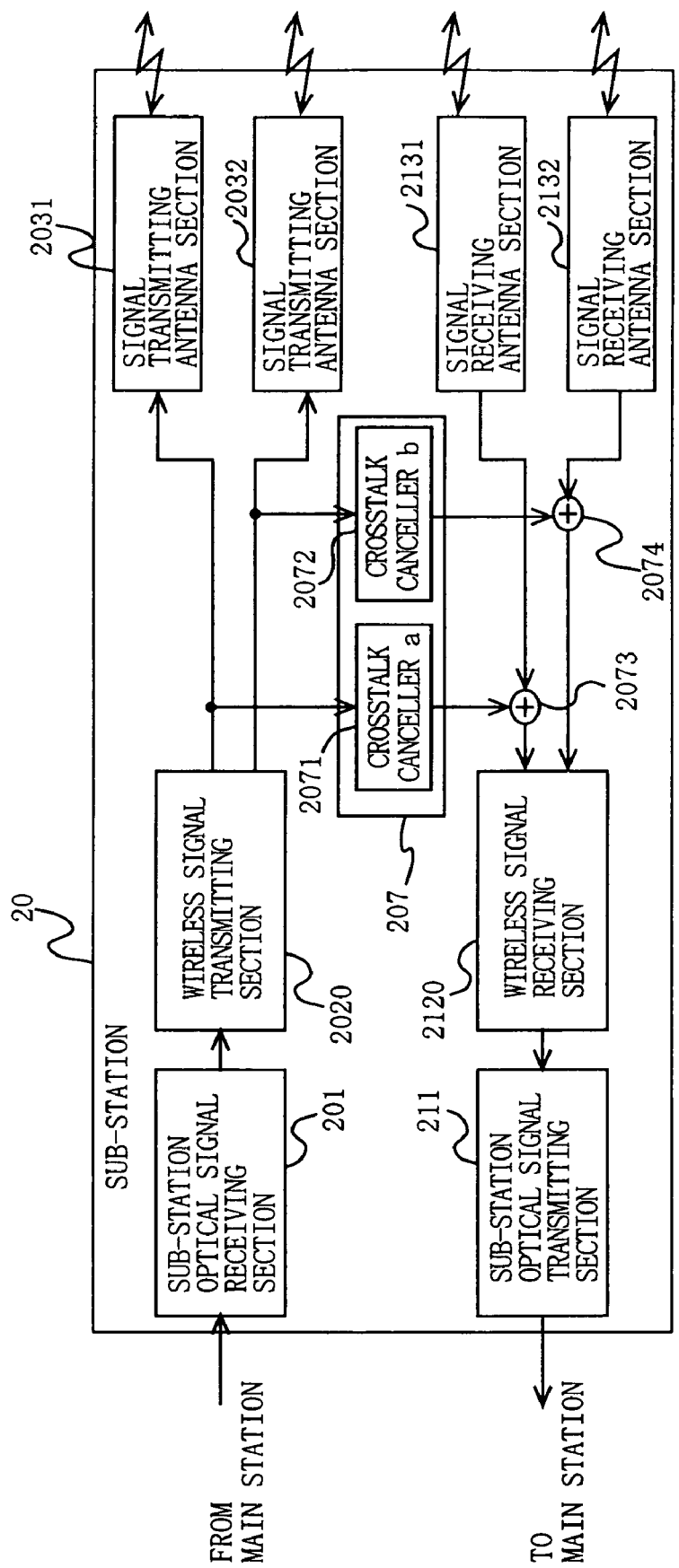
FIG. 10 is a block diagram showing another exemplary configuration of the sub-station 20 according to Embodiment 1 of the present invention.

Note that the sub-station 20 of FIG. 8 and the sub-station 20 of FIG. 9 can be combined. FIG. 10 is a block diagram showing a configuration of the sub-station 20 in this case. With this configuration, crosstalk occurring between the signal transmission system and the signal reception system is reduced, and since two antennas are employed for each system (i.e., transmitting antenna sections 2031 and 2032 and receiving antenna sections 2131 and 2132), signals in two completely different frequency bands, such as 2.4 GHz and 5.2 GHz, can be received with high accuracy. Further, a crosstalk canceling section may be provided between the wireless signal transmitting section 2020 and the wireless signal receiving section 2120. In this case, although it is difficult to cancel crosstalk for each frequency band, the configuration of the sub-station 20 is advantageously simple.

Figure 11:
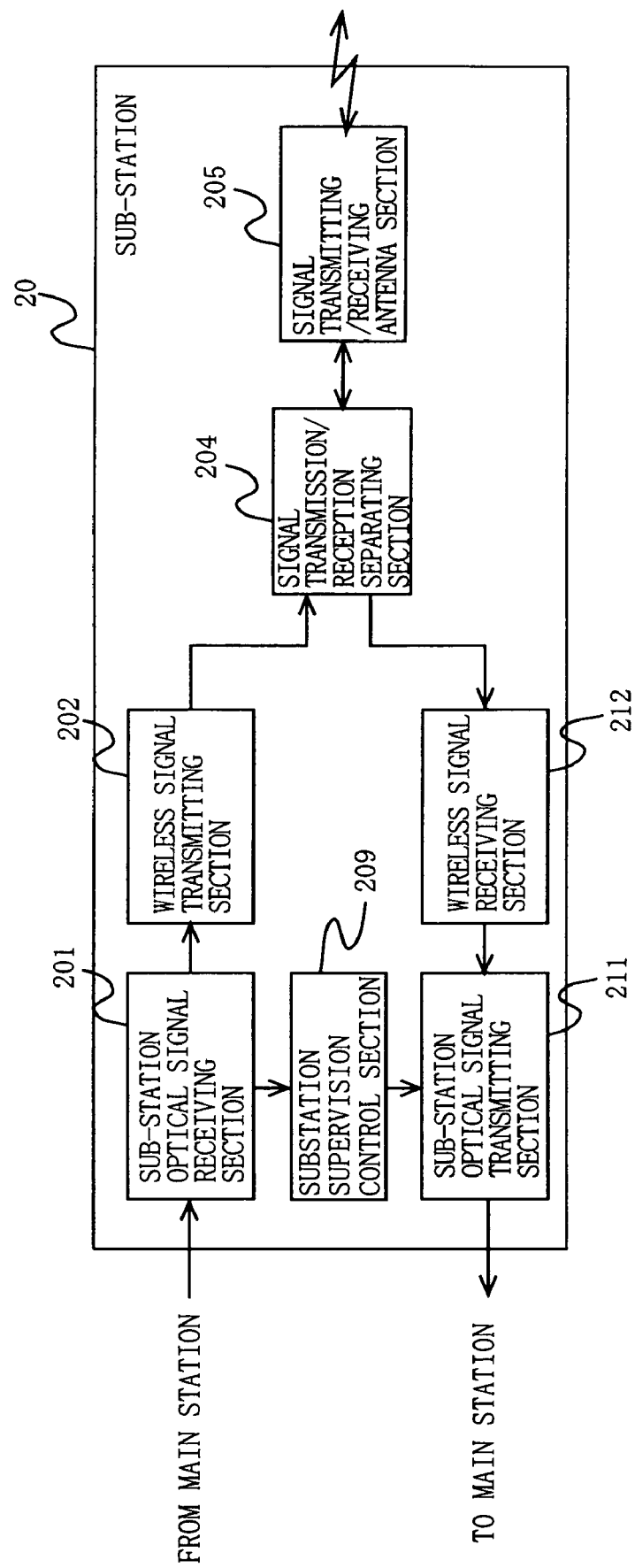
FIG. 11 is a block diagram showing another exemplary configuration of the sub-station 20 according to Embodiment 1 of the present invention.

Next, another exemplary configuration of the sub-station 20 in the wireless communication system of Embodiment 1 will be described with reference to FIG. 11. FIG. 11 is a block diagram showing a detailed configuration of the sub-station 20 of this configuration example. The sub-station 20 of FIG. 11 has a function to transmit, to the main station 10, information about the presence or absence of a signal, signal size, temperature, voltage or the like of each location in the sub-station 20. Note that the sub-station 20 of FIG. 11 is similar to the sub-station 20 of FIG. 3, except for a sub-station supervision control section 209.

The sub-station optical signal receiving section 201, the wireless signal transmitting section 202, the signal transmission/reception separating section 204, the signal transmitting/receiving antenna section 205, the sub-station optical signal transmitting section 211 and the wireless signal receiving section 212 are similar to those of FIG. 3 and will not be explained. The sub-station supervision control section creates a signal for supervision which includes information about the presence or absence of a signal, signal size, temperature, voltage or the like of each location in the sub-station 20.

An operation of the thus-constructed sub-station 20 will be hereinafter described. Note that the supervision signal is transmitted from the sub-station 20 as required or continuously.

Here, an operation of the sub-station 20 will be described, in which the sub-station 20 receives an instruction from the main station 10 and outputs a supervision signal. The main station 10 uses a control signal to instruct the sub-station 20 which requires a supervision signal, to transmit the supervision signal to the sub-station 20. Next, the sub-station optical signal receiving section 201 detects the control signal and informs the sub-station supervision control section 209 that the control signal has been detected. In response to this, the sub-station supervision control section 209 outputs information which has been collected about a state of the sub-station 20, as a supervision signal to the sub-station optical signal transmitting section 211. The sub-station optical signal transmitting section 211 frequency-division-multiplexes the supervision signal from the sub-station supervision control section 209 with a signal from the wireless signal receiving section 212, and converts the frequency-division-multiplexed signal to an optical signal. Thereafter, the optical signal is transmitted from the sub-station optical signal transmitting section 211 onto an optical fiber transmission path.

On the other hand, in the main station 10 of FIG. 2, the light combining section 113 receives the supervision signal and outputs it to the main station optical signal receiving section 112. The main station optical signal receiving section 112 converts the supervision signal from an optical signal form to an electrical signal form, and outputs the resultant signal to the received signal processing section 111. As a result, the received signal processing section 111 can obtain the supervision signal and process a signal to be output to an AP by utilizing the supervision signal.

As described above, when an instruction from the main station 10 is present, only the sub-station 20 that receives the instruction transmits a supervision signal. Therefore, in the main station 10, supervision signals from a plurality of the sub-stations 20 do not temporally overlap or interfere with one other. Therefore, it is advantageous that parallel processing is not required in the main station 10.

Further, when the carrier frequency of a supervision signal is designed to be different between each sub-station 20, the sub-station 20 can always output a supervision signal. In other words, since supervision signals from the sub-stations 20 are separated and are independent in terms of frequency, even if the sub-stations 20 always output supervision signals, the supervision signals do not interfere with one another.

With this configuration, the carrier frequencies of the supervision signals are different between each sub-station 20. Therefore, in the main station 10, the sub-station 20 can be advantageously easily identified based on a difference in carrier frequency of a supervision signal. Needless to say, in this configuration, only when an instruction from the main station 10 is present, only the sub-station 20 that responds and receives the instruction may transmit a supervision signal.

With the above-described configuration, the main station 10 can collect state information about all sub-stations. Therefore, when the main station 10 has a function to output information collected from the sub-station 20 and information about each section in the main station itself together to the outside, the information can be externally used as a supervision signal for an entire wireless signal optical transmission system.

When the main station 10 is constructed to have the above-described function, a supervision signal for an entire wireless signal optical transmission system is obtained from the main station 10, thereby making it possible to easily supervise a state of the entire wireless communication system. Thus, such a technique is very practical.

Further, with this exemplary configuration, the sub-station 20 informs the main station 10 of a state thereof as a supervision signal. Therefore, the main station 10 can know states of all of the sub-stations 20. In addition, since the supervision signal is frequency-division-multiplexed with a wireless LAN signal and the resultant signal is transferred, no other transmission path for the supervision signal is required.

Figure 12:
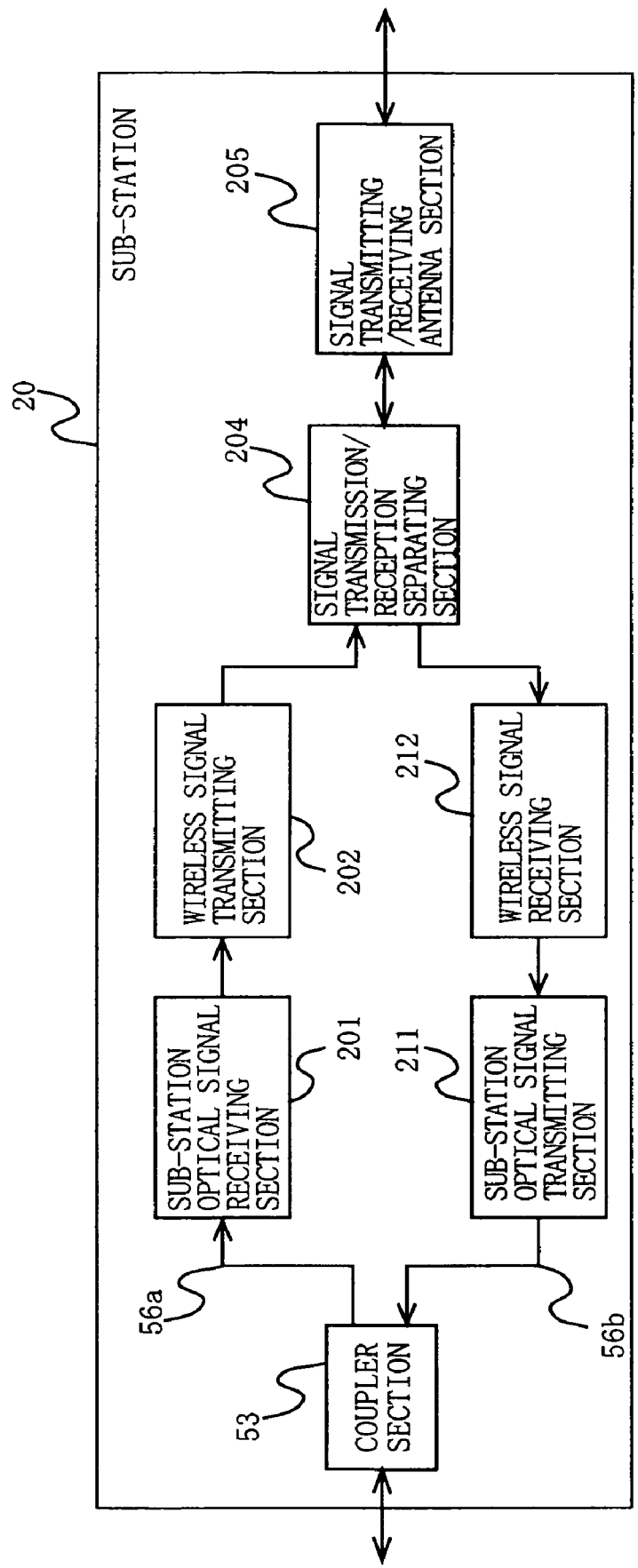
FIG. 12 is a block diagram showing another exemplary configuration of the sub-station 20 according to Embodiment 1 of the present invention.

Note that the sub-station 20 of Embodiment 1 and the sub-stations 20 of the above-described configuration examples may be connected to the main station 10 via a single-conductor bidirectional optical fiber or a single optical fiber for each of upload and download. Note that, in the case of the single-conductor optical fiber, the sub-station 20 is provided with an optical coupler section 53 as shown in FIG. 12. In this case, an optical coupler section is further provided between the main station and the optical fiber.

Embodiment 2

Hereinafter, an entire configuration of a wireless communication system according to Embodiment 2 of the present invention will be described with reference to the drawings. Note that the entire configuration of the wireless communication system of Embodiment 2 is similar to that of Embodiment 1, and therefore, FIG. 1 is referenced.

The SW 70 and the APs 91a to 91e are similar to those of Embodiment 1 and will not be explained. Also, the sub-stations 20a and 20b are similar to those of Embodiment 1, and therefore, FIG. 3 is referenced.

Here, a main station 10 of the wireless communication system of Embodiment 2 will be described. The main station 10 of Embodiment 2 converts an electrical signal type wireless LAN signal input from the APs 91a to 91e to an optical signal, and selectively outputs the optical signal to each of the sub-stations 20a and 20b. More specifically, the main station 10 outputs the optical signal to both or one of the sub-station 20a and the sub-station 20b in accordance with a setting of the user. Hereinafter, the main station 10 of Embodiment 2 will be described with reference to FIG. 13.

The main station 10 of Embodiment 2 comprises main station optical signal transmitting sections 102a and 102b, a received signal processing section 111, main station optical signal receiving sections 112a and 112b, a transmitted signal processing section 121, an input section 141, and a setting section 142.

Here, the received signal processing section 111, and the main station optical signal receiving sections 112a and 112b are similar to those of FIG. 4 and will not be explained.

The transmitted signal processing section 121 outputs a signal output from each AP 91 to both or one of the main station optical signal transmitting sections 102a and 102b in accordance with a setting in the setting section 142. Hereinafter, a configuration of the transmitted signal processing section 100 will be described with reference to FIG. 14(a). FIG. 14(a) is a diagram showing an exemplary configuration of the transmitted signal processing section 100.

The transmitted signal processing section 121 comprises splitting sections 1211a to 1211d, connectors 1212a to 1212c, and combining sections 1213a to 1213c. The splitting sections 1211a to 1211d are connected to the APs 91 with one-to-one correspondence. The transmitted signal processing section 121 splits an electrical signal type wireless LAN signal output from each AP 91 and outputs the resultant signals to the connectors 1212a to 1212c. The connectors 1212a to 1212c are switch portions which determine which signal of the electrical signal type wireless LAN signals output from the splitting sections 1211a to 1211d is to be output in accordance with the setting in the setting section 142. The combining sections 1213a to 1213c are provided in association with the connectors 1212a to 1212c to combine electrical signal type wireless LAN signals output from the respective corresponding connectors 1212a to 1212c and output the resultant signals to the main station optical signal transmitting sections 102a to 102c. Note that, for the sake of brevity, four APs and three sub-stations are connected to the transmitted signal processing section 121 of FIG. 14(a), and five APs 91 and two sub-stations 20 are connected to the wireless communication system of FIG. 1. Therefore, when the transmitted signal processing section 121 is applied to the wireless communication system of FIG. 1, five splitting sections 1211 are present, and two connectors 1212 and two combining sections 1213 are present.

The main station optical signal transmitting sections 102a to 102c convert an electrical signal type wireless LAN signal output from the combining sections 1213a to 1213c to an optical signal.

The setting section 142 designates which electrical signal type wireless LAN signal is to be output to each of the main station optical signal transmitting sections 102a to 102c, with respect to the connectors 1212a to 1212d, in accordance with the user's input in the input section 141. More specifically, the setting section 142 transmits a control signal to each of the connectors 1212a to 1212c based on an input from the user. Each of the connectors 1212a to 1212c, which receives the control signal, turns each switch ON or OFF in accordance with the control signal.

Here, the setting of the setting section 142 will be described in detail. The setting section 142 has communication routes from the APs 91 to the sub-stations 20. The communication route indicates to which sub-station 20 a signal output from each AP 91 is output. The case where the setting section 142 sets a communication route of the AP 91a will be described. The user determines to which sub-station 20 the AP 91a outputs a signal. Note that, in FIG. 14(a), the AP 91a is assumed to output a signal to all of the sub-stations 20a to 20c. Therefore, the user uses the input section 141 to set the setting section 142 so that a signal output from the AP 91a is output to the sub-stations 20a to 20c. Thereby, the setting of the setting section 142 is ended. Thereafter, the setting section 142 outputs a control signal to each of the connectors 1212a to 1212c so that each switch is turned ON or OFF. Although the AP 91a has been described in the foregoing description, the setting section 142 is set using a similar procedure for the other APs 91.

Hereinafter, an operation of the transmitted signal processing section 121 will be described with reference to FIG. 14(a).

Electrical signal type wireless LAN signals having frequencies of f1, f2, f3 and f4 are input to the respective splitting sections 1211a to 1211c from the APs 91a to 91d. Next, each of the splitting sections 1211a to 1211c splits the obtained electrical signal type wireless LAN signal and outputs the resultant signal to each of the connectors 1212a to 1212c. As a result, each of the connectors 1212a to 1212c obtains all of the electrical signal type wireless LAN signals having frequencies of f1, f2, f3 and f4.

Next, the connectors 1212a to 1212c output an electrical signal type wireless LAN signal to the respective combining sections 1213a to 1213c only through their own switch which is turned ON. Note that, in Embodiment 2, the connector 1212a is set so that all electrical signal type wireless LAN signals are output. The connector 1212b is set so that the electrical signal type wireless LAN signal having a frequency of f2 and the electrical signal type wireless LAN signal having a frequency of f4 are output. The connector 1212c is set so that the electrical signal type wireless LAN signal having a frequency of f1, the electrical signal type wireless LAN signal having a frequency of f2 and the electrical signal type wireless LAN signal having a frequency of f4 are output. The combining sections 1213a to 1213c combine the obtained electrical signal type wireless LAN signals by frequency-multiplexing. As a result, a combined wireless LAN signal in the form of an electrical signal is created as indicated on the right-hand side of FIG. 14(a). Thereafter, the main station optical signal transmitting sections 102a to 102c convert the obtained electrical signal type combined wireless LAN signal to an optical signal, which is in turn output to each sub-station 20. Thus, the operation of the transmitted signal processing section 121 has been described.

Note that the operation of each sub-station 20 and the operation of each of the main station optical signal receiving sections 112a to 112c and the received signal processing section 111 are similar to those of Embodiment 1 and will not be explained.

As described above, according to the wireless communication system of Embodiment 2, an electrical signal type wireless LAN signal obtained from each AP 91 can be output to any arbitrary area. Therefore, a terminal can receive an electrical signal type wireless LAN signal output from each AP 91 in a plurality of areas. As a result, the accommodation capacity of each AP 91 can be allocated for a plurality of areas, so that the accommodation capacity of the APs 91 can be effectively utilized as in Embodiment 1.

Further, according to the wireless communication system of Embodiment 2, a sub-station 20 to which a wireless LAN signal is to be transmitted can be set by the user. Therefore, no unnecessary signal is transmitted to each sub-station 20, so that only a necessary wireless LAN signal is transmitted to each area. As a result, the security of the wireless communication system can be improved.

Further, according to the wireless communication system of Embodiment 2, no unnecessary signal is transmitted to each sub-station 20. This is preferable in terms of optical transmission. In addition, the sub-station 20 has a simple operation.

Further, according to the wireless communication system of Embodiment 2, the main station optical signal transmitting sections 102a and 102b are provided individually for each optical fiber transmission path. Therefore, it is possible to easily obtain a large light output compared to when a light output of a single light emitting element is split.

Note that, in the wireless communication system of Embodiment 2, each sub-station described in the exemplary configuration of the sub-station of Embodiment 1 may be applied.

(Exemplary Configuration of Main Station of Embodiment 2)

Figure 13:
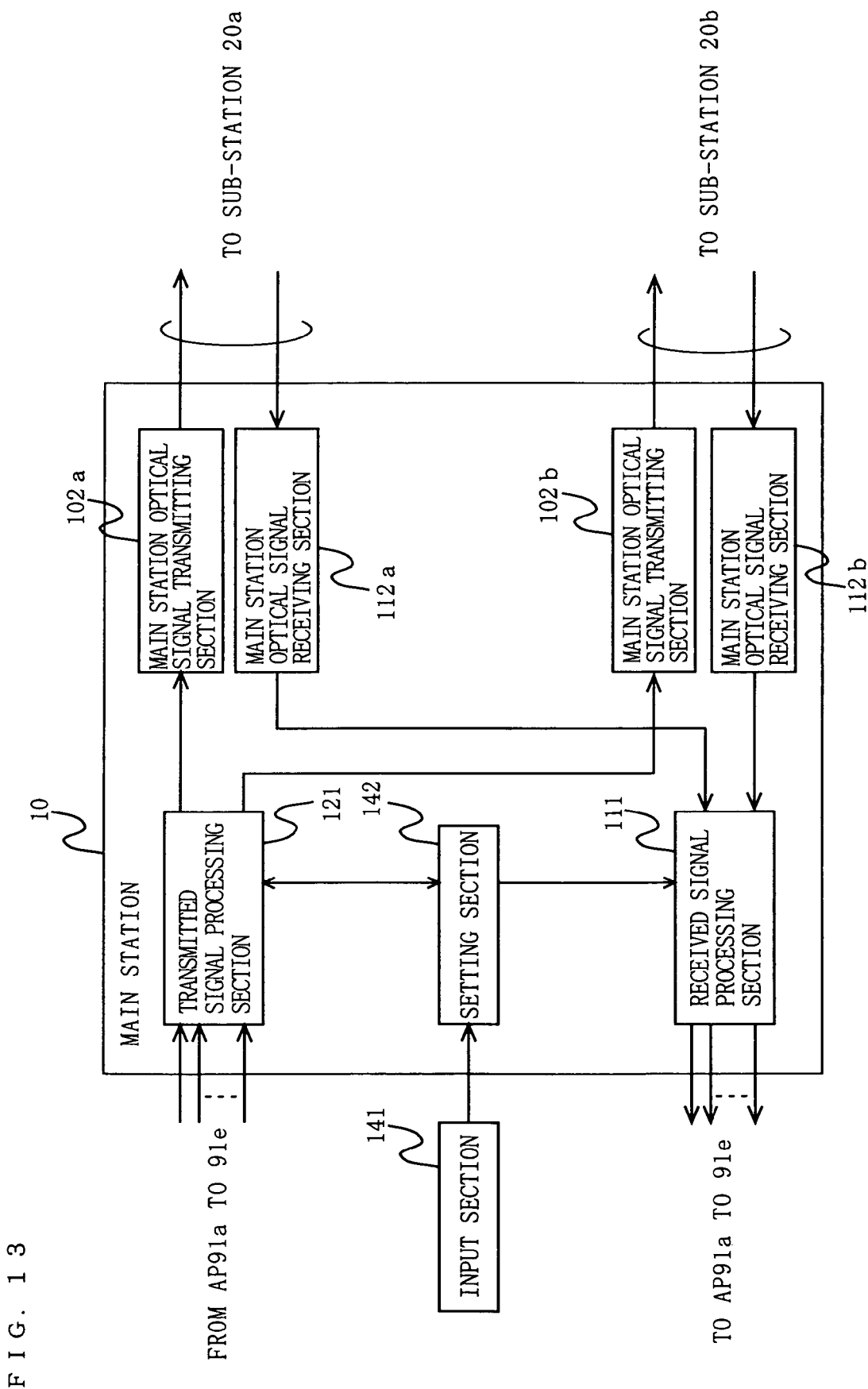
FIG. 13 is a block diagram showing an exemplary configuration of a main station 10 according to Embodiment 2 of the present invention.
Figure 14B:
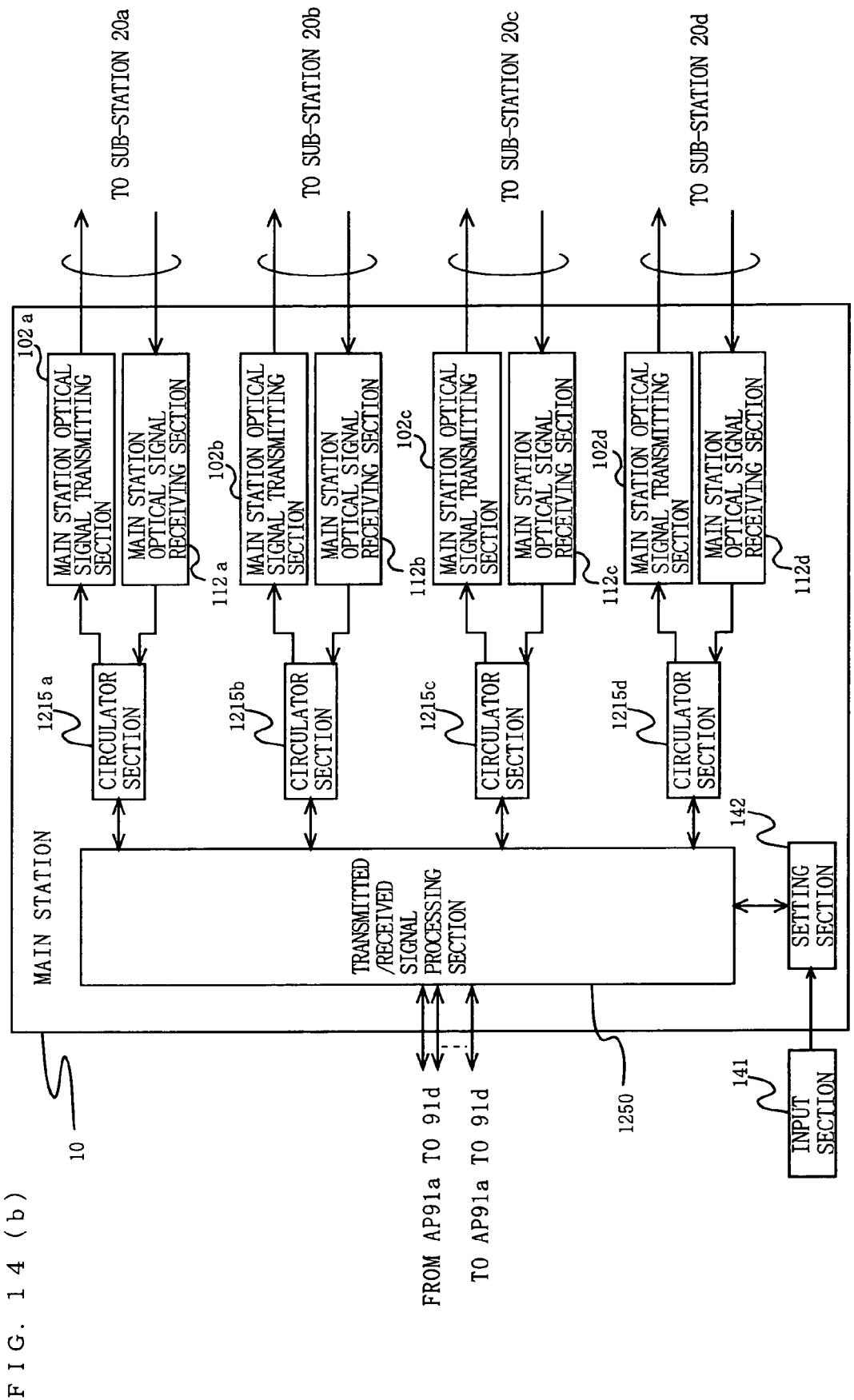
FIG. 14(b) is a block diagram showing another exemplary configuration of the main station 10 according to Embodiment 2 of the present invention.

Here, another exemplary configuration of the main station 10 of Embodiment 2 will be described with reference to the drawings. In the main station 10 of this configuration example, the transmitted signal processing section 121 and the received signal processing section 111 of the main station 10 of FIG. 13 are integrated together. Further, a specific configuration of the main station 10 of this configuration example is shown. FIG. 14(b) is a block diagram showing a configuration of the main station 10 of this configuration example. Note that, in this configuration example, it is assumed that four APs 91 are present and also four sub-station 20 are present. Note that the numbers of the APs 91 and the sub-stations 20 are not limited to this.

The main station 10 of FIG. 14(b) comprises a transmitted/received signal processing section 1250, circulator sections 1215a to 1215d, main station optical signal transmitting sections 102a to 102d, main station optical signal receiving sections 112a to 112d, an input section 141, and a setting section 142.

The main station optical signal transmitting section 102 converts an electrical signal type wireless LAN signal output from the circulator section 1215 to an optical signal, which is in turn output to a sub-station 20 connected thereto. The main station optical signal receiving section 112 converts an optical signal transmitted from a sub-station 20a connected thereto to an electrical signal type wireless LAN signal, which is in turn output to the circulator section 1215. The circulator section 1215 transmits the electrical signal type wireless LAN signal output from the main station optical signal receiving section 112 to the transmitted/received signal processing section 1250, and also outputs an electrical signal type wireless LAN signal output from the transmitted/received signal processing section 1250 to the main station optical signal transmitting section 102. The setting section 142 sets an operation of the transmitted/received signal processing section 1250. The setting of the setting section 142 is similar to that described in FIG. 13 and will not be described in detail. The input section 141 is an apparatus with which the user inputs a setting of the setting section 142.

The transmitted/received signal processing section 1250 has a function which is obtained by combining the transmitted signal processing section 121 and the received signal processing section 111 of FIG. 13. Specifically, the transmitted/received signal processing section 1250 outputs a signal output from each of the APs 91a to 91d to the main station optical signal transmitting sections 102a to 102d in accordance with the setting of the setting section 142. Further, the transmitted/received signal processing section 1250 outputs signals input from the main station optical signal receiving sections 112a to 112d to the desired APs 91a to 91d in accordance with the setting of the setting section 142. Note that the transmitted/received signal processing section 121 has the configuration of FIG. 14(c). Hereinafter, a detailed configuration of the transmitted/received signal processing section 1250 will be described with reference to FIG. 14(c).

The transmitted/received signal processing section 1250 of FIG. 14(c) comprises a coupler group 1251, a switch group 1252, and a coupler group 1253. The coupler group 1251 is composed of a plurality of couplers, and splits signals input from the APs 91 into the number of the sub-stations 20. Note that four sub-station 20 are present in FIG. 14(c). Therefore, for example, a coupler connected to the AP 91a splits a signal into two, and then the two split signals are each split into two signals. As a result, the signal input from the AP 91a is split into four. Note that signals input from the other APs 91 are similarly split.

The switch group 1252 includes a plurality of switch sections, and determines which signal of the electrical signal type wireless LAN signals output from the coupler group 1251 is output, in accordance with a setting of the setting section 142.

The coupler group 1253 is composed of a plurality of couplers, and combines an electrical signal type wireless LAN signal output from each switch section and outputs the resultant signal to the circulator section 1215.

The coupler group 1253 also splits a signal output from the circulator section 1215 into the number of the APs 91. The switch group 1252 determines which signal of the electrical signal type wireless LAN signals output from the coupler group 1253 is output, in accordance with the setting of the setting section 142. Further, the coupler group 1251 combines the electrical signal type wireless LAN signals output from the switch group 1252 and outputs the resultant signal to the AP 91.

Hereinafter, an operation of the thus-constructed main station 10 of this configuration example will be described briefly. Note that an operation of the main station 10 of this configuration example is basically similar to that of the main station 10 of FIG. 13.

Firstly, an operation of the main station 10 which is performed when an Ethernet® signal input from an external network reaches a terminal, will be described. Note that the entire configuration of the wireless communication system is the same as shown in FIG. 1. The number of the APs 91 is five and the number of the sub-stations 20 is two in FIG. 1, however, here, the number of the APs 91 is four and the number of the sub-stations 20 is four.

The Ethernet® signal input from the external network is input to the SW 70. The SW 70 manages a network configuration of the wireless LAN system, similar to that described in Embodiment 2. Here, the network structure of the system indicates which AP 91 relays communication of which terminal. The SW 70 specifies a terminal as a transmission destination with reference to the Ethernet® signal, and outputs the Ethernet® signal to an AP 91 which relays communication of the specified terminal. Note that the AP 91 obtaining the Ethernet® signal is assumed to be the AP 91a.

The AP 91a converts the obtained Ethernet® signal to an electrical signal type wireless LAN, which is in turn output to the main station 10. In response to this, the coupler group 1251 of the main station 10 obtains the electrical signal type wireless LAN signal.

The coupler group 1251 of the main station 10 splits the obtained electrical signal type wireless LAN signal into four signals, which are in turn output to the switch group 1252. Note that the electrical signal type wireless LAN signal output from the AP 91a is input to the first, fifth, ninth and thirteenth switch sections (as counted from the top) of the switch group 1252 of FIG. 14(c).

Here, each switch section of the switch group 1252 is turned ON/OFF in accordance with the setting of the setting section 142. Here, as an example of the setting section 142, the case where the signal output from the AP 91a is output only to the sub-stations 20a and 20b will be described. Note that settings of the other APs 91b to 91d will not be explained here.

As described above, the signal output from the AP 91a is output to the sub-stations 20a and 20b. Therefore, here, the switch sections connected to the sub-stations 20a and 20b are turned ON. Specifically, the first and fifth switch sections of FIG. 14(c) are turned ON, while the ninth and thirteenth switch sections are turned OFF.

When the switch sections are set to be ON/OFF as described above, the first and fifth switch section (as counted from the top) of the switch group 1252 outputs the electrical signal type wireless LAN signal output from the AP 91a. In response to this, the coupler group 1253 frequency-multiplexes an electrical signal type wireless LAN signal output from each switch section, and outputs the resultant signal to the circulator section 1215. Thereafter, the circulator section 1215 outputs the obtained signals to the main station optical signal transmitting section 102. The subsequent operations of the main station optical signal transmitting section 102, the sub-station 20 and the terminal are similar to those of Embodiment 2 and will not be explained.

Next, the case where an electrical signal type wireless LAN signal transmitted from a terminal is transmitted to an external network will be described. Here, as an example, it is assumed that an electrical signal type wireless LAN is output from a terminal present in a communication area of the sub-station 20a.

The terminal present in the communication area of the sub-station 20a outputs a wireless LAN signal in the form of a radio wave. In response to this, the sub-station 20a receives and converts the radio wave type wireless LAN signal to an optical signal, which is in turn transmitted to the main station 10. Note that the operation has been described in Embodiments 1 and 2 and will not be explained in detail.

The main station 10 receives an optical signal from the sub-station 20a using the main station optical signal receiving section 112a. The main station optical signal receiving section 112a converts the optical signal to an electrical signal type wireless LAN signal, which is in turn output to the circulator section 1215a. In response to this, the circulator section 1215a outputs the obtained signal to the transmitted/received signal processing section 1250.

The transmitted/received signal processing section 1250 receives an electrical signal type wireless LAN signal using the coupler group 1253. Note that, here, since the electrical signal type wireless LAN signal is a signal transmitted from the sub-station 20a, the signal is received by the first (top) counter section of the coupler group 1253.

The coupler group 1253 splits the obtained electrical signal type wireless LAN signal into four, and outputs the resultant signals to the switch group 1252. Note that, specifically, the signal transmitted from the sub-station 20a is output to the first, fifth, ninth and thirteenth switch sections (as counted from the top) of the switch group 1252.

Here, the switch section 1252 is turned ON/OFF based on a setting of the setting section 142. Note that, here, for the sake of brevity, as described above, the first and fifth switch sections (as counted from the top) are assumed to be turned ON. Therefore, only the first and fifth switch sections (as counted from the top) of the switch group 1251 output the signal transmitted from the sub-station 20a.

The coupler group 1251 frequency-multiplexes a signal output from each switch section, and outputs the resultant signal to the AP 91 connected thereto. Note that the electrical signal type wireless LAN signal output from the sub-station 20a is transmitted to the APs 91a and 91b. Thereafter, the electrical signal type wireless LAN signal is transmitted via the APs 91a and 91b and the SW 70 to the external network.

As described above, according to the main station 10 of this configuration example, a transmitted signal processing section and a received signal processing section can be implemented as a single circuit. As a result, the main station 10 of this configuration example has a simpler internal configuration than that of the main station 10 of FIG. 13.

Here, another exemplary configuration of the main station 10 of Embodiment 2 will be described with reference to the drawings. In the main station 10 of FIG. 13, the transmitted signal processing section 121 processes an electrical signal type wireless LAN signal. However, the transmitted signal processing section 121 can process an optical signal type wireless LAN signal in a manner similar to the process of an electrical signal type wireless LAN signal.

Therefore, for the main station 10 described below, a process scheme of the transmitted signal processing section 121 for optical signals, but not electrical signals, will be described.

Figure 16:
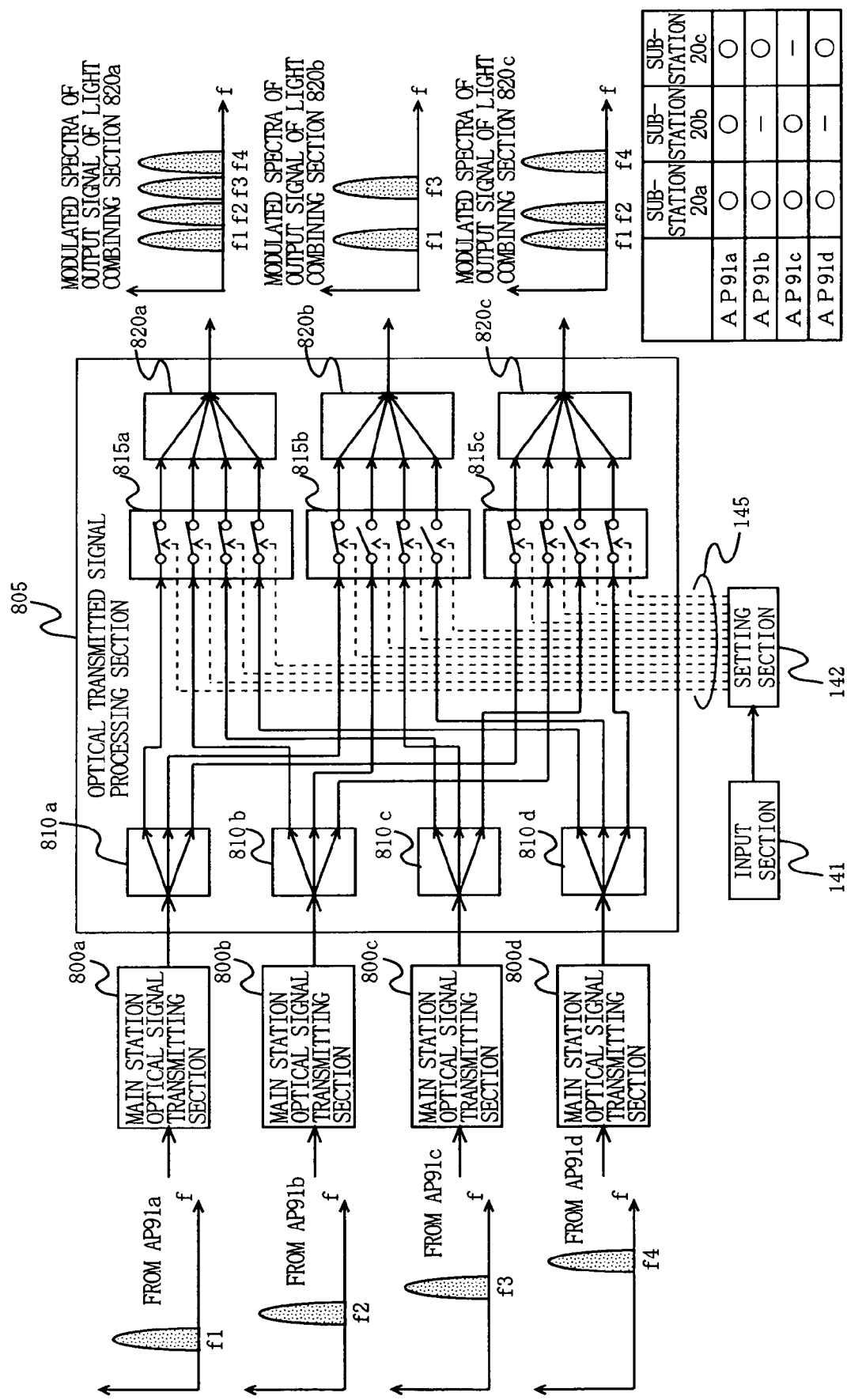
FIG. 16 is a block diagram showing a detailed configuration of an optical transmitted signal processing section 805 of the main station of FIG. 15.

FIG. 15 is a block diagram showing another exemplary configuration of the main station 10 of Embodiment 2. FIG. 16 is a block diagram showing details of an optical transmitted signal processing section 805 of the main station 10 of FIG. 15.

The main station 10 comprises a received signal processing section 111, main station optical signal receiving sections 112a and 112b, an input section 141, a setting section 142, main station optical signal transmitting sections 800a to 800e, and the optical transmitted signal processing section 805. The received signal processing section 111, the main station optical signal receiving sections 112a and 112b, the input section 141, and the setting section 142 are the same as those of FIG. 13 and will not be explained.

The main station optical signal transmitting sections 800a to 800e are connected to the respective corresponding APs 91a to 91e, and convert electrical signal type wireless LAN signals output from the respective APs 91a to 91e to optical signals. The optical transmitted signal processing section 805 has a configuration shown in FIG. 16, and outputs the optical signal output from each of the main station optical signal transmitting sections 800a to 800d to both or one of the sub-station 20a and the sub-station 20b in accordance with a setting of the setting section 142. Hereinafter, a configuration of the transmitted signal processing section 100 will be described with reference to FIG. 16.

The optical transmitted signal processing section 805 comprises light splitting sections 810a to 810d, optical connectors 815a to 815c, and light combining sections 820a to 820c. The light splitting sections 810a to 810d split optical signals output from the main station optical signal transmitting sections a to d into three, respectively. The optical connectors 815a to 815c connect and disconnect the output optical signal. The light combining sections 820a to 820c combine and frequency-division-multiplex input optical signals. Frequency spectra shown in FIG. 16 are frequency spectra of signals output from the APs 91a to 91d and modulated signal frequency spectra of signals output from the light combining sections 820a to 820c. Note that center frequencies of input signals from the four APs 91a to 91d are f1 to f4, respectively.

Next, an operation of the above-described optical transmitted signal processing section 805 will be described. Note that exemplary signal connections of the APs 91a to 91d and the sub-stations 20 are shown in a table of FIG. 16. Hereinafter, an operation of the optical transmitted signal processing section 805 in this case will be described.

Signals output from the APs 91a to 91d are converted to optical signals in the respective main station optical signal transmitting sections 800a to 800d. Next, the light splitting sections 810a to 810d each split the converted optical signal into three, which are in turn output to the optical connectors 815a to 815c.

Next, the optical connectors 815a to 815c output the optical signals to the light combining sections 820a to 820c in accordance with a setting of the setting section 142 as in the connectors 1212a to 1212c of FIG. 14(a).

Next, the optical signals output from the optical connectors 815a to 815c are frequency-division-multiplexed in the respective light combining sections 820a to 820c, and the resultant signals are output to the sub-stations 20a to 20c. The subsequent processes of the sub-stations 20a to 20c are similar to those in Embodiment 1 or 2 and will not be explained.

As described above, the process of the transmitted signal processing section 121 of FIG. 14(a) is performed using an optical signal, whereby crosstalk performance is excellent compared to that of the transmitted signal processing section 121 operating using a high-frequency electrical signal.

Note that the optical transmitted signal processing section 805 can be introduced to the main station 10 of other embodiments.

Embodiment 3

Figure 17:
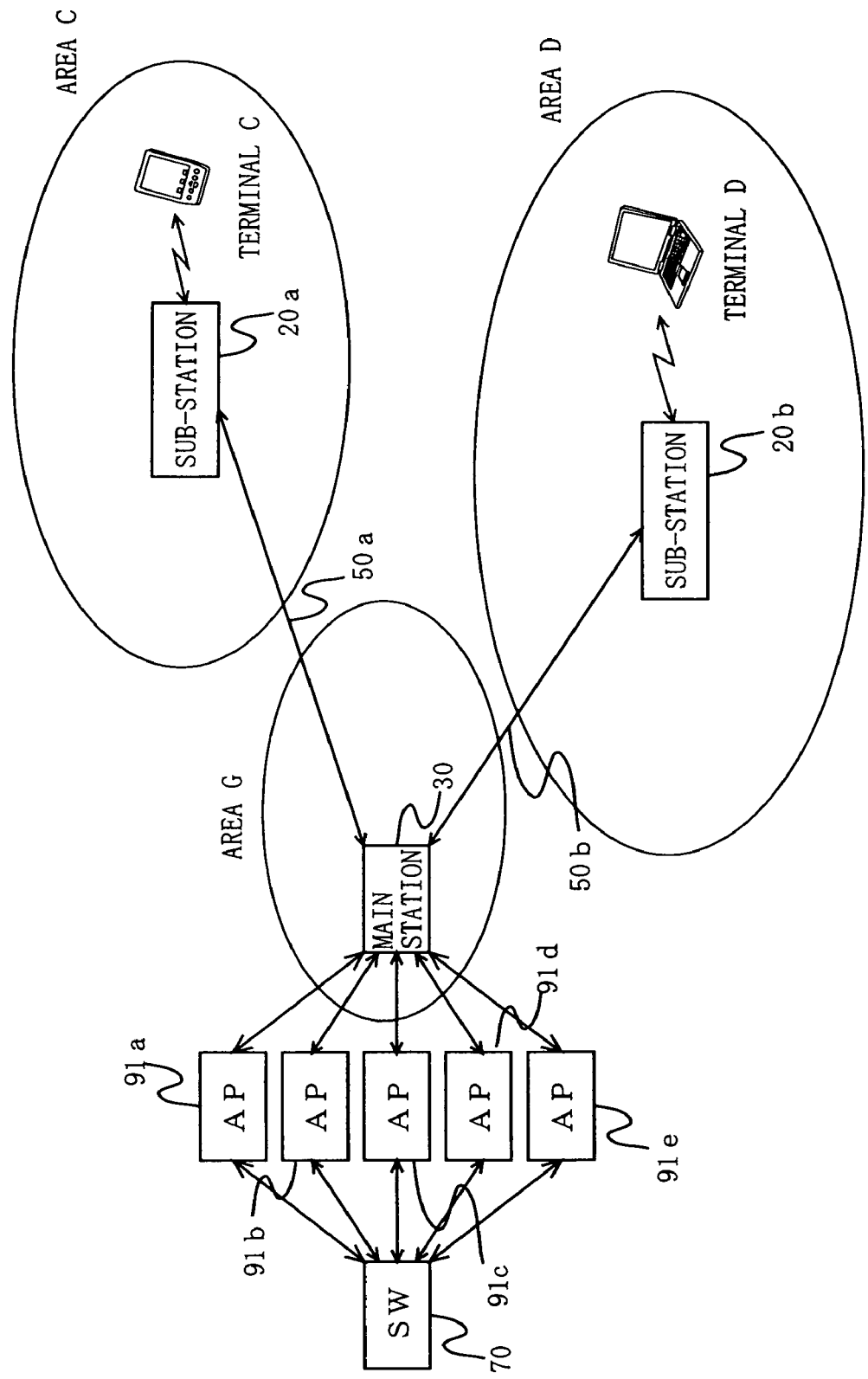
FIG. 17 is a block diagram showing an exemplary entire configuration of a wireless communication system according to Embodiment 3 of the present invention.

Hereinafter, an entire configuration of a wireless communication system according to Embodiment 3 of the present invention will be described with reference to the drawings. FIG. 17 is a block diagram showing the entire configuration of the wireless communication system of Embodiment 3. The wireless communication system of Embodiment 3 is different from that of Embodiment 1 in that an area G is also present in a main station 30. The other elements are similar to those of Embodiment 1 and will not be explained.

A SW 70 and APs 91*a* to 91*e* of Embodiment 3 are similar to those of Embodiment 1 and will not be explained. The configuration of sub-stations 20*a* and 20*b* of Embodiment 3 is similar to that of Embodiment 1 of FIG. 3 and will not be explained.

Figure 18:
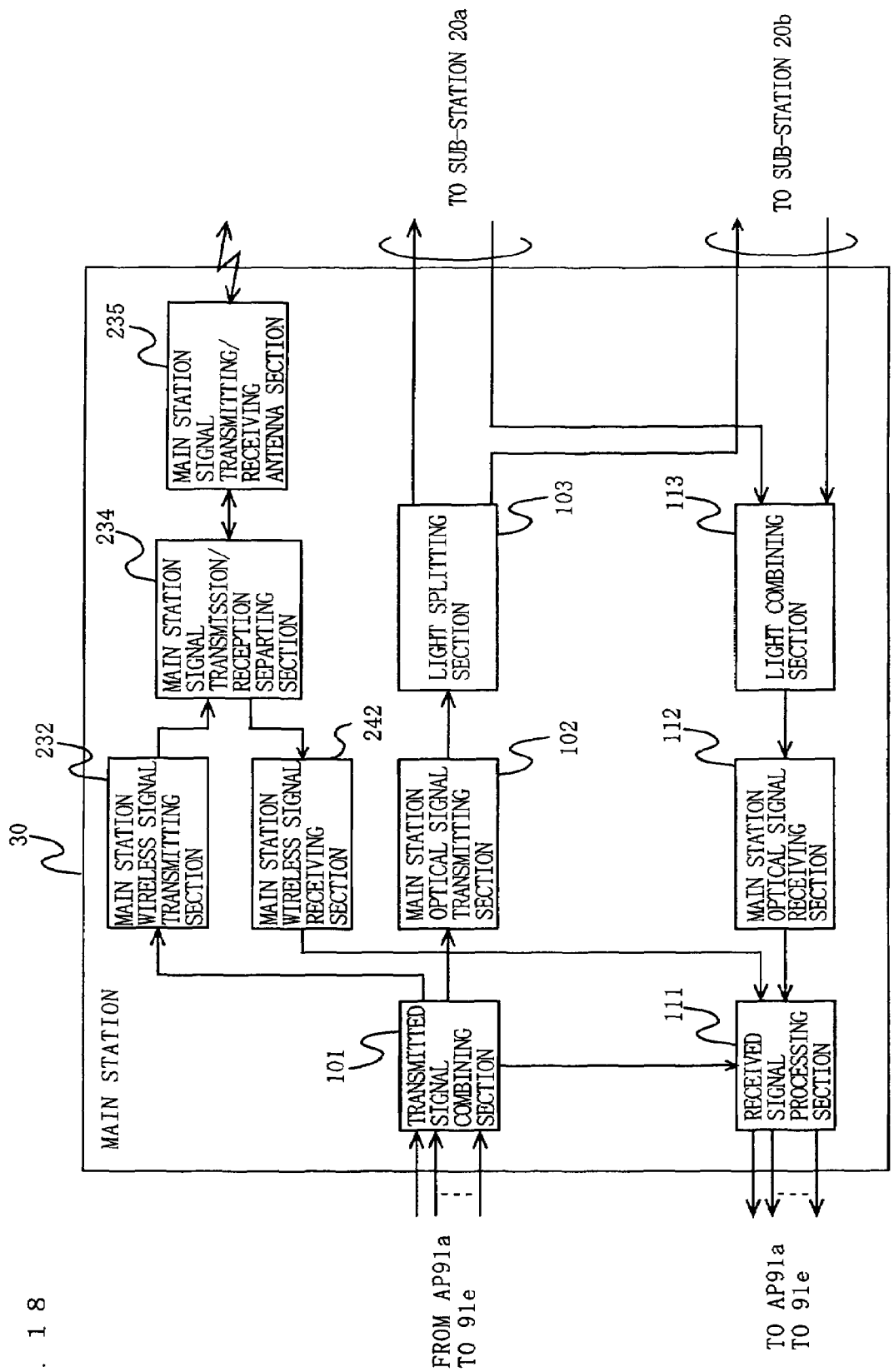
FIG. 18 is a block diagram showing an exemplary configuration of a main station 10 according to Embodiment 3 of the present invention.

Here, the main station 30 of Embodiment 3 will be described with reference to the drawings. FIG. 18 is a block diagram showing a configuration of the main station 30 of Embodiment 3. The main station 30 is the same as the main station 10 of FIG. 2, except that the main station 30 further comprises a main station wireless signal transmitting section 232, a main station signal transmission/reception separating section 234, a main station signal transmitting/receiving antenna section 235, and a main station wireless signal receiving section 242. This means that the main station 30 has a function of the sub-station 20.

The main station wireless signal transmitting section 232 amplifies an electrical signal type wireless LAN signal output from a transmitted signal combining section 101. The main station signal transmission/reception separating section 234 outputs the signal output from the main station wireless signal transmitting section 232 to the main station signal transmitting/receiving antenna section 235, and outputs a signal output from the main station signal transmitting/receiving antenna section 235 to the main station wireless signal receiving section 242. The main station wireless signal receiving section 242 subjects the signal obtained from the main station signal transmission/reception separating section 234 to a process suitable for a received signal processing section 111 and outputs the resultant signal to the received signal processing section 111.

Hereinafter, an operation of the wireless communication system of Embodiment 3 will be described. Note that, in Embodiment 3, operations other than those of the main station wireless signal transmitting section 232, the main station signal transmission/reception separating section 234, the main station signal transmitting/receiving antenna section 235 and the main station wireless signal receiving section 242 of the main station 30 are similar to those of Embodiment 1 and will not be explained.

The main station wireless signal transmitting section 232 obtains a frequency-multiplexed (combined) electrical signal type wireless LAN signal output from the transmitted signal combining section 101. Next, the main station wireless signal transmitting section 232 amplifies the frequency-multiplexed electrical signal type wireless LAN signal thus obtained and outputs the resultant signal to the main station signal transmission/reception separating section 234. The main station signal transmission/reception separating section 234 outputs the frequency-multiplexed electrical signal type wireless LAN signal thus obtained to the main station signal transmitting/receiving antenna section 235. In response to this, the main station signal transmitting/receiving antenna section 235 transmits the frequency-multiplexed electrical signal type wireless LAN signal thus obtained to a terminal in the form of a radio wave. As a result, the terminal can receive a signal from the main station 30.

A terminal present in the area G transmits a wireless LAN signal in the form of a radio wave to the main station signal transmitting/receiving antenna section 235. In response to this, the main station signal transmitting/receiving antenna section 235 receives the radio wave type wireless LAN signal, which is in turn output via the main station signal transmission/reception separating section 234 to the main station wireless signal receiving section 242. Next, main station wireless signal receiving section 242 subjects the obtained electrical signal type wireless LAN signal to a predetermined process, such as amplification or the like, and outputs the resultant signals to the received signal processing section 111. The subsequent operation of the received signal processing section 111 is similar to that of Embodiment 1 and will not be explained.

As described above, according to the wireless LAN of Embodiment 3, an effect similar to that of the wireless communication system of Embodiment 1 is obtained, and further, the main station 30 can also serve as a sub-station. Here, a wireless LAN service, which is directed to an antenna of a wireless LAN AP for an apartment building, has been commercialized. In this case, if a single AP can cover the whole apartment building, no problem arises. However, a plurality of APs may be required due to the presence of an obstacle. Therefore, the APs need to be installed at respective locations (e.g., a utility pole). Further, the APs need to be connected via a media converter or the like to a center station or a switch. In contrast to this, in the wireless communication system of Embodiment 3, a main station is installed at a single location, from which wireless LAN services are provided, and a sub-station is installed for a blind area. If the main station and the sub-station are connected via an optical fiber, the entire configuration of the wireless communication system is simple.

An antenna of the main station 30 of Embodiment 3 is an antenna for both transmission and reception. However, two antennas, i.e., a transmitting antenna and a receiving antenna, may be used.

Note that each sub-station 20 described in the configuration example of Embodiment 1 can be applied to the sub-station 20 of Embodiment 3.

Although a SW 70 is provided between an external network and the APs in the wireless communication systems of Embodiments 1 to 5, the wireless communication system does not necessarily require the SW 70. In this case, separate networks are connected individually to each AP.

Although a signal input to each AP is assumed to be an Ethernet® signal in the wireless communication systems of Embodiments 1 to 3, the input to each AP is not limited to an Ethernet® signal. For example, an input to each AP may be an ATM (Asynchronous Transfer Mode) signal or the like.

(Exemplary Configuration of Main Station of Embodiment 3)

Figure 19:
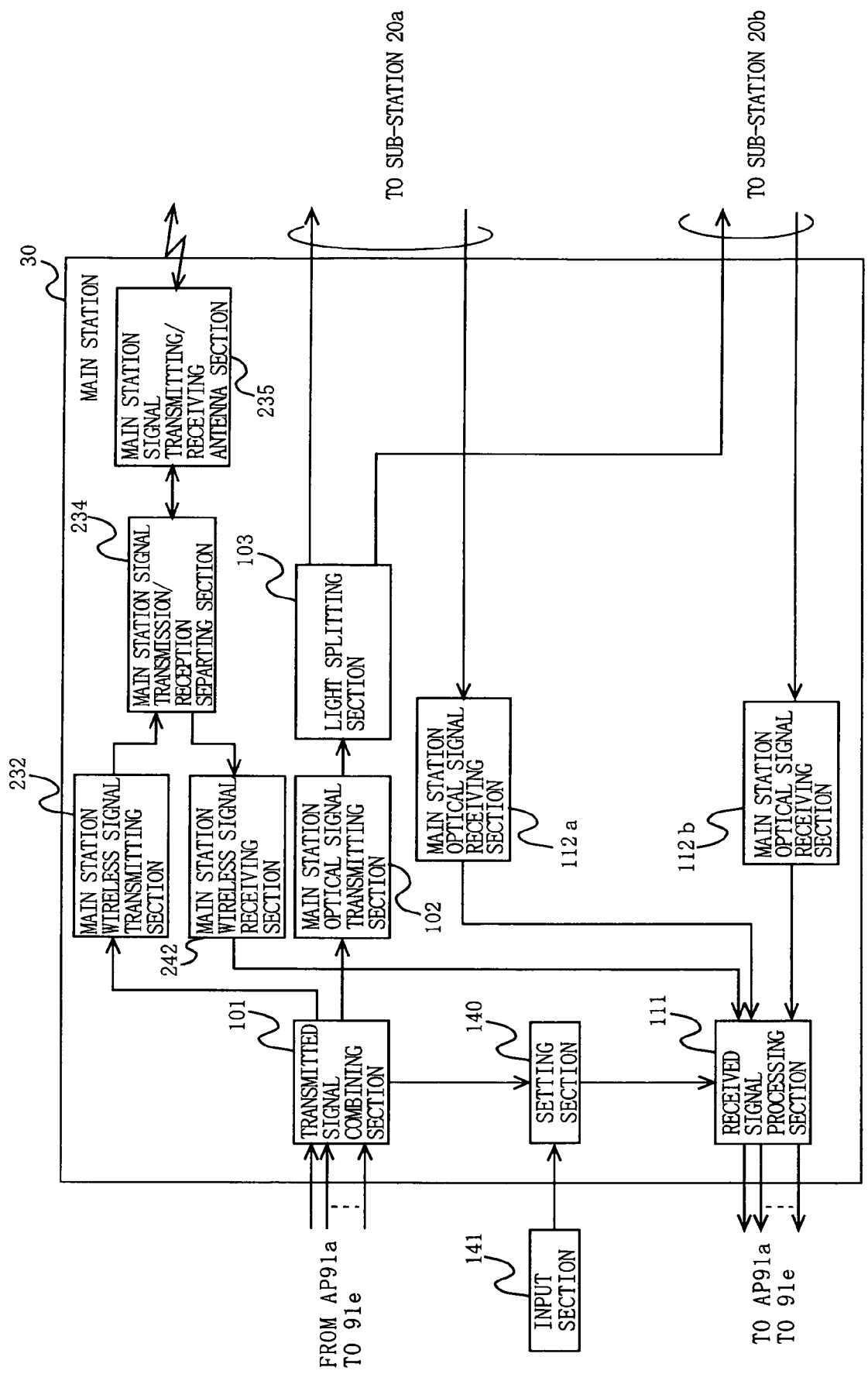
FIG. 19 is a block diagram showing another exemplary configuration of the main station 10 according to Embodiment 3 of the present invention.

Hereinafter, another exemplary configuration of the main station 30 of Embodiment 3 will be described. FIG. 19 shows the main station 30, which is the same as the main station 10 of Embodiment 1 of FIG. 6(*a*), except that the main station 30 further comprises the main station wireless signal transmitting section 232, the main station signal transmission/reception separating section 234, the main station signal transmitting/receiving antenna section 235, and the main station wireless signal receiving section 242. Note that parts having the same operations as those of the corresponding parts of the main station 10 of FIG. 4 and the main station 30 of FIG. 18 are referenced with the same reference numerals. Therefore, the operation of the main station 30 will not be explained.

Figure 20:
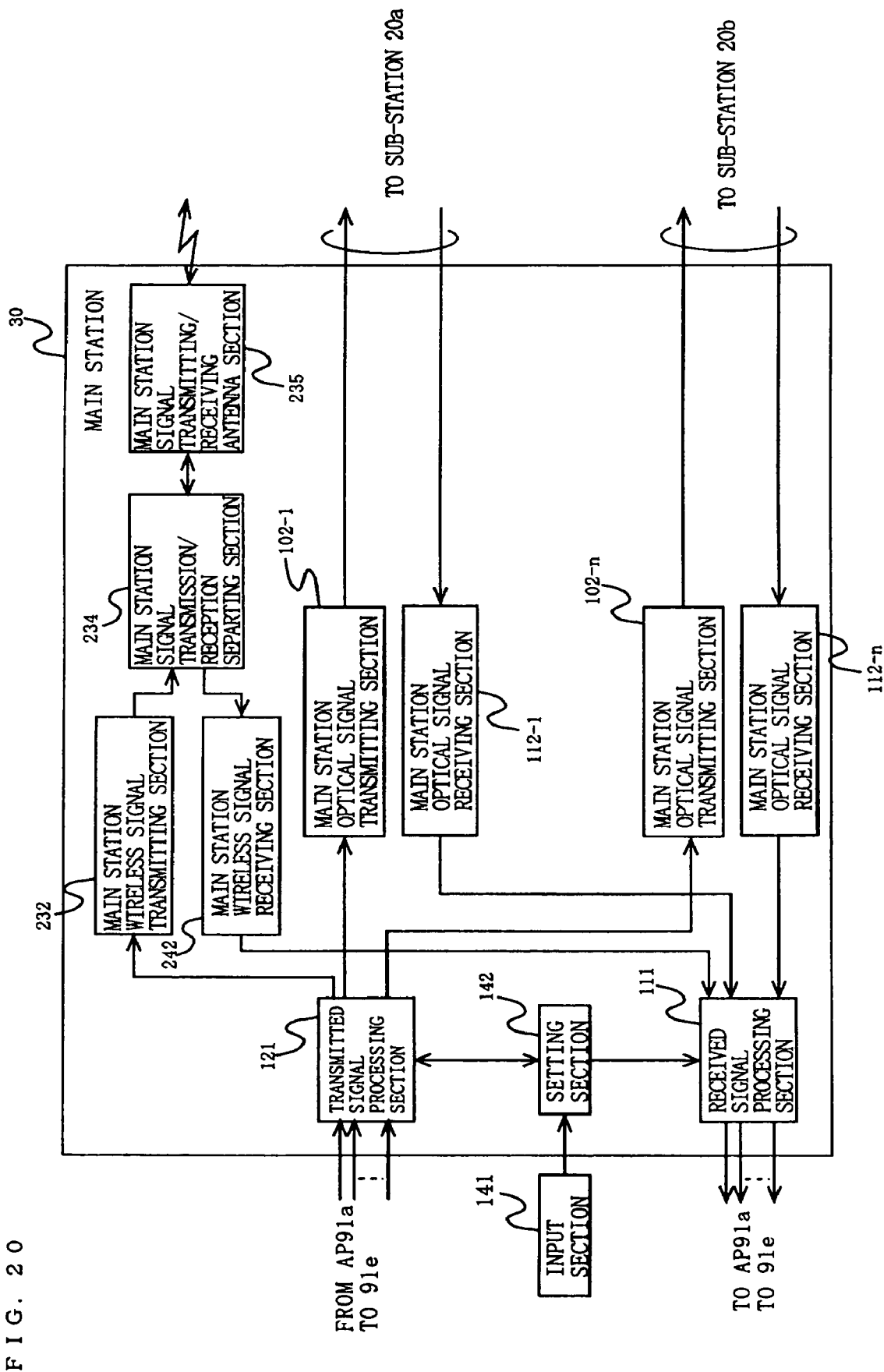
FIG. 20 is a block diagram showing another exemplary configuration of the main station 10 according to Embodiment 3 of the present invention.

Further, as shown in FIG. 20, the main station 10 of Embodiment 2 of FIG. 13 may be further provided with the main station wireless signal transmitting section 232, the main station signal transmission/reception separating section 234, the main station signal transmitting/receiving antenna section 235, and the main station wireless signal receiving section 242. Note that parts having the same operations as those of the corresponding parts of the main station 10 of FIG. 13 and the main station 30 of FIG. 18 are referenced with the same reference numerals. Therefore, the operation of the main station 30 will not be explained.

Embodiment 4

Hereinafter, an entire configuration of a wireless communication system according to Embodiment 4 of the present invention will be described with reference to the drawings. FIG. 21 is a block diagram showing the entire configuration of the wireless communication system of Embodiment 4. The wireless communication system of Embodiment 4 is different from that of Embodiment 1 in that APs 93*a* to 93*e* communicate with a main station 35 using a wireless radio wave. The main station 35 of Embodiment 4 has an internal configuration different from that of the main station 10 of Embodiment 1. Hereinafter, the wireless communication system of Embodiment 4 will be described, mainly on a difference between it and the wireless communication system of Embodiment 1.

As in Embodiment 1, the APs 93*a* to 93*e* of Embodiment 4 convert an Ethernet® signal output from a SW 70 to an electrical signal type wireless LAN signal having a frequency of a predetermined channel, and convert the electrical signal type wireless LAN signal to a radio wave, which is in turn output to the main station 35. The APs 93*a* to 93*e* also receive one of the radio waves transmitted from the main station 35 which is on the same channel as that used by the APs 93*a* to 93*e*, and convert the received radio wave to an Ethernet® signal, which is in turn output to the SW 70.

Figure 22:
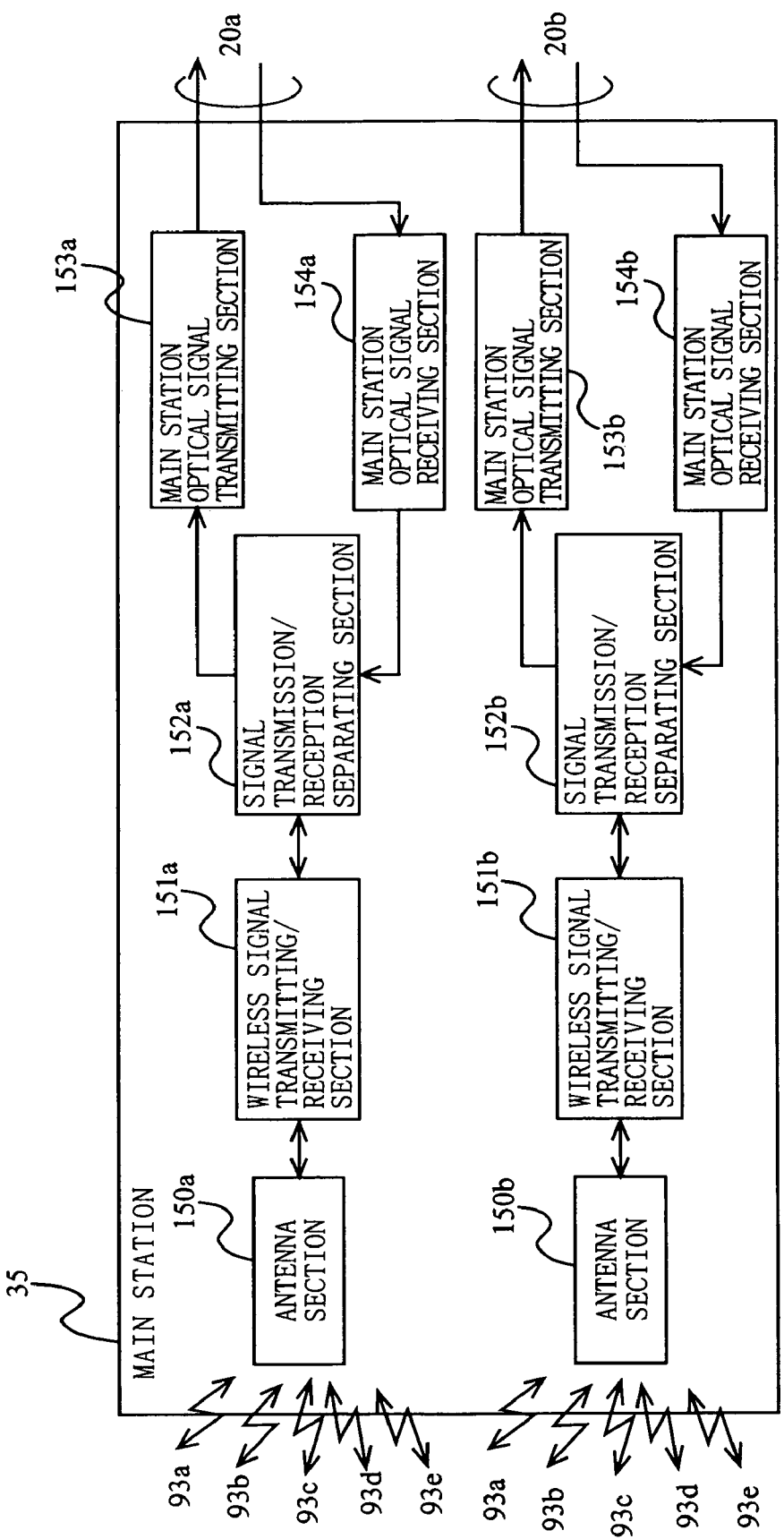
FIG. 22 is a block diagram showing an exemplary configuration of a main station 35 according to Embodiment 4 of the present invention.

Next, the main station 35 of Embodiment 4 outputs the received signal to each of the sub-stations 20*a* and 20*b*. The main station 35 has a configuration shown in FIG. 22, and comprises antenna sections 150*a* and 150*b*, wireless signal transmitting/receiving sections 151*a* and 151*b*, signal transmission/reception separating sections 152*a* and 152*b*, main station optical signal transmitting sections 153*a* and 153*b*, and main station optical signal receiving sections 154*a* and 154*b*.

The antenna sections 150*a* and 150*b* receive and frequency-multiplex all radio waves having a plurality of frequencies transmitted from the APs 93*a* to 93*e*, and output the resultant signals to the wireless signal transmitting/receiving sections 151*a* and 151*b* connected thereto. The antenna sections 150*a* and 150*b* also convert electrical type wireless LAN signals output from the wireless signal transmitting/receiving sections 151*a* and 151*b* to radio waves having a plurality of frequencies, which are in turn transmitted to the APs 93*a* to 93*e*. The wireless signal transmitting/receiving sections 151*a* and 151*b* amplify the signals output from the antenna sections 150*a* and 150*b* and output the resultant signals to the signal transmission/reception separating sections 152*a* and 152*b* connected thereto. The wireless signal transmitting/receiving sections 151*a* and 151*b* also amplify signals output from the signal transmission/reception separating sections 152*a* and 152*b* and the resultant signals to the antenna sections 150.

The signal transmission/reception separating sections 152*a* and 152*b* output the signals output from the wireless signal transmitting/receiving sections 151*a* and 151*b* connected thereto to the main station optical signal transmitting sections 153*a* and 153*b* connected thereto. The signal transmission/reception separating sections 152*a* and 152*b* also output signals output from the main station optical signal receiving sections 154*a* and 154*b* connected thereto to the wireless signal transmitting/receiving sections 151*a* and 151*b* connected thereto.

The main station optical signal transmitting section 153*a* converts the frequency-multiplexed electrical signal type wireless LAN signal output from the signal transmission/reception separating section 152*a* connected thereto to an optical signal. The main station signal transmitting section 153*a* also transmits the optical signal via the optical fiber transmission path 50*a* to the sub-station 20*a*. Similarly, the main station optical signal transmitting section 152*b* converts the frequency-multiplexed electrical type wireless LAN signal output from the signal transmission/reception separating section 152*a* connected thereto to an optical signal. The main station signal transmitting section 153*b* also transmits the optical signal via the optical fiber transmission path 50*b* to the sub-station 20*b*.

The main station optical signal receiving section 154*a* converts an optical signal transmitted from the sub-station 20*a* to a wireless LAN signal (electrical signal), which is in turn output to the signal transmission/reception separating section 152*a*. Similarly, main station optical signal receiving section 154*b* converts an optical signal transmitted from the sub-station 20*b* to a wireless LAN signal (electrical signal), which is in turn output to the signal transmission/reception separating section 152*b*.

Note that the other components of the wireless communication system of Embodiment 4 are similar to those of Embodiment 1 and will not be explained.

Hereinafter, an operation of the wireless communication system of Embodiment 4 will be described. Note that operations other than that which is performed by the main station 35 of Embodiment 4 are similar to those of Embodiment 1 and will not be explained.

An operation of the wireless communication system of Embodiment 4 will be described, where an Ethernet® signal input from an external network reaches areas C and D via the main station 35 and the sub-stations 20*a* and 20*b*.

The operation of the SW 70 is similar to that of Embodiment 1 and will not be explained. Whereas APs transmit a wireless LAN signal to the main station 10 through a cable in Embodiment 1, the AP 93 of Embodiment 4 transmits a wireless LAN signal to the main station 35 in the form of a radio wave having a frequency allocated to the AP 93.

Here, the antenna section 150*a* of the main station 35 receives and frequency-multiplexes all radio wave wireless LAN signals transmitted from the APs 93*a* to 93*e*, and outputs the resultant signal as an electrical signal type wireless LAN signal to the wireless signal transmitting/receiving section 151*a*. In response to this, the wireless signal transmitting/receiving section 151*a* subjects the obtained electrical signal type wireless LAN signal to a process, such as amplification or the like, and outputs the resultant signal to the signal transmission/reception separating section 152*a*.

The signal transmission/reception separating section 152*a* outputs the obtained electrical signal wireless LAN signal to the main station optical signal transmitting section 153*a*. Next, the main station optical signal transmitting section 153*a* converts the obtained electrical signal type wireless LAN signal to an optical signal, which is in turn transmitted via the optical fiber transmission path 50*a* to the sub-station 20*a*. As a result, all signals output from the APs 93*a* to 93*e* can reach the area C in which the sub-station 20*a* is present. Note that the antenna section 150*b*, the wireless signal transmitting/receiving section 151*b*, the signal transmission/reception separating section 152*b*, the main station optical signal transmitting section 153*b*, and the main station optical signal receiving section 154*b* perform the same operations as those described above. As a result, all signals output from the APs 93*a* to 93*e* reach the area D in which the sub-station 20*b* is present. As a result, the terminal C or D can receive a signal from an external network no matter whether the terminal is present the area C or D.

Next, an operation of the wireless communication system will be described, where data transmitted from the terminal C is transmitted via the AP 93*a* to an external network.

The terminal C performs communication via the AP 93*a*, and therefore, transmits a wireless LAN signal having a frequency corresponding to the AP 93*a* to the sub-station 20*a* in the form of a radio wave. Note that this operation is similar to that of Embodiment 1 and will not be further explained.

Next, the sub-station 20*a* receives and converts a radio wave transmitted from the terminal C to an optical signal, which is in turn transmitted through the optical fiber transmission cable 50*a* to the main station 35. Note that this operation is similar to that of Embodiment 1 and will not be further explained.

The optical signal transmitted from the sub-station 20*a* is received by the main station optical signal receiving section 154*a*. The main station optical signal receiving section 154*a* converts the obtained optical signal to an electrical signal type wireless LAN signal, which is in turn output to the signal transmission/reception separating section 152*a*. Note that the electrical signal type wireless LAN signal is a signal having a frequency corresponding to the AP 93*a*.

Next, the signal transmission/reception separating section 152*a* outputs the obtained electrical signal type wireless LAN signal to the wireless signal transmitting/receiving section 151*a*.

Next, the wireless signal transmitting/receiving section 151*a* subjects the obtained electrical signal type wireless LAN signal to a process, such as amplification or the like, and outputs the resultant signal to the antenna section 150*a*. In response to this, the antenna section 150*a* converts the electrical signal type wireless LAN signal to a radio wave, which is in turn output to the APs 93*a* to 93*e*. Note that, as described above, the electrical signal type wireless LAN signal is a signal having a frequency corresponding to the AP 93*a*, and therefore, the radio wave obtained converting the wireless LAN signal also has the frequency corresponding to the AP 93*a*.

In response to this, each of the APs 93*a* to 93*e* receives a radio wave type wireless LAN signal transmitted from the main station 35. Here, each of the APs 93*a* to 93*e* is assigned a frequency of a signal used. Therefore, each of the APs 93*a* to 93*e* cannot receive signals other than the signal having the frequency assigned thereto. Therefore, a radio wave wireless LAN signal transmitted from the terminal C via the sub-station 20*a* and the main station 35 can be received only by the AP 93*a*.

The AP 93*a*, which receives a radio wave wireless LAN signal, converts the received signal to an Ethernet® signal, which is in turn output to the SW 70. Thereafter, the SW 70 outputs the Ethernet® signal to an external network. With the above-described operation, a signal output from the terminal C is transmitted to the external network.

Next, the case where the terminal C transmits information to the terminal D will be described. Here, the description of the operation is based on an assumption that the terminal C performs communication using the AP 93*a* while the terminal D performs communication using the AP 93*b*.

In the operation, a wireless LAN signal transmitted from the terminal C reaches via the sub-station 20*a*, the main station 35 and the AP 93*a* to the SW 70. Here, an operation until the wireless LAN signal transmitted from the terminal C reaches the sub-station 20*a* is similar to that of the above-described case where the terminal C transmits information to an external network, and will not be explained.

Next, the SW 70 determines that an output destination of the Ethernet® signal is the AP 93*b*, based on the obtained Ethernet® signal and a network structure managed by the SW 70, as in Embodiment 1. Thereafter, the wireless LAN signal transmitted by the terminal C reaches via the AP 93*b*, the main station 35 and the sub-station 20*b* to the terminal D. Note that, in this case, operations of the AP 93*b*, the main station 35 and the sub-station 20*b* are similar to those described at the beginning of Embodiment 4, i.e., the operation where an Ethernet® signal input from an external network reaches the areas C and D, and will not be further explained.

As described above, according to the wireless communication system of Embodiment 4, the antenna section 150, the wireless signal transmitting/receiving section 151, the signal transmission/reception separating section 152, the main station optical signal transmitting section 153 and the main station optical signal receiving section 154 are provided individually for each sub-station 20. Therefore, when an additional sub-station 20 is provided, another set of the antenna section 150, the wireless signal transmitting/receiving section 151, signal transmission/reception separating section 152, the main station optical signal transmitting section 153 and the main station optical signal receiving section 154 for the sub-station 20 needs to be added to the main station 35. In other words, when the antenna section 150, the wireless signal transmitting/receiving section 151, the signal transmission/reception separating section 152, the main station optical signal transmitting section 153 and the main station optical signal receiving section 154 are additionally provided, no change has to be made in the antenna section 150, the wireless signal transmitting/receiving section 151, the signal transmission/reception separating section 152, the main station optical signal transmitting section 153 and the main station optical signal receiving section 154 of the other sub-stations 20. As a result, an additional sub-station 20 can be easily installed. Further, the antenna section 150, the wireless signal transmitting/receiving section 151, the signal transmission/reception separating section 152, the main station optical signal transmitting section 153 and the main station optical signal receiving section 154 are provided in association with the corresponding sub-station 20, so that signals from the sub-stations 20 are not mixed in the main station 35. As a result, according to the wireless communication system of Embodiment 4, problems, such as interference between signals and the like, are unlikely to occur in the main station 35.

Further, according to the wireless communication system of Embodiment 4, the accommodation capacity of an AP can be freely distributed to each area, as in the wireless communication system of Embodiment 1. Note that the number of areas and the number of APs are not limited to those shown in the figures, as is similar to Embodiment 1.

Further, according to the wireless communication system of Embodiment 4, similar to Embodiment 1, either the area C or D can receive a desired signal. Therefore, even when a terminal is moved from one area to another, it is not necessary for the user to reset the connection of the terminal. As a result, the AP 93 does not require a roaming function.

In addition, according to the communication system of Embodiment 4, an effect similar to that of Embodiment 1 can be obtained.

Embodiment 5

Hereinafter, a wireless communication system according to Embodiment 2 of the present invention will be described with reference to the drawings. The wireless communication system of Embodiment 5 is a combination of the wireless communication system of Embodiment 2 and the wireless communication system of Embodiment 4. Specifically, in the wireless communication system of Embodiment 5, an AP and a main station communicate with each other using a radio wave, and further, the main station selectively outputs a wireless LAN signal output from each AP to a sub-station in each area. Note that an entire configuration of the wireless communication system of Embodiment 5 is similar to that of Embodiment 4, and therefore, FIG. 21 is referenced.

The SW 70 and the APs 93a to 93e are similar to those of Embodiment 4 and will not be explained. Further, the sub-stations 20a and 20b are similar to those of Embodiment 1, and therefore, FIG. 3 is referenced.

Figure 23:
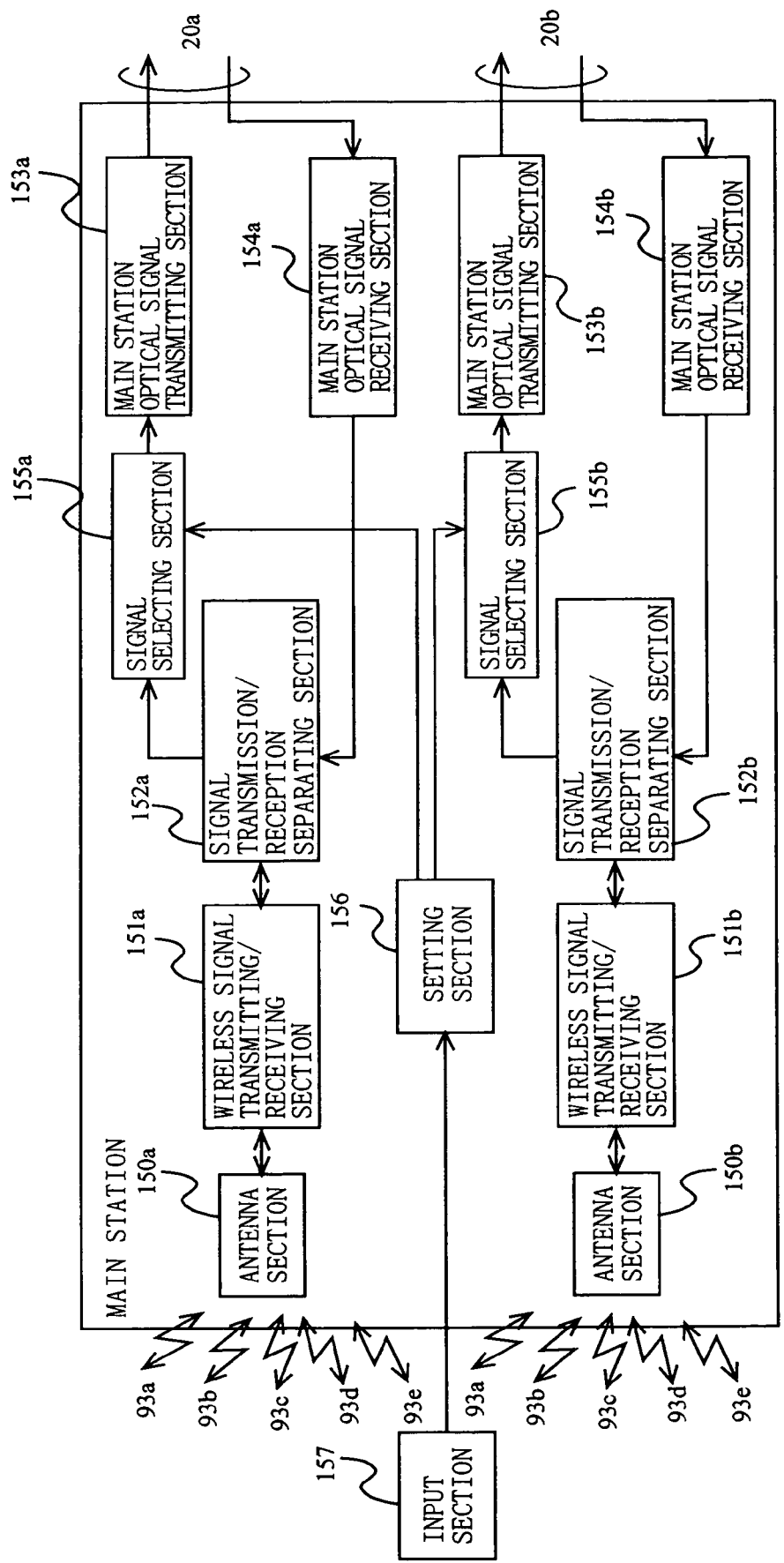
FIG. 23 is a block diagram showing an exemplary configuration of a main station 35 according to Embodiment 5 of the present invention.

Here, a main station 35 of the wireless communication system of Embodiment 5 will be described. Similar to the main station 10 of Embodiment 2, the main station 35 of Embodiment 5 converts an electrical signal type wireless LAN signal input from the APs 93a to 93e to an optical signal and selectively outputs the optical signal to each of the sub-stations 20a and 20b. More specifically, the main station 10 outputs the optical signal to both or one of the sub-station 20a and the sub-station 20b in accordance with a setting of the user. Note that the main station 35 of Embodiment 5 communicates with the APs 93a to 93e using a radio wave, as is different from the main station 10 of Embodiment 2. Hereinafter, the main station 35 of Embodiment 5 will be described with reference to FIG. 23. FIG. 23 is a block diagram showing an internal configuration of the main station 35 of Embodiment 5.

The main station 35 of Embodiment 5 is the same as the main station 35 of Embodiment 4, except that the main station 35 of Embodiment 5 further comprises signals electing sections 155a and 155b (in the claims, the signal selecting sections 155a and 155b are collectively referred to as a selecting means), a setting section 156, and an input section 157. Note that components having like reference numerals perform like operations in FIG. 23 and FIG. 22 and will not be explained.

Figure 24:
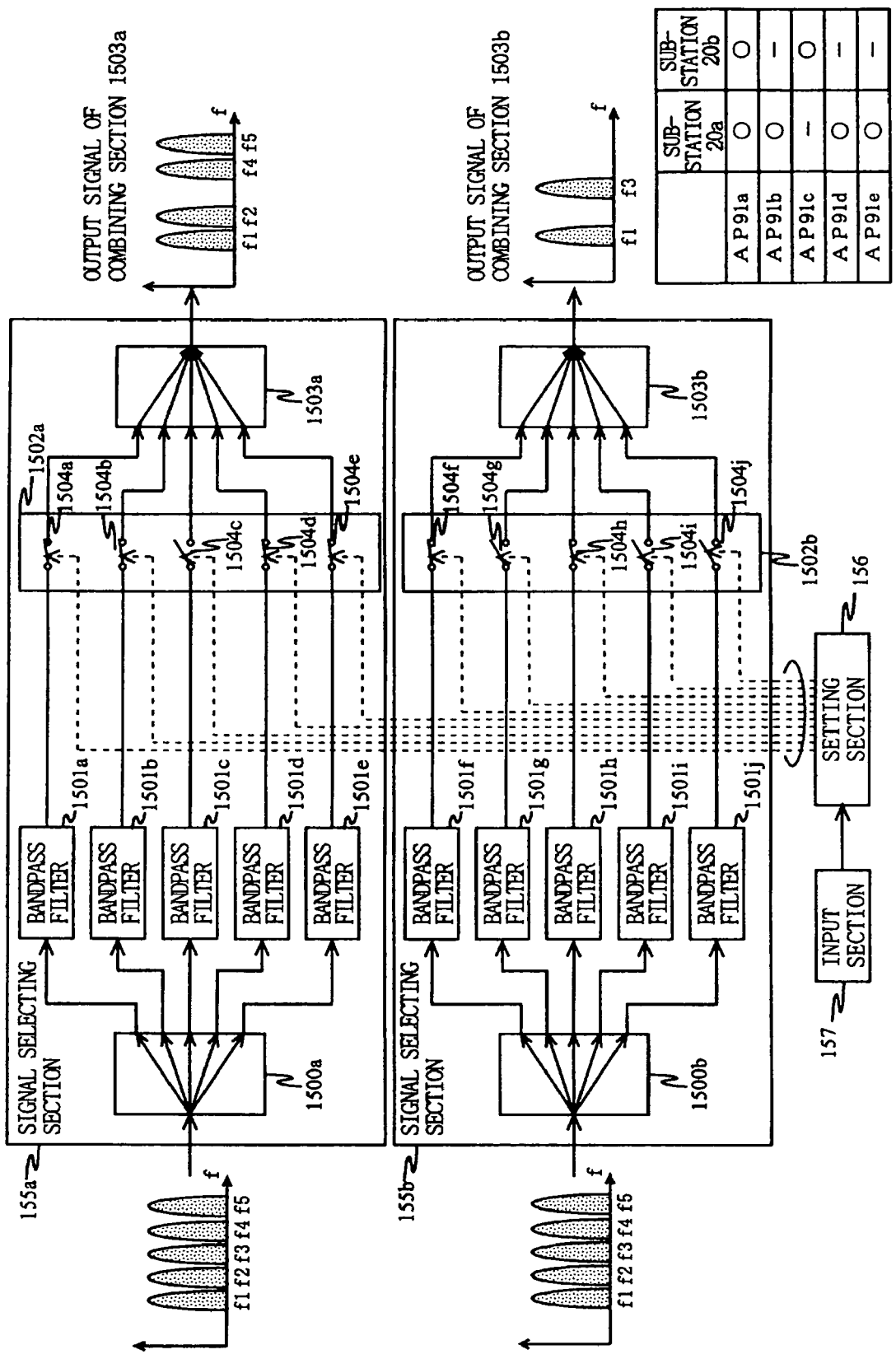
FIG. 24 is a diagram showing a configuration of a signal selecting section 155 according to Embodiment 5 of the present invention.

Here, the signal selecting sections 155a and 155b, the setting section 156 and the input section 157 will be described with reference to the drawings. FIG. 24 is a diagram showing a configuration of the signal selecting sections 155a and 155b, the setting section 156 and the input section 157. Although FIG. 24 shows both the signal selecting sections 155a and 155b, the signal selecting sections 155a and 155b have the same configuration. Therefore, the configuration of only the signal selecting section 155a will be described in detail.

The signal selecting section 155a comprises a splitting section 1500a, bandpass filters 1501a to 1501e, a connector 1502a, and a combining section 1503a. The signal selecting section 155a outputs a portion of input wireless LAN signals having frequencies of f1 to f5 to a main station optical signal transmitting section 153 in accordance with a setting of the setting section 156.

The splitting section 1500a splits an electrical signal type wireless LAN signal having frequencies of f1 to f5 output from a signal transmission/reception separating section 152 to five signal lines. The bandpass filters 1501a to 1501e each output only a signal having a frequency allocated thereto to the connector 1502a. Specifically, the bandpass filter 1501a outputs an electrical signal type wireless LAN signal having a frequency of f1 to the connector 1502a. The bandpass filter 1501b outputs an electrical signal type wireless LAN signal having a frequency of f2 to the connector 1502a. The bandpass filter 1501c outputs an electrical signal type wireless LAN signal having a frequency of f3 to the connector 1502a. The bandpass filter 1501d outputs an electrical signal type wireless LAN signal having a frequency of f4 to the connector 1502a. The bandpass filter 1501e outputs an electrical signal type wireless LAN signal having a frequency of f5 to the connector 1502a.

The connector 1502a comprises switches 1504a to 1504e, and outputs a portion of signals output from the bandpass filters 1501a to 1501e to the combining section 1503a based on a setting of the setting section 156. The switches 1504a to 1504e are connected to the respective corresponding bandpass filters 1501a to 1501e, and switch the electrical signal type wireless LAN signals having frequencies of f1 to f5 output from the bandpass filters 1501a to 1501e. Specifically, a signal input to one of the switches 1504a to 1504e which is turned ON, is output to the combining section 1503a. A signal input to one of the switches 1504a to 1504e which is turned OFF, is not output to the combining section 1503a.

The combining section 1503a frequency-multiplexes signals output from the connector 1502a and outputs the resultant signal to the main station optical signal transmitting section 153a. The setting section 156 has ON/OFF settings of the switches 1504a to 1504e. The input section 157 is an apparatus, with which the user sets ON/OFF of the switches 1504a to 1504e in the setting section 156. Note that the signal selecting section 155b has a configuration similar to that of the signal selecting section 155a and will not be explained.

Hereinafter, an operation of the thus-constructed wireless communication system of Embodiment 5 will be described. Note that the operation of the wireless communication system of Embodiment 5 and the operation of the wireless communication system of Embodiment 4 have many common portions, and therefore, only operations different between them will be described here.

An operation of the wireless communication system of Embodiment 5, which is performed when a signal transmitted from an external network is selected and output to each area, will be described.

Referring to FIG. 21, an Ethernet® signal is input to the SW 70 from the outside. The SW 70 outputs the obtained signal to the APs 93a to 93e based on a network structure managed by the SW 70. Note that this operation is the same as that of the SW 70 of Embodiment 1 and will not be further explained.

Next, each of the APs 93a to 93e converts the obtained signal to an electrical signal type wireless LAN signal having a frequency (one of f1 to f5), which is allocated to the AP, and outputs the resultant signal as a radio wave to the main station 35. Note that this operation is also the same as that of the SW 70 of Embodiment 1 and will not be further explained.

The antenna section 150a receives all radio waves transmitted from the APs 93a to 93e, and converts the signals to an electrical signal type wireless LAN signal, which is in turn output to the wireless signal transmitting/receiving section 151a. Similarly, the antenna section 150b receives all radio waves transmitted from the APs 93a to 93e, and converts the signals to an electrical signal type wireless LAN signal, which is in turn output to the wireless signal transmitting/receiving section 151b.

The wireless signal transmitting/receiving sections 151a and 151b subject the output signal to a process, such as amplification or the like, and output the resultant signal to the signal transmission/reception separating sections 152a and 152b connected thereto.

Next, the signal transmission/reception separating sections 152a and 152b output the signal output from the wireless signal transmitting/receiving sections 151a and 151b connected thereto to the signal selecting sections 155a and 155b connected thereto. In response to this, the signal selecting sections 155a and 155b obtain an electrical signal type wireless LAN signal having frequencies of f1 to f5.

Firstly, an operation of the signal selecting section 155a will be described with reference to FIG. 24. The splitting section 1500a of the signal selecting section 155a splits the output electrical signal type wireless LAN signal having frequencies of f1 to f5, and outputs the resultant signals to the bandpass filters 1501a to 1501e. As a result, each of the bandpass filters 1501a to 1501e obtains the electrical signal type wireless LAN signal having frequencies of f1 to f5.

Next, the bandpass filter 1501a outputs an electrical signal type wireless LAN signal having a frequency of f1 to the switch 1504a. The bandpass filter 1501b outputs an electrical signal type wireless LAN signal having a frequency of f2 to the switch 1504b. The bandpass filter 1501c outputs an electrical signal type wireless LAN signal having a frequency of f3 to the switch 1504c. The bandpass filter 1501d outputs an electrical signal type wireless LAN signal having a frequency of f4 to the switch 1504d. The bandpass filter 1501e outputs an electrical signal type wireless LAN signal having a frequency of f5 to the switch 1504e.

Here, the switches 1504a to 1504e are turned ON/OFF in accordance with a setting of the setting section 156. In FIG. 24, the switches 1504a, 1504b, 1504d and 1504e are turned ON, while the switch 1504c is turned OFF. Therefore, the connector 1502a outputs electrical signal type wireless LAN signals having frequencies of f1, f2, f4 and f5 to the combining section 1503a. The combining section 1503a frequency-multiplexes the electrical signal type wireless LAN signals having frequencies of f1, f2, f4 and f5, and outputs the resultant signal to the main station optical signal transmitting section 153a. The main station optical signal transmitting section 153a converts the multiplexed signal to an optical signal, which is in turn output through the optical fiber transmission line 50a to the sub-station 20a. As a result, signals output from the APs 93a, 93b, 93d and 93e reach the area C.

Next, an operation of the signal selecting section 155b will be described. The operation of the signal selecting section 155b is basically the same as that of the signal selecting section 155a, and therefore, only different portions will be described.

The operation of the splitting section 1500b and bandpass filters 1501f to 1501j are the same as those of the splitting section 1500a and the bandpass filters 1501a to 1501e and will not be explained.

Here, the switches 1504f to 1504j are turned ON/OFF in accordance with a setting of the setting section 156. In FIG. 24, the switches 1504f and 1504h a returned ON, while the switches 1504g, 1504i and 1504j are turned OFF. Therefore, the connector 1502b outputs electrical signal type wireless LAN signals having frequencies of f1 and f3 to the combining section 1503b. The combining section 1503b frequency-multiplexes the electrical signal type wireless LAN signal having frequencies of f1 and f3, and outputs the resultant signal to the main station optical signal transmitting section 153b. The main station optical signal transmitting section 153b converts the multiplexed signal to an optical signal, which is in turn transmitted through the optical fiber transmission line 50b to the sub-station 20b. As a result, signals output from the APs 93a and 93c reach the area D.

Note that operations during communication between the sub-stations 20a and 20b, and the terminals C and D in the areas C and D are similar to those of Embodiment 2 and the like, and will not be explained.

Note that an operation of the wireless communication system of Embodiment 5 performed when the terminal C transmits a signal to an external network is similar to that of Embodiment 4, and will not be explained.

As described above, according to the wireless communication system of Embodiment 5, similar to Embodiment 2, the accommodation capacity of the AP 93 can be effectively utilized.

Further, according to the wireless communication system of Embodiment 5, similar to Embodiment 2, only a wireless LAN signal(s) required for each area is selectively output, thereby making it possible to improve the security of the wireless communication system.

Note that examples of the frequencies f1 to f5 of a signal output by the AP 93 in Embodiments 4 and 5 include 2.412 GHz (IEEE802.11b standard), 2.437 GHz (IEEE802.11g standard) and 5.17 GHz (IEEE802.11a standard), which are center frequencies.

Here, in conventional wireless communication systems, where there are two wireless communication areas, an AP which supports the IEEE802.11b standard needs to be placed in each of the areas in order to provide IEEE802.11b standard services to both the areas. Further, in order to provide IEEE802.11g standard services to both the areas, an AP of the IEEE802.11g standard needs to be placed in addition to the IEEE802.11b standard AP.

However, in Embodiments 4 and 5, if at least one AP is provided for each of the IEEE802.11b standard and the IEEE802.11g standard, services of each standard can be provided in a plurality of areas.

(Exemplary Configuration of Main Station of Embodiment 5)

Another exemplary configuration of the main station 35 of Embodiment 5 will be described with reference to the drawings. In the main station 35 described in Embodiment 5, an electrical signal type wireless LAN signal output from each of the APs 93a to 93e is selected and output into the sub-station 20a and/or 20b in accordance with the user's setting. To perform such selection, the signal selecting section 155 is provided.

However, a signal selecting method as described above is not limited to that which is performed by the signal selecting section 155. Specifically, a main station 35 of FIG. 25, which is different from the main station 35 of FIG. 23, receives no radio waves transmitted from the APs 93a to 93e. In other words, the main station 35 of FIG. 25 receives only a radio wave wireless LAN signal to be output to the sub-stations 20a and 20b. Hereinafter, another exemplary configuration of the main station 35 of Embodiment 5 will be described in detail with reference to FIG. 25.

Figure 25:
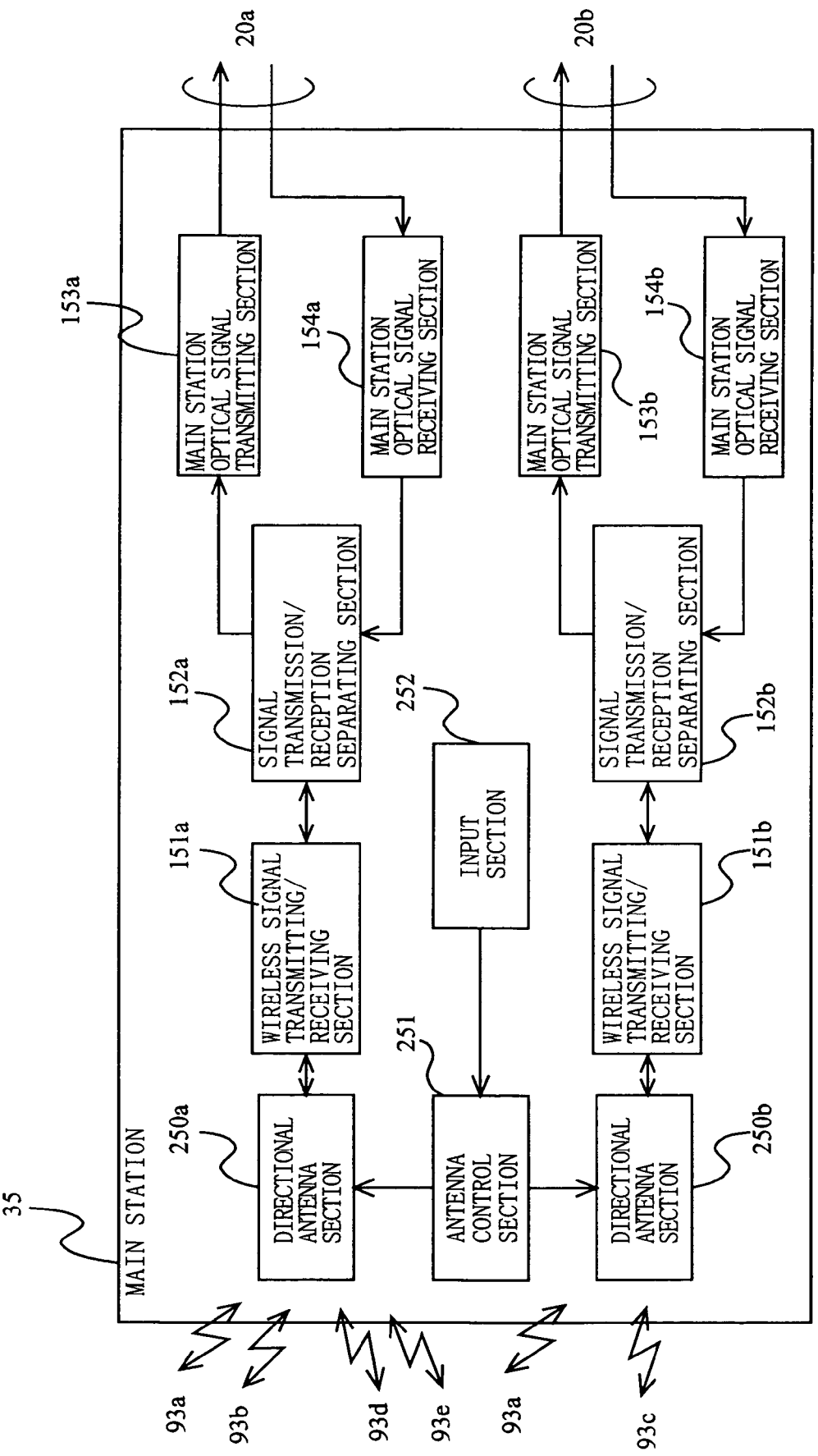
FIG. 25 is a block diagram showing another exemplary configuration of the main station 35 according to Embodiment 5 of the present invention.

As shown in FIG. 25, the main station 35 of this configuration example comprises wireless signal transmitting/receiving sections 151a and 151b, signal transmission/reception separating sections 152a and 152b, main station optical signal transmitting sections 153a and 153b, main station optical signal receiving sections 154a and 154b, directional antenna sections 250a and 250b, an antenna control section 251 and an input section 252.

Here, the wireless signal transmitting/receiving sections 151a and 151b, the signal transmission/reception separating sections 152a and 152b, the main station optical signal transmitting sections 153a and 153b, and the main station optical signal receiving sections 154a and 154b are the same as those of Embodiment 5 and will not be explained. Therefore, hereinafter, the directional antenna sections 250a and 250b, and the antenna control section 251 and the input section 252 will be described.

The directional antenna sections 250a and 250b include a plurality of antennas having so-called directionality. Specifically, the directional antenna sections 250a and 250b include five antennas for receiving radio waves transmitted from the APs 93a to 93e. Each of the five antennas has directionality so that the antenna can communicate with the corresponding one of the APs 93a to 93e only when the AP is located in a particular direction.

The antenna control section 251 controls directions of antennas included in the antenna control sections 250a and 250b in accordance with the user's input to enable communication with the desired APs 93a to 93e. The input section 252 is an input means for specifying which of the APs 93a to 93e is communicated with the directional antenna sections 250a and 250b.

Hereinafter, an operation of the thus-constructed main station 35 of this configuration example will be described. Note that operations of the SW 70, the APs 93a to 93e, the sub-stations 20a and 20b, and the terminals C and B are similar to those of Embodiment 5, and therefore, only an operation of the main station 35 of FIG. 25 will be described.

Firstly, the case where a signal is transmitted from an external network to each of the areas C and D will be described.

An Ethernet® signal is input from an external network to the SW 70. The SW 70 selects and outputs the Ethernet® signal to the APs 93a to 93e based on a network structure managed by the SW 70. Each of the APs 93a to 93e convert the obtained Ethernet® signal to an electrical signal type wireless LAN signal, which is in turn output as a radio wave to the main station 35. These operations are similar to those of Embodiments 1 to 5 and will not be further explained.

Next, each antenna in the directional antenna section 250 of the main station 35 selectively receives a radio wave transmitted from a predetermined one(s) of the APs 93a to 93e in accordance with a control of the antenna control section 251. Here, as an example, the directional antenna section 250a receives radio waves transmitted from the APs 93a, 93b, 93d and 93e, while the directional antenna section 250b receives signals from the APs 93a and 93c.

The directional antenna sections 250a and 250b convert each received radio wave to an electrical signal type wireless LAN signal and frequency-multiplexes the resultant signals, and outputs the multiplexed signal to the wireless signal transmitting/receiving sections 151a and 151b. The subsequent operations of the wireless signal transmitting/receiving sections 151a and 151b, the signal transmission/reception separating sections 152a and 152b, and the main station optical signal transmitting sections 153a and 153b are similar to those of Embodiment 4 or 5 and will not be explained. With the above-described operations, the electrical signal type wireless LAN signals transmitted from the AP 93a, 93b, 93d and 93e reach the area C, while the electrical signal type wireless LAN signals output from the AP 93a and 93c reach the area D, as in Embodiment 5.

Note that the operation of the main station 35 of this configuration example when the terminal C transmits a signal to an external network is similar to that of Embodiment 4 or 5 and will not be explained.

As describe above, the wireless communication system, to which the main station 35 of this configuration example is applied, it is no longer necessary to split a signal in the signal selecting section 155. Therefore, no signal power loss occurs, which otherwise occurs when splitting a signal. Further, even if the number of APs 93 or a frequency band used is changed, the main station 35 can be adapted to fit the changed situation without changing the configuration thereof.

Figure 26:
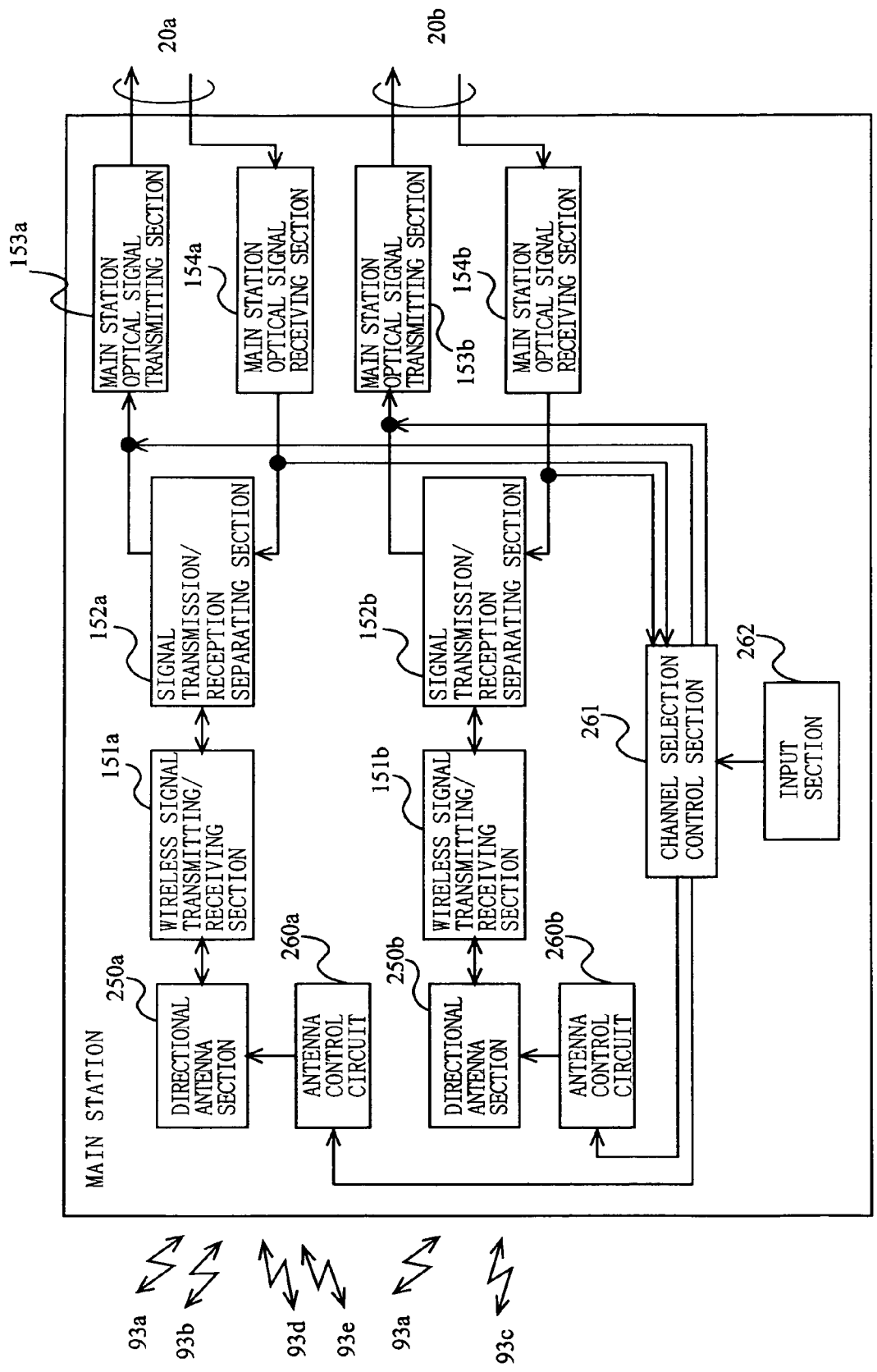
FIG. 26 is a block diagram showing another exemplary configuration of the main station 35 according to Embodiment 5 of the present invention.

Hereinafter, another exemplary configuration of the main station 35 of Embodiment 5 will be described with reference to the drawings. The main station 35 of this configuration example has a function to cause a terminal to start communication with a new communication route, which is set in response to a communication request from the terminal when the terminal is moved from one area to another. FIG. 26 is a block diagram showing a configuration of the main station 35 of this configuration example.

The main station 35 of this configuration example comprises wireless signal transmitting/receiving sections 151a and 151b, signal transmission/reception separating sections 152a and 152b, main station optical signal transmitting sections 153a and 153b, main station optical signal receiving sections 154a and 154b, directional antenna sections 250a and 250b, antenna control circuits 260a and 260b, a channel selection control section 261, and an input section 262.

Here, the wireless signal transmitting/receiving sections 151a and 151b, the signal transmission/reception separating sections 152a and 152b, the main station optical signal transmitting sections 153a and 153b, the main station optical signal receiving sections 154a and 154b, and the directional antenna sections 250a and 250b are similar to those of the main station 35 of FIG. 25 and will not be explained.

The antenna control circuits 260a and 260b control a direction of each antenna included in the antenna control sections 250a and 250b in accordance with a control of the channel selection control section 261 to enable communication with the desired APs 93a to 93e. The channel selection control section 261 has area information shown in FIG. 27. The input section 262 is an input means for specifying which of the APs 93a to 93e is communicated with the directional antenna sections 250a and 250b.

Here, the area information will be described. The area information indicates from which of the APs 93a to 93e signals are output to are as in which the sub-stations 20a and 20b a represent. Specifically, in the area information of FIG. 27, signals are output from the APs 93a, 93b, 93d and 93e to the area C to which the sub-station 20a belongs, while signals are output from the APs 93a and 93c to the area D to which the sub-station 20b belongs.

Here, general wireless LAN systems have a protocol such that when a terminal can receive no signal from any one of the APs 93, the terminal can transmit no signal to the AP 93. Therefore, when a terminal is moved to a new area, in which a signal having a frequency which is used by the terminal cannot be received from the AP 93 via the sub-station 20a or b, the terminal cannot transmit the request for starting communication to main station 35.

Therefore, the AP 93 transmits a signal having a frequency which can be continuously used by the terminal, to both the sub-stations 20a and 20b so that the terminal can transmit a signal. A specific example will be described with reference to FIG. 27. As shown in FIG. 27, a signal having a frequency of f1 output by the AP 93a can be received by both the sub-stations 20a and 20b. Therefore, a channel in the 2.4-GHz band, which is used in the most common IEEE802.11b for a wireless LAN system, is allocated for a signal having a frequency of f1. As a result, a signal having the frequency which can be used by the terminal continuously reaches both the areas C and D which are formed by the sub-stations 20*a* and 20*b*. The terminal transmits the communication start request in response to the signal. Thus, the terminal can receive a signal having the frequency which can be continuously used by the terminal, from a sub-station 20 in an area after movement, and in response to this signal, can transmit the communication start request.

Figure 28:
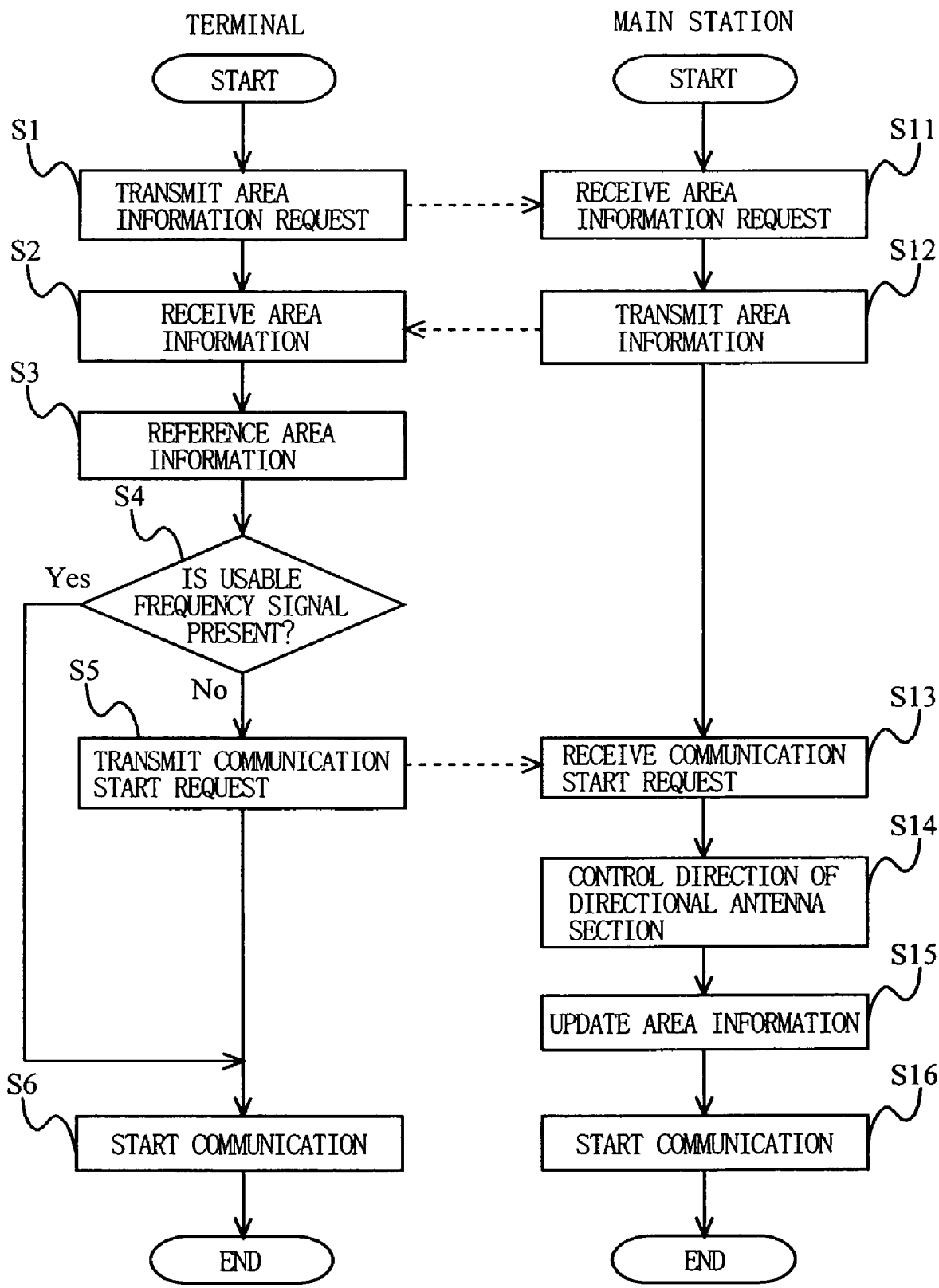
FIG. 28 is a flowchart showing operations of the main station 35 according to Embodiment 5 of the present invention and a terminal.

Hereinafter, an operation of a wireless communication system comprising the thus-constructed main station 35 of this configuration example will be described with reference to the drawings. FIG. 28 is a flowchart showing operations of a terminal E and the channel selection control section 261, where the terminal E is ready to start communication after the terminal E is moved from the area D to the area C.

When the terminal E is moved into the area C, the terminal E transmits a request for area information to the main station 35 via the sub-station 20*a* and the optical fiber transmission line 50*a* (step S1). In this step, the terminal E transmits the request using a wireless LAN signal having a frequency of f1 in response to a wireless LAN signal having a frequency of f1 output by the AP 93*a*.

In response to this, the main station optical signal receiving section 154*a* receives the request (step S11). The request is converted from an optical signal to an electrical type wireless LAN signal, which is in turn output to the signal transmission/reception separating section 152 and the channel selection control section 261.

The channel selection control section 261 transmits area information in response to the obtained request (step S12). Specifically, main station signal transmitting section 153 converts the area information to an optical signal, which is in turn output to the sub-station 20*a*. Thereafter, the area information reaches via the optical fiber transmission line 50*a* and the sub-station 20*a* to the terminal E. Thus, the terminal E receives the area information (step S2).

The terminal E, which has received the area information, references the area information (step S3). The terminal E determines whether or not an AP 93 corresponding to a frequency which is used in the area D before movement, can be used in an area to which the terminal E belongs (step S4). Specifically, the channel selection control section 261 determines whether or not a circle is present in a field of an AP 93 having a frequency, which is to be used by the terminal E, in the area information. For example, in FIG. 27, when the terminal E uses f1 in the area D and it is also desired for the terminal E to use the frequency f1 in the area C, it is determined whether or not a circle is present in the f1 field of the sub-station 20*a*. When f3 is used in the area D and it is also desired to use the frequency f3 in the area C, it is determined whether or not a circle is present in the f3 field of the sub-station 20*a*. Here, when the determination is affirmative, the process goes to step S6. When the determination is negative, the process goes to step S5.

Here, when the determination is affirmative, the terminal E starts communication (step S6). In FIG. 27, the affirmative result of the determination may mean that the terminal E has performed communication using a signal having a frequency of f1 in the area D. Note that, in this case, the terminal E performs communication via an AP 93 having the frequency which has been used in the area D (f1 in the case of FIG. 27).

When the determination is negative, the terminal E transmits a request for starting communication in which a frequency which has been used in the area D is used, to the main station 35 via the sub-station 20*a* and the optical fiber transmission line 50*a* (step S5). Note that the frequency of a signal used here is the same as that of a signal used in step S1 (e.g., a signal in the 2.4-GHz band of IEEE802.11b). In FIG. 27, the negative result of the determination may mean that the terminal E has performed communication using a signal having a frequency of f3 in the area D. In response to this, the main station 35 receives the request using the main station optical signal receiving section 154*a* (step S13). The main station optical signal receiving section 154*a* converts the request to an electrical signal type wireless LAN signal, which is in turn output to the channel selection control section 261.

The channel selection control section 261 specifies a frequency of a wireless LAN signal to be used for the requested communication, and also specifies an AP 93 (the AP 93*c* in FIG. 27) corresponding to the specified frequency (f3 in FIG. 27). And, the channel selection control section 261 causes the antenna control circuit 260*a* to control a direction of an antenna corresponding to the specified AP 93 of the antennas of the directional antenna section 250*a* (step S14). As a result, a wireless LAN signal from the AP 93 specified by the channel selection control section 261 is output to the area C to which the sub-station 20*a* belongs.

Next, the channel selection control section 261 updates the area information (step S15). Specifically, the channel selection control section 261 registers, into the area information, information that a signal output from the specified AP 93 is adapted to be output to the sub-station 20*a*. Thereafter, the terminal E and the main station 35 start communication (steps S6 and S16).

As described above, in a wireless communication system, to which the main station 35 of this configuration example is applied, a signal having a frequency which can be used by all terminals (a wireless LAN signal having a frequency of f1 in this configuration example) is continuously transmitted from the AP 93 via the sub-stations 20*a* and 20*b* to both the areas C and D. Therefore, a terminal can receive a signal having a frequency, which can be continuously used by all terminals, in an area after movement. As a result, it is possible to avoid the case where no signal having a usable frequency is transmitted to an area after movement, so that no terminal can transmit a request signal for starting communication.

Note that, in this configuration example, the area information includes only information indicating from which of the AP 93 a signal is transmitted to each area. The area information is not limited to this. For example, the area information can include information, such as an IP address, a system-specific number, billing information or the like.

Note that, in Embodiments 1 to 5, when no communication occurs between the AP 93 and the sub-station 20 for a predetermined period of time, it may be determined that no terminal which performs communication with the AP 93 is present in an area to which the sub-station 20 belongs, and communication between the AP 93 and the sub-station 20 may be ended. As a result, it is possible to prevent unnecessary signals from being transmitted to each area, whereby security is improved, addition of extra noise can be suppressed, and power consumption can be reduced.

Note that the terminal requests for start of communication using a signal of IEEE802.11b, but a communication method for the request is not limited to this. For example, a communication route dedicated to the communication start request, such as Bluetooth® or the like, may be provided between the sub-station 20 and the terminal. As a result, it is no longer necessary that the sub-station 20 continuously transmits a signal to the area.

(Exemplary System Configuration)

Figure 29:
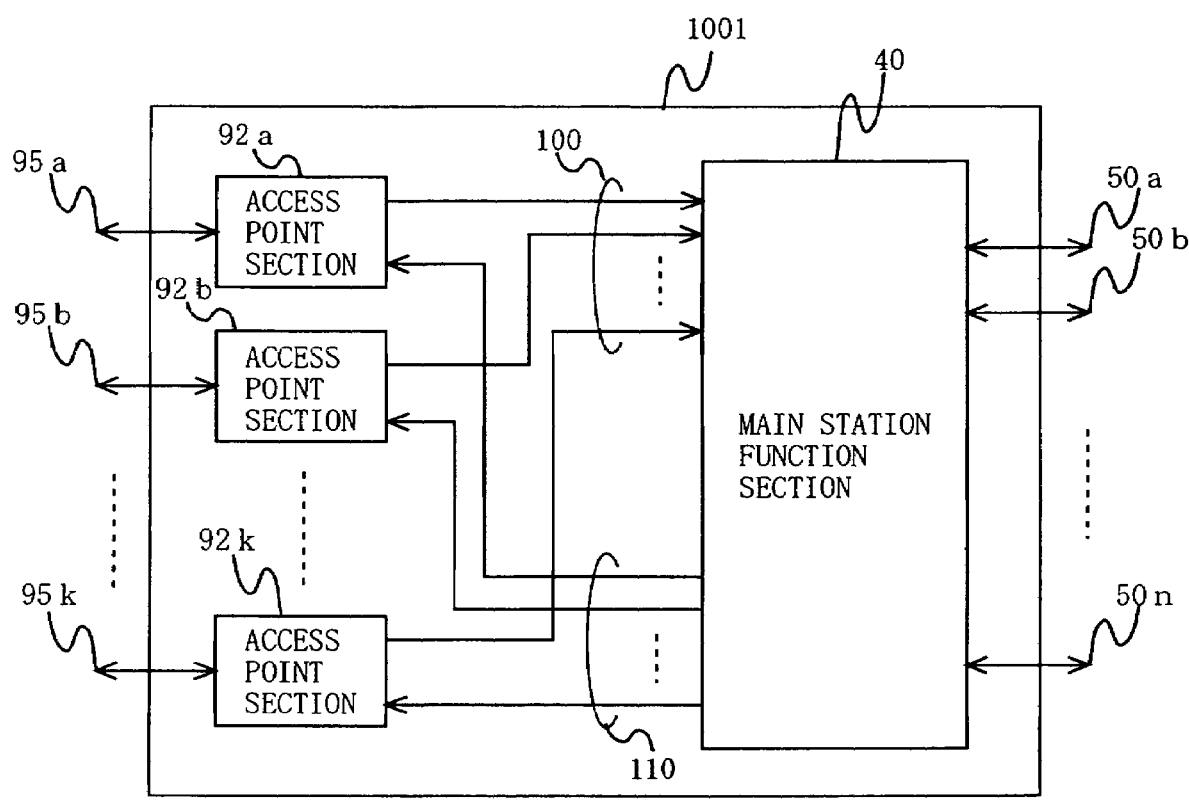
FIG. 29 is a block diagram showing a configuration of a wireless signal optical transmission center apparatus, in which APs and a main station are integrated together, for use in a wireless communication system of the present invention.

Although the network switch, the AP and the main station are described as separate arrangements in Embodiments 1 to 3, they may be integrated together. FIG. 29 is a block diagram showing an exemplary configuration of a wireless signal optical transmission center apparatus in which APs and a main station are integrated together.

The wireless signal optical transmission center apparatus comprises AP sections 92a to 92k and a main station function section 40. The AP sections 92a to 92k have a function similar to that of the sub-station 20 of Embodiments 1 to 3 and the above-described configuration examples thereof. The main station function section 40 has a function similar to that of the main station 10 and the AP 90 of Embodiments 1 to 3 and the above-described configuration examples thereof. Therefore, the detailed configuration and operation of these elements will not be described.

Figure 30:
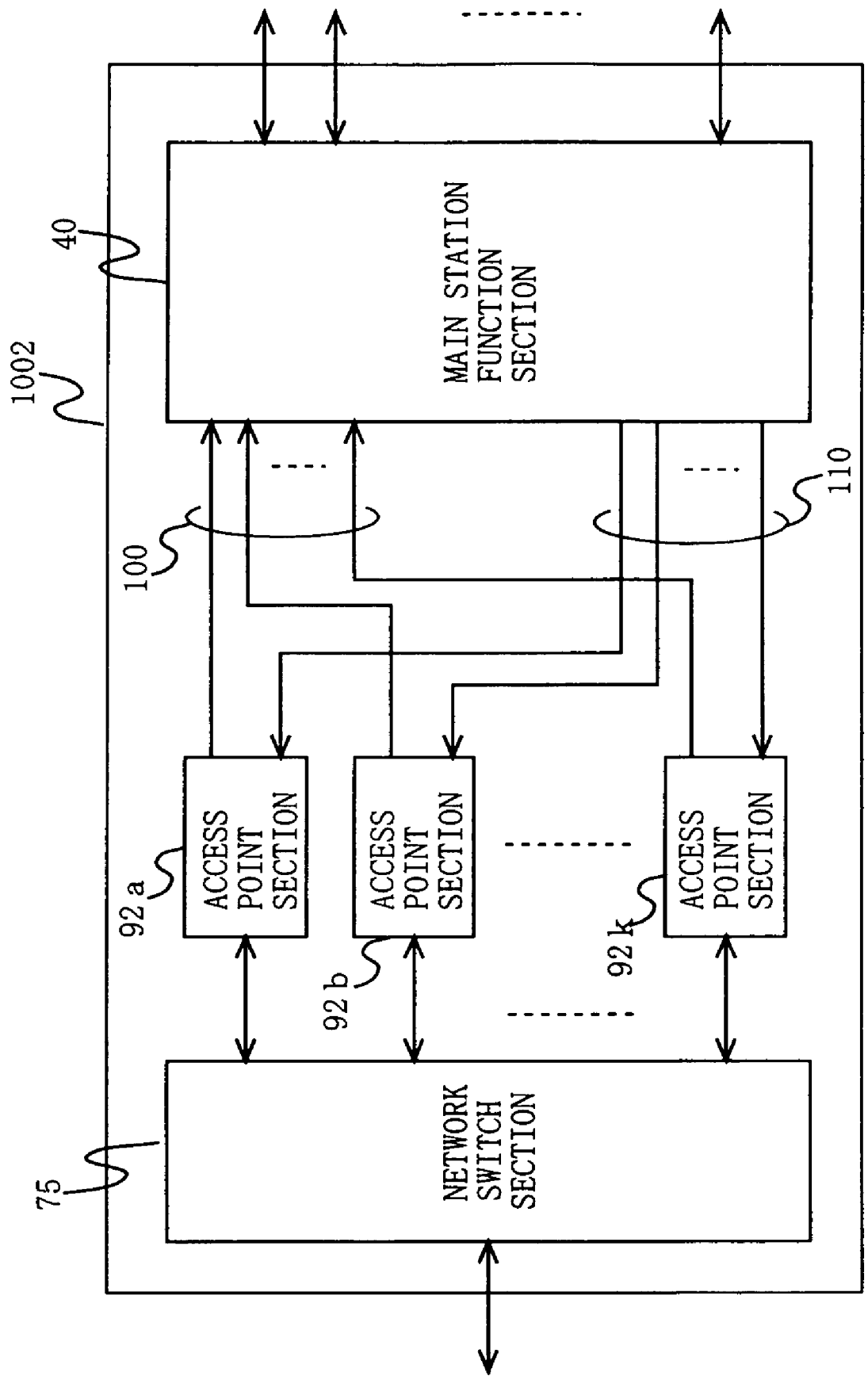
FIG. 30 is a block diagram showing a configuration of a wireless signal optical transmission center apparatus, in which a network switch, APs and a main station are integrated together, for use in a wireless communication system of the present invention.

Next, another exemplary configuration of the wireless signal optical transmission center apparatus will be described with reference to FIG. 30. FIG. 30 is a block diagram showing another exemplary configuration of the wireless signal optical transmission center apparatus. The wireless signal optical transmission center apparatus of this configuration example is composed of a network switch, APs and a main station, which are integrated together.

The wireless signal optical transmission center apparatus comprises a network switch section 75, AP sections 92a to 92k, and a main station function section 40. The wireless signal optical transmission center apparatus of FIG. 30 and the wireless signal optical transmission center apparatus of FIG. 29 are different from each other in that the network switch section 75 is provided. Here, the network switch section 75 has the same function as that of the network switch of Embodiments 1 to 3. Therefore, configurations and operations of the network switch section 75, the AP sections 92a to 92k, and the main station function section 40 will not be explained.

According the above-described two configuration examples, the wireless signal optical transmission center apparatus incorporates both the AP function and the main station function, thereby making it possible to achieve connection and wiring using an optimum signal form, and therefore, reduce cost as a whole.

When the AP and the main station 10 are separate apparatuses, a high-frequency signal needs to be taken out to the outside and they need to be connected via a high-frequency coaxial cable or the like. On the other hand, when the wireless signal optical transmission center apparatus has both the AP function and the main station function, a short cable can be advantageously used and the like.

Further, according to the above-described two configuration examples, a signal switching diversity function is easily implemented if the wireless signal optical transmission center apparatus has the AP function and the main station function. Further, signal switching diversity capable of switching three or more signals is easily achieved. Furthermore, it is possible to easily achieve selection diversity such that two or more signals are demodulated simultaneously and a signal having the highest quality is selected (selection diversity is not performed in general APs).

Note that, in the wireless signal optical transmission center apparatus of FIG. 30, it is preferable that a transmission line connecting the network switch section 75 and an external network has a greater transmission capacity than the sum of transmission capacities of the AP sections 92a to 92k. This is not necessarily an absolute condition, since the network switch section 75 has a communication control function. Further, as a signal interface, a typical Ethernet® signal may be used, however, if an optical signal is output as a media converter interface, long-distance transmission can be achieved, so that a wireless signal optical transmission center apparatus can be installed in a remote place away from a place in which a network apparatus is located.

Figure 31A:
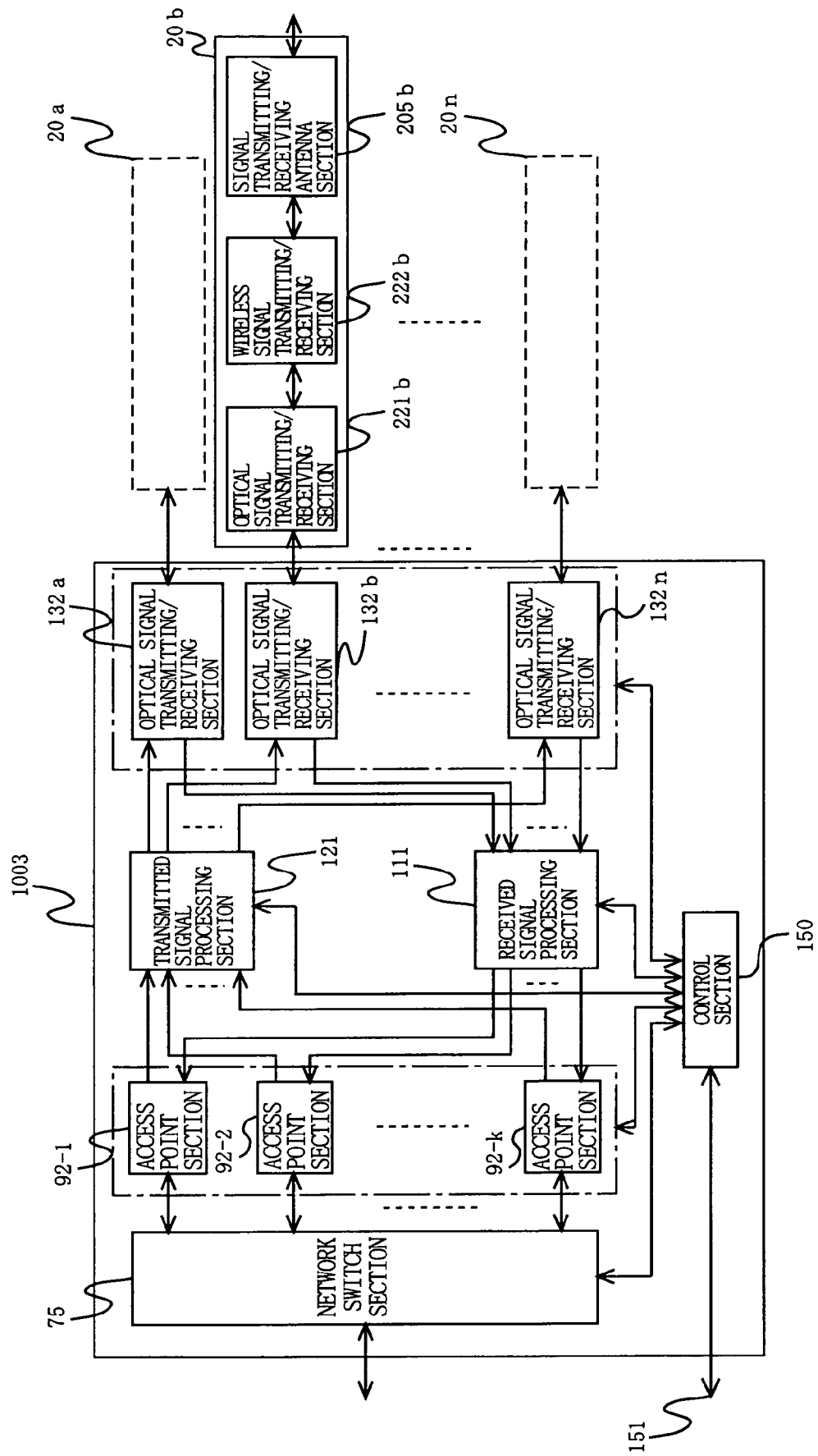
FIG. 31(a) is a block diagram showing a detailed configuration of the wireless signal optical transmission center apparatus, in which a network switch, APs and a main station are integrated together, for use in a wireless communication system of the present invention.

FIG. 31(a) is a block diagram showing exemplary configurations of a wireless signal optical transmission center apparatus, into which a network switch, APs and the main station 10 of FIG. 2 are integrated, and the sub-station 20. The function of each component is similar to that of the above-described configuration example and the main station 10 of FIG. 2 and will not be explained. Further, the operations of each component performed when a signal is transmitted from the sub-station 20 to an external network and when a signal is transmitted from an external network to the sub-station 20 are similar to those of Embodiment 1 and will not be explained.

Here, the wireless signal optical transmission center apparatus of FIG. 31(a) is provided with a control section 150. The control section 150 controls settings of the network switch section 75, the AP sections 92a to 92k, the transmitted signal processing section 121, and the received signal processing section 111 in order to control a signal flow. The control section 150 sets each component in accordance with an instruction indicated by a communication control signal 151 input from the outside (e.g., setting of a communication route in the wireless communication system). In addition to the setting of a route in the wireless communication system, the control section 150 collects supervision information about a state of the wireless signal optical transmission center apparatus and the sub-station and provides settings thereto. The control section 150 also has a supervision control function to communicate with the outside using a protocol, such as, for example, SNMP.

Here, the communication control signal 151 serves as a signal for supervision control as well as a signal for route setting. When communication occurs between an external network and an Ethernet® signal, the communication control signal 151 can be input from the network switch section 75 to the wireless signal optical transmission center apparatus. Therefore, in this case, the communication control signal 151 may not be necessarily transmitted via a dedicated line, as is different from FIG. 39.

The wireless signal optical transmission center apparatus of FIG. 31(a) includes the network switch section 75, and therefore, the AP sections 92a to 92k and the network switch section 75 can be connected in an optimum signal form. More specifically, as an interface of this portion, the PCI format, the MII format or other original formats can be applied, thereby making it possible to improve performance and reduce cost as a whole.

A CPU is inherently required for control of an AP. Generally, the AP sections 92a to 92k each include a CPU. However, when a plurality of AP sections 92a to 92k are provided in the same apparatus as shown in FIG. 39, the AP sections 92a to 92k can be controlled using a single CPU (control section 150). Note that the control section 150 may be achieved using either a single CPU or a plurality of CPUs.

Note that it is possible to provide the control section 150 in the wireless signal optical transmission center apparatus of FIG. 20 in a manner shown in FIG. 31(a). In this case, however, the network switch is a separate section, so that the network switch cannot be controlled.

(Diversity Function)

Here, a diversity function may be provided in the main station 10 of the wireless communication system of Embodiments 1 to 5. Hereinafter, a wireless communication system comprising the main station 10 having a diversity function will be described. Note that in the following description, it is assumed that the main station 10 of Embodiment 2 of FIG. 13 is provided with the diversity function. Therefore, the configuration of the wireless communication system is the same as that of FIG. 1.

Here, the operations of the main station optical signal transmitting sections 102a and 102b, the main station optical signal receiving sections 112a and 112b, the transmitted signal processing section 121, the input section 141, and the setting section 142 are similar to those of Embodiment 2 and will not be explained. Specifically, when the diversity function is provided, operations of the APs 91a to 91e and the received signal processing section 111 are different from those of Embodiment 2. Therefore, the APs 91a to 91e and the received signal processing section 111 will be described in detail.

The APs 91a to 91e have a function to measure an intensity of an electrical signal type wireless LAN signal output from the main station 10. Further, the APs 91a to 91e have a function to transmit a switching signal for switching a signal output from the main station 10 when the measured signal intensity is lower than a predetermined value.

It is assumed that the received signal processing section 111 of the main station 10 receives the switching signal from the APs 91a to 91e and receives signals having the same contents from two or more sub-stations 20. In this case, instead of a signal currently transmitted to the APs 91a to 91e, the received signal processing section 111 transmits another signal having the same contents to the APs 91a to 91e.

Hereinafter, an operation of the wireless communication system including the thus-constructed main station 10 will be described. Note that, here, as an exemplary operation of the wireless communication system, a signal output from the AP 91a is transmitted by the transmitted signal processing section 121 to the sub-stations 20a and 20b. In response to this, the AP 91a receives signals from both the sub-stations 20a and 20b.

The AP 91a receives an electrical signal type wireless LAN signal transmitted by the sub-station 20a via the main station 10 and measures an intensity of the electrical signal type wireless LAN signal. When the measured intensity of the electrical signal type wireless LAN signal is smaller than a predetermined value, the AP 91a transmits a switching signal to the main station 10 so that the main station 10 switches an electrical signal type wireless LAN signal to be transmitted by the main station 10.

The switching signal is received in the transmitted signal processing section 121 of the main station 10, and reaches via the setting section 142 to the received signal processing section 111. Here, the received signal processing section 111 determines whether or not an electrical signal type wireless LAN signal, which is to be transmitted to the AP 91a and has the same contents, is transmitted from two or more sub-stations. When two or more of such electrical signal type wireless LAN signals are present, an electrical signal type wireless LAN signal, which is transmitted from a sub-station 20 different from that which is transmitting the current signal and is transmitted from the terminal C, is transmitted to the AP 91a. Note that, here, the sub-station 20b transmits the signal received from the terminal C via the main station 10 to the AP 91a.

The AP 91a measures whether or not the intensity of the received electrical signal type wireless LAN signal is higher than the predetermined value. When the measured signal intensity is lower than predetermined value, the switching signal is transmitted to the main station again. Subsequent processes are similar to those described above.

By repeating the above-described operation, the AP 91a can receive a signal having a predetermined level or higher of signal quality.

Note that the number of the sub-stations 20 is here assumed to be two, but is not limited to this. When the number of the sub-stations 20 is three or more and there is a possibility that a signal from the terminal C is received from a sub-station 20 other than the sub-stations 20a and 20b to which the main station 10 transmits a signal, the signal from that sub-station 20 may be switched and output in addition to the signals from the sub-stations 20a and 20b. In this case, the received signal processing section 111 only needs to be set to operate in such a manner.

Note that, here, the main station 10 of Embodiment 2 of FIG. 13 has been described as an exemplary main station 10 to which the diversity function is applied, but the main station 10 to which the diversity function is applied is not limited to this. More specifically, the diversity function can be applied to all the main stations 10 of Embodiments 1 to 5.

Figure 31B:
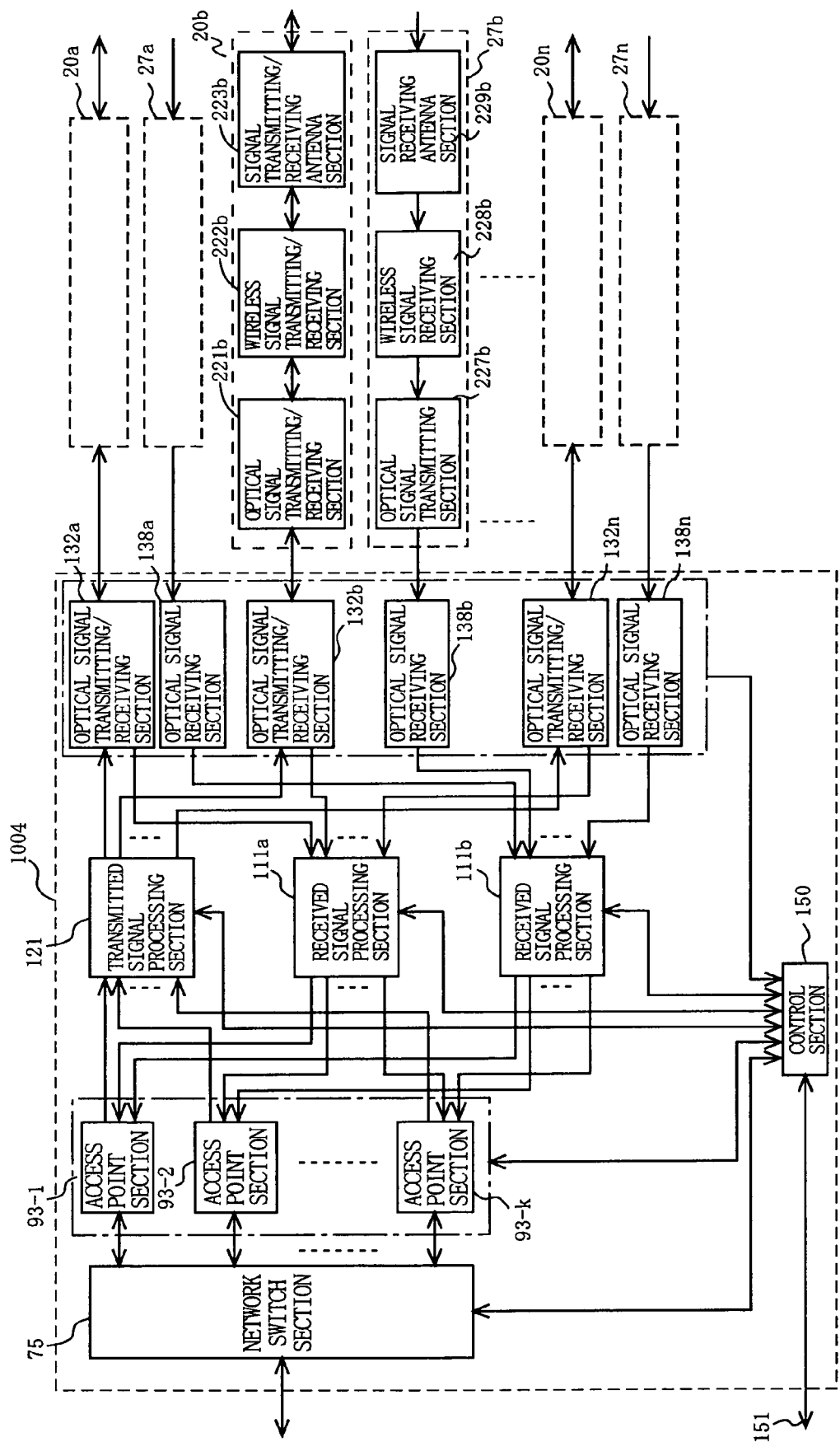
FIG. 31(b) is a block diagram showing a detailed configuration of the wireless signal optical transmission center apparatus, in which a network switch, APs and a main station are integrated together, for use in a wireless communication system of the present invention.

Here, an exemplary wireless communication system including a wireless signal optical transmission center apparatus, to which the diversity function is applied, will be described with reference to the drawings. When the above-described main station 10 having the diversity function receives a signal transmitted from the same terminal via two sub-stations 20, the main station 10 selects one having the greater intensity of the two signals (diversity reception). In contrast to this, FIG. 31(b) shows a wireless communication system in which a reception-only sub-station is installed and a signal reception function for processing a signal received by the reception-only sub-station is provided in a wireless signal optical transmission center apparatus. Hereinafter, the wireless communication system will be described in detail with reference to FIG. 31(b). Here, FIG. 31(b) is a block diagram showing configurations of the wireless signal optical transmission center apparatus of this configuration example and sub-stations.

The wireless signal optical transmission center apparatus 1004 comprises a network switch section 75, access point sections 93-1 to 93-k, received signal processing sections 111a and 111b, a transmitted signal processing section 121, optical signal transmitting/receiving sections 132a to 132n, optical signal receiving sections 138a to 138n, and a control section 150. Each sub-station 20 comprises an optical signal transmitting/receiving section 221, a wireless signal transmitting/receiving section 222, and a signal transmitting/receiving antenna section 223.

Here, the network switch section 75, the received signal processing section 111a, the transmitted signal processing section 121, the optical signal transmitting/receiving sections 132, the optical signal transmitting/receiving section 221, the wireless signal transmitting/receiving section 222, and the signal transmitting/receiving antenna section 223 are similar to those of FIG. 31(a) and will not be explained.

Here, reception-only sub-stations 27a to 27n are typically provided, corresponding to sub-stations 20a to 20n, respectively. Each sub-station 27 comprises an optical signal transmitting section 227, a wireless signal receiving section 228, and a signal receiving antenna section 229. The reception-only sub-stations 27a to 27n receive a radio wave type wireless LAN signal transmitted from a terminal in an area of the respective corresponding sub-stations 20a to 20n, and convert the received signal to an optical signal, which is in turn transmitted to the wireless signal optical transmission center apparatus 1004. Specifically, the signal receiving antenna section 229 receives a radio wave type wireless LAN signal. The wireless signal receiving section 228 converts a signal output from the signal receiving antenna section 229 to a form suitable for the optical signal transmitting section 227. The optical signal transmitting section 227 converts a signal converted by the wireless signal receiving section 228 to an optical signal, which is in turn output to the main station signal optical transmission center apparatus 1004.

An optical signal receiving section 138 in the main station signal optical transmission center apparatus 1004 converts an optical signal transmitted from the reception-only sub-station 227 to an electrical signal type wireless LAN signal, which is in turn output to the second received signal processing section 111*b*. The second received signal processing section 111*b* performs an operation similar to that of the received signal processing section 111*a*. Specifically, the second received signal processing section 111*b* selects electrical signal type wireless LAN signals output from the optical signal receiving sections 138*a* to 138*n* to the APs 93-1 to 93-*k* based on a setting of the control section 150.

The access point section 93 of this configuration example has a function of diversity reception, as is different from the access point section 93 of FIG. 31(*a*). Specifically, the same electrical signal type wireless LAN signal is transmitted from both a sub-station 20 and a reception-only sub-station 27 which are present in the same area, one of the two signals, which has a greater intensity or a higher signal quality, to an Ethernet® signal, which is in turn output to the network switch section 75.

Hereinafter, an operation of the thus-constructed wireless communication system of FIG. 31(*b*) will be described briefly. Here, operations from when a terminal present in an area of the sub-station 20*b* transmits a radio wave type wireless LAN signal to when the signal is subjected to diversity reception in the access point section 93, will be described. Other operations are the same as those of FIG. 31(*a*) and will not be explained.

The sub-station 20*b* and the reception-only sub-station 27*b* are in charge of the same area, and therefore, receive a radio wave type wireless LAN signal from a terminal in the same area. The sub-station 20*b* converts the received radio wave type wireless LAN signal to an optical signal, which is in turn output to the optical signal receiving section 132*b* of the main station signal optical transmission center apparatus 1004. Note that the operation of the sub-station 20*b* is similar to that which has been described in FIG. 31(*a*) and will not be explained.

The reception-only sub-station 27*b* converts the received radio wave type wireless LAN signal to an optical signal, which is in turn output to the optical signal receiving section 138*b* of the main station signal optical transmission center apparatus 1004. Note that the operation of the reception-only sub-station 27*b* is described above and will not be explained.

Here, an optical signal receiving section 132*b*, which has received the optical signal, converts the optical signal to an electrical signal type wireless LAN signal, which is in turn output to the received signal processing section 111*a*. The received signal processing section 111*a* outputs the output electrical signal type wireless LAN signal to any one of the access point sections 93-1 to 93-*k* in accordance with a control of the control section 150. Note that, here, the received signal processing section 111*a* outputs the electrical signal type wireless LAN signal output from the optical signal receiving section 132*b* to the access point section 93-2. Thus, a signal transmitted from a terminal reaches the access point 93-2.

The optical signal receiving section 138*b*, which has received an optical signal, converts the optical signal to an electrical signal type wireless LAN signal, which is in turn output to the received signal processing section 111*b*. The received signal processing section 111*b* outputs the output electrical signal type wireless LAN signal to any one of the access point sections 93-1 to 93-*k* in accordance with a control of the control section 150. Note that, here, received signal processing section 111*b* outputs the electrical signal type wireless LAN signal output from the optical signal receiving section 138*b* to the access point section 93-2. Thus, a signal transmitted from a terminal reaches the access point 93-2.

Next, when receiving an electrical signal type wireless LAN signal transmitted via the sub-station 20*b* and an electrical signal type wireless LAN signal transmitted via the reception-only sub-station 27*b*, the access point section 93-2 determines which of these two electrical signal type wireless LAN signal has a greater intensity or a higher signal quality. The access point 93-2 converts the electrical signal type wireless LAN signal, which is determined to be selected, to an Ethernet® signal, which is in turn output to the network switch section 75. Thereafter, the Ethernet® signal is output to an external network.

As described above, the wireless signal optical transmission center apparatus 1004 is provided with the diversity function, whereby a substantial improvement in signal quality can be expected and stabler communication can be achieved.

Note that the switching function of the access point as described above is possessed by typical, commercially available access points. Therefore, such commercially available access points can be incorporated directly as the access point sections 93-1 to 93-*k* of the wireless signal optical transmission center apparatus 1004 to achieve the wireless communication system.

In the wireless communication system of FIG. 31(*b*), the sub-station 20 and the reception-only sub-station 27 are accommodated in separate housings. The sub-station 20 and the reception-only sub-station 27, which are present in the same communication area, may be accommodated in the same housing.

Also, an optical fiber connecting the reception-only sub-station 27 and the main station 10 and an optical fiber connecting the sub-station 20 and the main station 10 are shown as separate ones. Alternatively, these may be connected using a single-conductor optical fiber.

The wireless communication system using the reception-only sub-station is not limited to that of FIG. 31(*b*), and can be applied to other wireless communication systems according to the present invention.

(Exemplary Signal Transmitting Method in Embodiments 1 to 3)

Hereinafter, another exemplary signal transmitting method in Embodiments 1 to 3 will be described.

In the foregoing description of Embodiments 1 to 3, an electrical signal type wireless LAN signal whose frequency is a wireless frequency (RF signal) is converted to an optical signal whose frequency is a wireless frequency, and the resultant optical signal is transmitted. However, the type of the electrical signal type wireless LAN signal is not limited to this. More specifically, the electrical signal type wireless LAN signal may be an IF signal. Hereinafter, a transmitting method using the IF signal will be described in detail.

Figure 33:
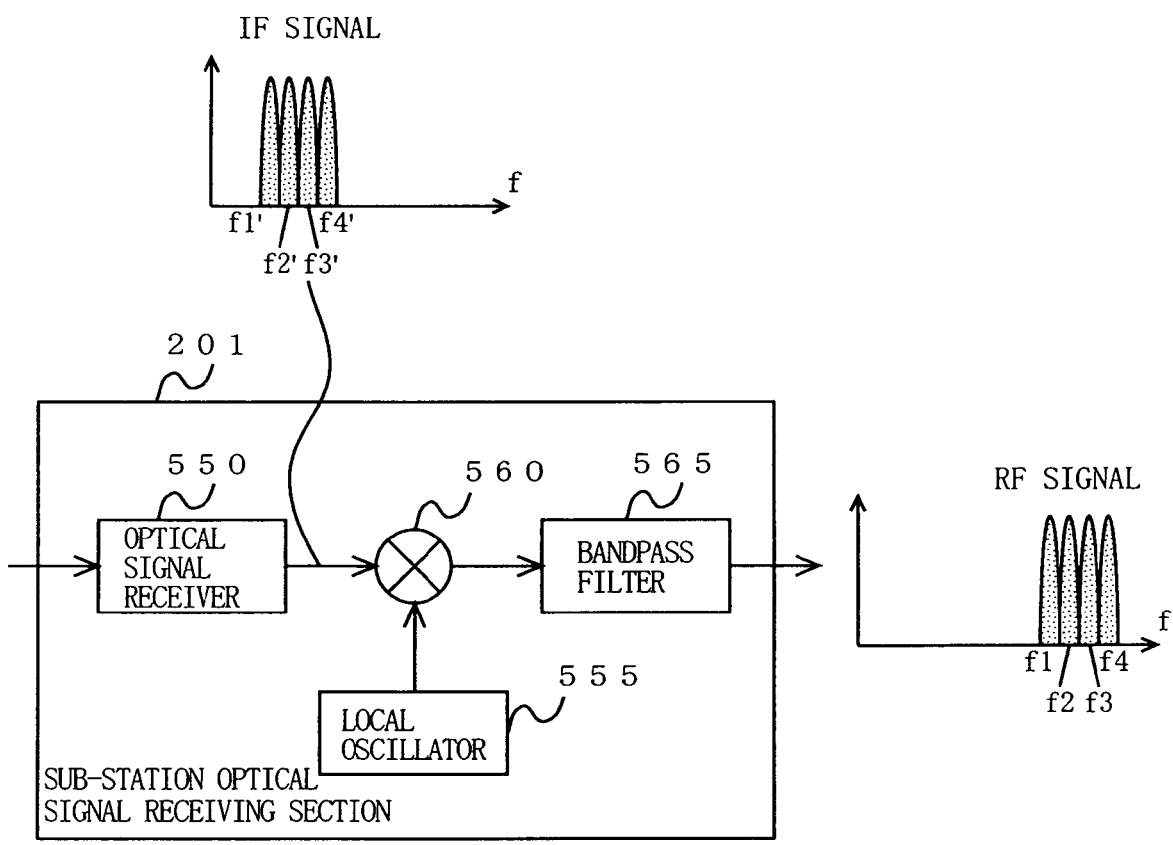
FIG. 33 is a block diagram showing a configuration of a sub-station optical signal receiving section 201 when the main station 10 and the sub-station 20 communicate using an optical signal having a frequency band of an IF signal, in the wireless communication system of the present invention.

Firstly, the case where an electrical signal type wireless LAN signal is converted from an RF signal to an IF signal in the main station optical signal transmitting section 102 of the main station 10 of FIG. 2, will be described with reference to FIGS. 32 and 33. FIG. 32 is a block diagram showing a detailed configuration of the main station optical signal transmitting section 102 of FIG. 2. FIG. 33 is a block diagram showing a detailed configuration of the sub-station optical signal receiving section 201 of the sub-station 20 of FIG. 3.

The main station optical signal transmitting section 102 comprises a mixer 505, a local oscillator 510, a bandpass filter 515, and an optical signal transmitter 520. The local oscillator 510 is an apparatus which generates a local oscillation signal (frequency: fi) for frequency-converting an electrical signal type wireless LAN signal which is an RF signal, to an IF signal. The mixer 505 mixes an electrical signal type wireless LAN signal which is an RF signal, with the signal generated by the local oscillator 510. The bandpass filter 515 extracts only an IF signal having a desired frequency from the frequency-converted signal. The optical signal transmitter 520 converts the IF signal output by the bandpass filter 515 to an optical signal.

The sub-station signal receiving section 201 comprises an optical signal receiving section 550, a local oscillator 555, a mixer 560, and a bandpass filter 565. The optical signal receiving section 550 converts an optical signal, which is a modulated IF signal, to an electrical signal type wireless LAN signal which is an IF signal. The local oscillator 555 is an apparatus for generating a local oscillation signal (frequency: fi) for converting an electrical signal type wireless LAN signal which is an IF signal, to an electrical signal type wireless LAN signal which is an RF signal. The mixer 560 mixes an electrical signal type wireless LAN signal which is an IF signal, with the signal generated by the local oscillator 555. The bandpass filter 515 extracts an RF signal having a desired frequency from the frequency-converted signal.

Hereinafter, an operation of a wireless communication system, to which the above-described main station signal transmitting section 102 and the above-described sub-station signal receiving section 201 are applied, will be described. This wireless communication system is similar to the wireless communication system of Embodiment 1, except that an electrical signal type wireless LAN signal which is an RF signal, is converted to an electrical signal type wireless LAN signal which is an IF signal, in the main station signal transmitting section 102, and an electrical signal type wireless LAN signal which is an IF signal, is converted to an electrical signal type wireless LAN signal which is an RF signal, in the sub-station signal receiving section 201. Therefore, here, only operations of the main station signal transmitting section 102 and the sub-station signal receiving section 201 will be described.

As shown in FIG. 32, the mixer 505 of the main station signal transmitting section 102 receives an electrical signal type wireless LAN signal which is an RF signal having frequencies of f1, f2, f3 and f4, and a local oscillation signal oscillated by the local oscillator 510. The mixer 505 mixes the input signals. As a result, signals, such as difference frequencies, sum frequencies and the like between f1 to f4 and fi, are generated.

The bandpass filter 515 extracts an electrical signal type wireless LAN signal which is an IF signal, from the signals, such as the difference frequencies, the sum frequencies and the like, generated in the mixer 515. Note that when the electrical signal type wireless LAN signal (IF signal) has frequencies of f1', f2', f3' and f4', a relationship is established among f1' to f4', f1 to f4 and fi as follows: f1'=f1−fi, f2'=f2−fi, f3'=f3−fi, f4'=f4−fi.

Thus, the electrical signal type wireless LAN signal (RF signal) is frequency-converted to the electrical signal type wireless LAN signal (IF signal) having the lower frequencies.

Next, the optical signal transmitter 520 converts the electrical signal type wireless LAN signal (IF signal) to an optical signal, which is in turn output to the optical fiber transmission line 50. Thus, the optical signal reaches the sub-station 20.

Next, the sub-station 20 receives the optical signal using the sub-station optical signal receiving section 201. The optical signal receiving section 550 converts the optical signal to an electrical signal type wireless LAN signal which is an IF signal. The electrical signal type wireless LAN signal (IF signal) has the above-described frequencies of f1' to f4'.

The local oscillator 555 outputs a local oscillation signal having a frequency of fi to the mixer 560. The mixer 560 mixes the local oscillation signal output from the local oscillator 555 with the electrical signal type wireless LAN signal (IF signal) output from the optical signal receiving section 550. As a result, signals, such as difference frequencies, sum frequencies and the like between f1' to f4' and fi, are generated.

The bandpass filter 565 extracts an electrical signal type wireless LAN signal which is an RF signal, from the signals, such as the difference frequencies, the sum frequencies and the like generated in the mixer 515. Note that the electrical signal type wireless LAN signal (RF signal) has frequencies of f1 to f4.

As described above, IF signal optical transmission can be achieved by combining the main station optical signal transmitting section 102 and the sub-station optical signal receiving section 201. As a result, a request for performance required for high frequency can be relaxed in optical devices, such as light emitting elements, light receiving elements and the like, electric devices associated therewith, and the like, so that low cost devices can be employed. The above-described signal transmission method can advantageously achieve a low cost optical transmission system.

Further, frequency-conversion is performed before or after the optical signal transmitter and the optical signal receiver, so that a plurality of signals can be collectively subjected to frequency-conversion, leading to a simpler configuration of the main station 10 or the sub-station 20 than when the signals are subjected individually to frequency-conversion.

Note that, here, the main station optical signal transmitting section 102 of the main station 10 of FIG. 2 and the sub-station signal receiving section 550 of the sub-station 20 of FIG. 3 have been described. However, the application of the main station optical signal transmitting section 102 of FIG. 32 and the sub-station optical signal receiving section 201 of FIG. 33 is not limited to this. More specifically, the main station optical signal transmitting section 102 of FIG. 32 and the sub-station optical signal receiving section 201 of FIG. 33 can be applied to all of the main stations 10 and the sub-stations 20 used in Embodiments 1 to 3.

Note that, here, an download system from the main station 10 to the sub-station 20 has been described, however, an upload system for IF signal optical transmission can be achieved using a configuration similar to that described above.

Figure 34:
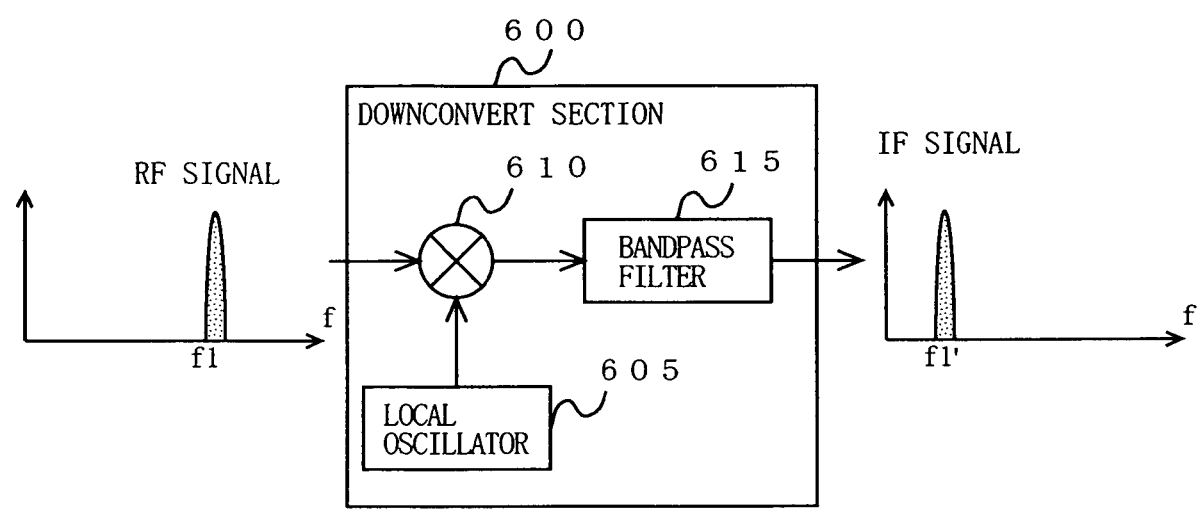
FIG. 34 is a block diagram showing a configuration of a downconvert section 600 for converting a signal to an electrical signal type wireless LAN signal which is an IF signal, immediately before being input to a transmitted signal combining section 101 of FIG. 2.

The place where an electrical signal type wireless LAN signal which is an RF signal, is converted to an electrical signal type wireless LAN signal which is an IF signal, is not limited to the inside of the main station optical signal transmitting section 102. More specifically, an electrical signal type wireless LAN signal (RF signal) may be converted to an electrical signal type wireless LAN signal (IF signal) immediately before being input to the transmitted signal combining section 101 of FIG. 2. In this case, a downconvert section 600 shown in FIG. 34 is provided between an input portion of the main station 10 and the transmitted signal combining section 101 for each signal line. Hereinafter, the downconvert section 600 will be described.

The downconvert section 600 comprises a local oscillator 605, a mixer 610, and a bandpass filter 615. The local oscillator 605 is an apparatus for generating a local oscillation signal (frequency: fi) for frequency-converting an electrical signal type wireless LAN signal which is an RF signal, to an IF signal. The mixer 610 mixes an electrical signal type wireless LAN signal which is an RF signal, with the signal generated by the local oscillator 605. The bandpass filter 615 extracts an IF signal having a desired frequency from the frequency-converted signal.

Hereinafter, an operation of the downconvert section 600 will be described. An electrical signal type wireless LAN signal (RF signal), which is input to the main station 10 of FIG. 2 from the AP 91a, is assumed to have a frequency of f1. When the electrical signal type wireless LAN signal (RF signal) is input to the main station 10, the signal is initially input to the mixer 610 of the downconvert section 600.

The mixer 610 mixes the local oscillation signal output from the local oscillator 605 with the electrical signal type wireless LAN signal (RF signal) output from the AP 91a. As a result, signals, such as a difference frequency, a sum frequency and the like between f1 and fi, are generated.

Next, the bandpass filter 615 extracts an electrical signal type wireless LAN signal which is an IF signal, from the signals, such as a difference frequency, a sum frequency and the like, which are generated by the mixer 610. Note that when the electrical signal type wireless LAN signal (IF signal) has a frequency of f1', a relationship is established between f1', f1 and fi as follows: f1'=f1−fi.

As a result, the electrical signal type wireless LAN signal (RF signal) is frequency-converted to an electrical signal type wireless LAN signal (IF signal) having a lower frequency. The subsequent operation of the transmitted signal combining section 101 is similar to that of Embodiment 1 and will not be explained.

Note that when the downconvert section 600 is provided in the main station 10, the sub-station optical signal receiving section 201 of FIG. 33 is used as that of the sub-station 20.

Note that, here, only the downconvert operation for an electrical signal type wireless LAN signal (RF signal) input from the AP 91a has been described, however, an electrical signal type wireless LAN signal (RF signal) input from the APs 91b to 91e can be downconverted in a similar manner.

Note that, here, a download system from the main station to the sub-station has been described. When an upload system is used for IF signal optical transmission, similar frequency-conversion is performed so that an original RF signal is restored in an output portion of the received signal processing section 111.

As described above, the downconvert section 600 of FIG. 34 is applied to the main station 10, and the sub-station optical signal receiving section 201 of FIG. 33 is applied to the sub-station 20, thereby making it possible to achieve IF signal optical transmission. As a result, an optical transmission system can be advantageously achieved with low cost.

Since an RF signal from an AP is converted to an IF signal at an input of the transmitted signal combining section 101 or the transmitted signal processing section 121, a lower frequency signal is handled in the transmitted signal combining section 101 or the transmitted signal processing section 121. As a result, a request for performance required for high frequency can be relaxed in electric devices used therein, so that low cost devices can be employed. In other words, the transmitted signal combining section 101 or the transmitted signal processing section 121 can be advantageously achieved with low cost. Further, a lower frequency advantageously leads to less crosstalk in the main station 10 to which the downconvert section 600 is applied.

Note that, here, the downconvert section 600 is assumed to be provided between the input portion of the main station 10 of FIG. 2 and the transmitted signal combining section 101, the place where the downconvert section 600 is applied is not limited to this. For example, the downconvert section 600 may be provided between an input portion of the main station 10 of FIG. 4 and the transmitted signal combining section 101, between an input portion of the main station 10 of FIG. 13 and the transmitted signal processing section 121, or the like.

Here, generally, an electrical signal type wireless LAN signal in an AP may inherently take a state of IF signal temporally (an IF signal in an AP is referred to as a first IF signal), and finally, is converted to an RF signal, which is in turn output. In this case, it may be conceived that an electrical signal type wireless LAN signal is taken out to the outside when it is the first IF signal, and the signal thus taken out is frequency-converted to a second IF signal in a downconvert section 650 shown in FIG. 35, which is provided between an input portion of the main station 10 and the transmitted signal combining section 101 or the transmitted signal processing section 121. Hereinafter, the downconvert section 650 and the main station 10 of FIG. 35 to which the downconvert section 650 is applied, will be described.

The downconvert section 650 comprises a local oscillator 655, a mixer 660, and a bandpass filter 665. The local oscillator 655 is an apparatus for generating a local oscillation signal (frequency: fi1) for frequency-converting an electrical signal type wireless LAN signal, which is a first IF signal, to a second IF signal. The mixer 660 mixes the electrical signal type wireless LAN signal (first IF signal) with the signal generated by the local oscillator 655. The bandpass filter 665 extracts only the second IF signal having a desired frequency from the frequency-converted signal.

Hereinafter, an operation of the downconvert section 650 will be described. It is assumed that an electrical signal type wireless LAN signal which is an IF signal having a frequency of f1", is output from the AP 91a to the downconvert section 650 of the main station 10. The mixer 660 mixes a local oscillation signal output from the local oscillator 655 with an electrical signal type wireless LAN signal (IF signal) output from the AP 91a. As a result, a signal, such as a difference frequency, a sum frequency and the like between f1" and fi1, are generated.

Next, the bandpass filter 665 extracts an electrical signal type wireless LAN signal (second IF signal) from the signals, such as the difference frequency, the sum frequency and the like, which are generated in the mixer 660. Note that the frequency f1" of the electrical signal type wireless LAN signal (second IF signal), and f1' and fi1 have the following relationship: f1"=f1'+fi1.

Thereafter, the second IF signal is processed in the transmitted signal combining section 101 in a manner similar to that of Embodiment 1. Note that this process is different from that of Embodiment 1 only in that the lower frequency second IF signal is used. The function of each component of the main station 10 is completely the same as that of the main station 10 of Embodiment 1.

Note that an optical signal, which reaches the sub-station 20, is the second IF signal which has been obtained by conversion, and therefore, the sub-station 20 has a function to convert the second IF signal to an RF signal. Therefore, the sub-station 20 has the sub-station optical signal receiving section 201 of FIG. 33.

As described above, in the wireless communication system employing the main station 10 to which the downconvert section 650 of FIG. 35 is applied, an electrical signal type wireless LAN signal is converted to an IF signal having a lower frequency than that of an RF signal. Therefore, the transmitted signal combining section, the transmitted signal processing section, and the optical transmission system can be obtained with low cost.

Further, connection between the main station and the AP can be achieved using an IF signal having a low frequency. Therefore, cable performance or implementation is achieved with a simple configuration. As a result, a wireless communication system can be obtained with lower cost.

Note that, here, only a signal from the AP 91a has been described. Similarly, as to the APs 91b to 91e, the downconvert section 650 of FIG. 35 is provided in the main station 10, corresponding to each of the APs 91b to 91e, whereby the first IF signal can be converted to the second IF signal. Note that, in this case, when it is assumed that an electrical signal type wireless LAN signal, which is a first IF signal output from the APs 91b to 91e, has a frequency of f1", a local oscillation signal corresponding to the AP 91b has a frequency of fi2, a local oscillation signal corresponding to the AP 91c has a frequency of fi3, a local oscillation signal corresponding to the AP 91d has a frequency of fi4, and a local oscillation signal corresponding to the AP 91e has a frequency of fi5, frequencies f2' to f5' of second IF signals have the following relationship: f2'=f1"+fi2, f3'=f1"+fi3, and f4'=f1"+fi4.

Although, here, all first IF signals output from the APs 91a to 91e have the frequency of f1", the first IF signals output from the APs 91a to 91e may have different frequencies from one another. In this case, a local oscillation signal having a frequency common to the APs 91a to 91e can be used. As a result, an oscillator common to the local oscillator 655 can be used.

Note that, in the main station 10 and the sub-station 20 described with reference to FIGS. 32 to 35, communication can be performed where an IF signal and an RF signal coexist. Here, in IF signal transmission, an IF signal frequency can be substantially arbitrarily selected, and with this advantage, optical transmission can be performed by collecting signals in a plurality of divided bands into a relatively narrow frequency area.

For example, in a wireless communication system which performs services in which IEEE802.11a and IEEE802.11b coexist, 2.4-GHz band is used for IEEE802.11b while 5.2-GHz band is used for IEEE802.11a. Therefore, if a signal for IEEE802.11a is frequency-converted to an IF signal in a 2.6-GHz band, an RF signal in the 2.4-GHz band for IEEE802.11b and an IF signal in the 2.6-GHz band for 802.11a are optically transmitted. As a result, a narrower band and a lower frequency are used. Therefore, a request for performance required for high frequency can be relaxed in the optical transmission system including an amplifier, a matching circuit and the like, so that a wireless communication system can be constructed with low cost.

(Exemplary Method for Connecting AP and Main Station in Embodiments 1 and 2)

Hereinafter, an exemplary method for connecting the AP 91 and the main station 10 of Embodiments 1 and 2 will be described.

In Embodiments 1 and 2, each of the APs 91a to 91e and the main station 10 are connected via two signal lines, one for transmitting a signal to the main station 10 and the other for receiving a signal from the main station 10. More specifically, this means that a signal line for transmitting a signal to the main station 10 is connected to a signal line in the APs 91a to 91e, through which a wireless LAN signal to be transmitted is passed, while a signal line for receiving a signal from the main station 10 is connected to a signal line in the APs 91a to 91e, through which a wireless LAN signal to be received is passed.

However, in the case of commercially available APs for a wireless LAN system, an I/O of a commercially available wireless portion is provided as a single signal line by using an RF switch, and therefore, cannot be connected directly to two signal lines. Therefore, in order to take out an input and an output via separate signal lines, it is necessary to modify a wireless LAN AP or create a special wireless LAN AP having a separate input and output.

Figure 36:
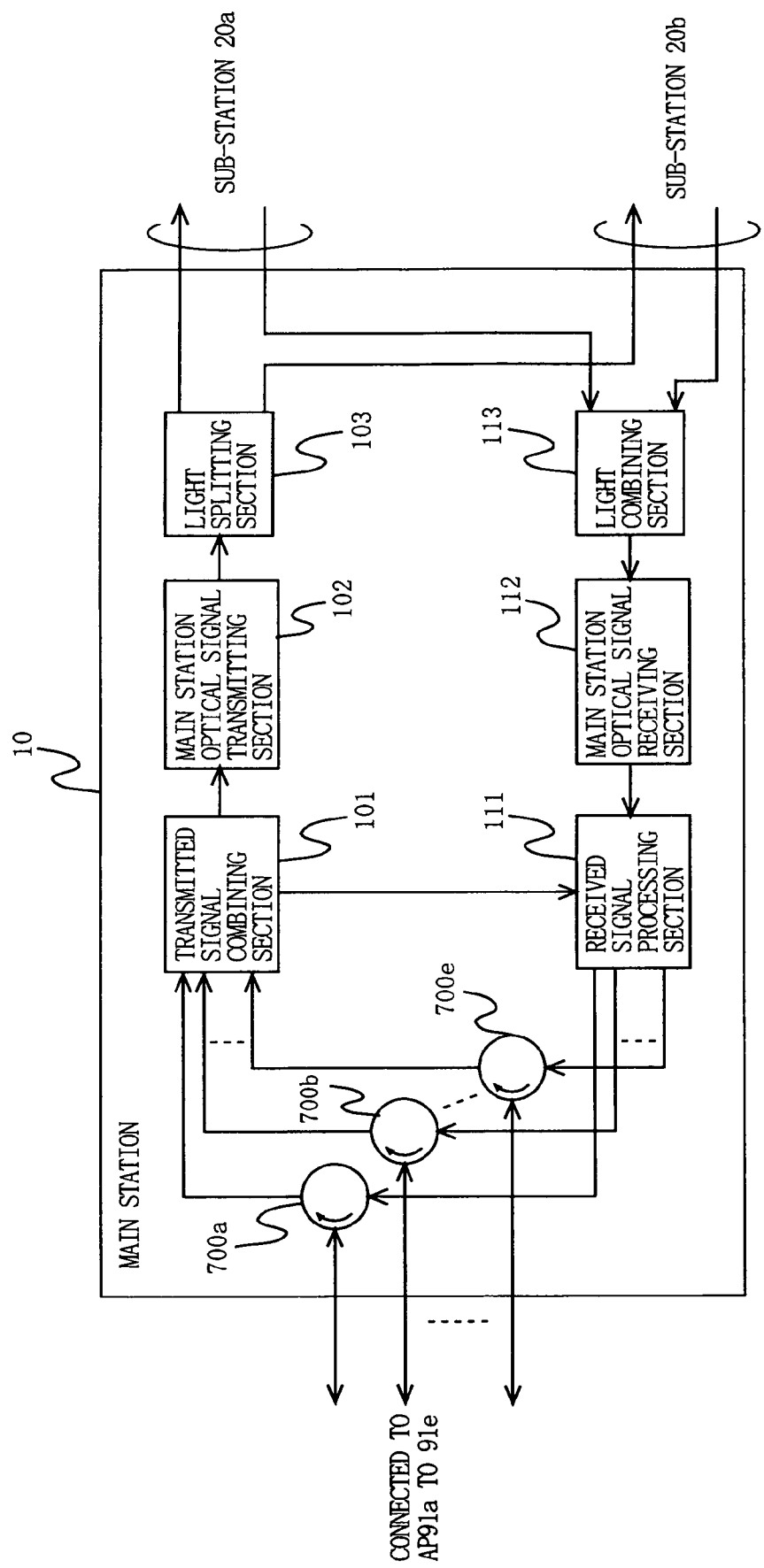
FIG. 36 is a block diagram showing a configuration of the main station 10 in which circulators 700a to 700e are applied to a connection portion of the main station 10 and the AP 91.

To solve the above-described problem, a main station 10 having circulators as shown in FIG. 36 is conceived. Here, FIG. 36 shows the main station 10 employing the circulators.

The main station 10 of FIG. 36 is obtained by providing circulators 700a to 700e between the transmitted signal combining section 101 and the received signal processing section 111, and the APs 91a to 91e in the main station 10 of FIG. 2. By providing the circulators in this portion, connection to a general wireless LAN AP can be achieved. Hereinafter, a detail description will be provided.

The main station 10 of FIG. 36 comprises a transmitted signal combining section 101, a main station optical signal transmitting section 102, a light splitting section 103, a received signal processing section 111, a main station optical signal receiving section 112, a light combining section 113, and the circulators 700a to 700e. The circulators 700a to 700e output a signal from the APs 91a to 91e to the transmitted signal combining section 101, and output a signal from the received signal processing section 111 to the APs 91a to 91e. Note that the transmitted signal combining section 101, the main station optical signal transmitting section 102, the light splitting section 103, received signal processing section 111, the main station optical signal receiving section 112, and the light combining section 113 are similar to the corresponding components of FIG. 2 and will not be explained.

Hereinafter, an operation of the main station 10 will be described. Signals from the APs 91a to 91e are transferred via the circulators 139a to 139e to the transmitted signal combining section 101. The subsequent processes of the transmitted signal combining section 101, the main station optical signal transmitting section 102, and the light splitting section 103 are similar to those of Embodiment 1 and will not be explained.

The light combining section 113, the main station optical signal receiving section 112, and the received signal processing section 111 perform processes similar to those of Embodiment 1. Thereafter, the received signal processing section 111 outputs an electrical signal type wireless LAN signal. In response to this, the circulators 139a to 139e output the electrical signal type wireless LAN signal to the APs 91a to 91e connected thereto. The subsequent processes of the APs 91a to 91e are similar to those of Embodiment 1 and will not be explained.

As described above, the circulators are introduced to connect the APs 91a to 91e and the main station 10, thereby making it possible to achieve connection to the main station without modifying a commercially available wireless LAN AP, whose wireless portion has an I/O which is a single signal line, or creating a special wireless LAN AP.

Note that the above-described circulator can be applied not only to the main station 10 of FIG. 2 but also all of the main stations 10 of Embodiments 1 to 3.

(Another Exemplary Network Structure of Embodiments 1 to 3)

In the wireless communication system of Embodiments 1 to 3, the main station 10 and the sub-stations 20 are connected in a star configuration. The network configuration of the wireless communication system is not limited to this. For example, the main station 10 and the sub-stations 20 are connected in either a cascade configuration or a loop configuration.

Figure 37:
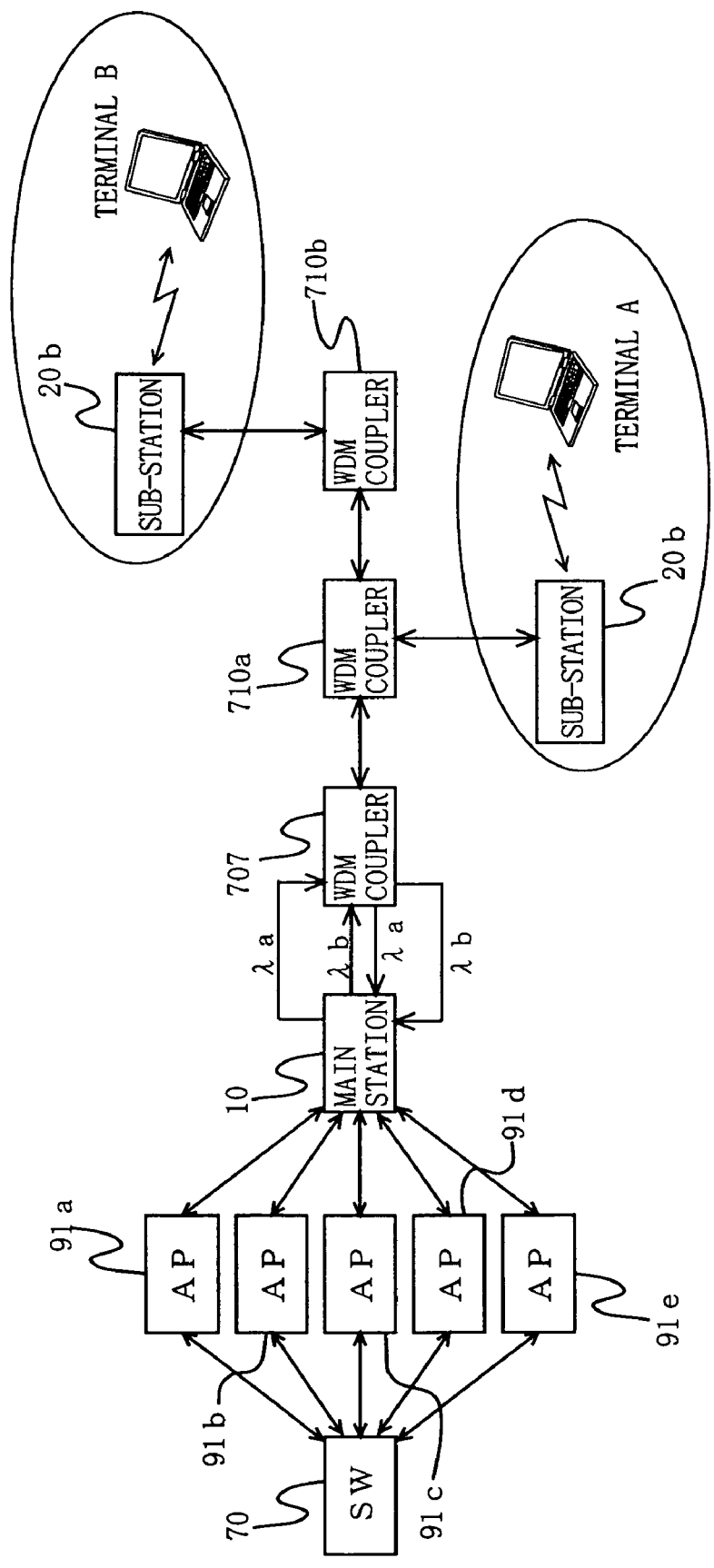
FIG. 37 is a block diagram showing a configuration of a wireless communication system, in which sub-stations 20a and 20b are connected in a cascade configuration using WDM couplers 710a and 710b.

Firstly, a wireless communication system will be described with reference to the drawings, where the main station 10 and the sub-stations 20 are connected in a cascade configuration. FIG. 37 is a block diagram showing a configuration of the wireless communication system, in which the main station 10 and the sub-stations 20 are connected in a cascade configuration.

The wireless communication system of FIG. 37 comprises a main station 10, sub-stations 20*a* and 20*b*, a SW 70, APs 91*a* to 91*e*, a WDM coupler 707, a WDM coupler 710*a* and 710*b*, and terminals A and B. In the wireless communication system, a different wavelength is allocated for each of the sub-stations 20, and the main station 10 and the sub-stations 20 are logically connected in a wavelength division multiplex (WDM) scheme.

The sub-stations 20*a* and 20*b*, the SW 70, and the APs 91*a* to 91*e* are similar to those of Embodiments 1 to 3 and will not be explained. Here, for example, the main station 10 of Embodiment 2 of FIG. 13 is conceived. Note that the operation of each portion of the main station 10 of FIG. 13 is basically similar to that of Embodiment 2, and therefore, only a difference from Embodiment 2 will be described.

As described above, in the wireless communication system, a different wavelength is allocated for each of the sub-stations 20, and the sub-stations 20 are logically connected in a wavelength division multiplex scheme. More specifically, each main station optical signal transmitting section 102*a* of the main station 10 of FIG. 13 converts an input electrical signal type wireless LAN signal to an optical signal having a wavelength of λa, which is in turn output. Each main station optical signal transmitting section 102*b* of the main station 10 of FIG. 13 converts an input electrical signal type wireless LAN signal to an optical signal having a wavelength of λb, which is in turn output. The WDM coupler 707 combines the optical signal having a wavelength of λa and the optical signal having a wavelength of λb, which are output from the main station, by wavelength multiplexing, and separates an optical signal output from the WDM coupler 710*a* to an optical signal having a wavelength of λa and an optical signal having a wavelength of λb. The WDM coupler 710*a* separates an optical signal having a wavelength of λa from an optical signal input from the main station 10 and outputs the separated signal to the sub-station 20*a*, and combines an optical signal output from the WDM coupler 710*b* with an optical signal having a wavelength of λa output from the sub-station 20*a* by wavelength multiplexing. The WDM coupler 710*b* separates an optical signal having a wavelength of λb from an optical signal input from the WDM coupler 710*a* and outputs the separated signal to the sub-station 20*a*, and also outputs an optical signal output from the sub-station 20*b* to the WDM coupler 710*a*.

Hereinafter, an operation of the thus-constructed wireless communication system of FIG. 37 will be described. Here, an operation of the wireless communication system performed when a signal output from the SW 70 reaches the terminals A and B, will be described. Note that operations of the SW 70, the APs 91*a* to 91*e*, and the transmitted signal processing section 121 are similar to those of Embodiment 2 and will not be explained.

The main station optical signal transmitting section 102*a* converts an electrical signal type wireless LAN signal output from the transmitted signal processing section 121 to an optical signal having a wavelength of λa. The main station optical signal transmitting section 102*b* converts an electrical signal type wireless LAN signal output from the transmitted signal processing section 121 to an optical signal having a wavelength of λb.

Next, the WDM coupler 707 wavelength multiplexes the optical signals having wavelengths of λa and λb, which are output from the main station optical signal transmitting sections 102*a* and 102*b*, and outputs the resultant signal to the WDM coupler 710*a*.

The WDM coupler 710*a* outputs only the optical signal having a wavelength of λa of the received optical signals to the sub-station 20*a*, and outputs the optical signal having a wavelength of λb to the WDM coupler 710*b*. Thereafter, the sub-station 20*a* converts the optical signal having a wavelength of λa to an electrical signal type wireless LAN signal, which is in turn output as a radio wave to the terminal A. Note that the operation of the sub-station 20*a* is similar to that of Embodiment 2 and will not be explained.

The WDM coupler 710*b* extracts the optical signal having a wavelength of λb output from the WDM coupler 710*a*, and outputs the optical signal to the sub-station 20*b*. Thereafter, the sub-station 20*b* performs an operation similar to that of the sub-station 20*a* to transmit a signal to the terminal B. As a result, a signal reaches the terminals A and B.

As described above, when the sub-stations 20 are connected to the main station 10 in a cascade configuration, the total length of optical fiber transmission paths is advantageously shorter than that of the star configuration.

Note that the flow of an upload signal from the terminals A and B is reverse to the above-described signal flow and will not be explained.

Figure 38:
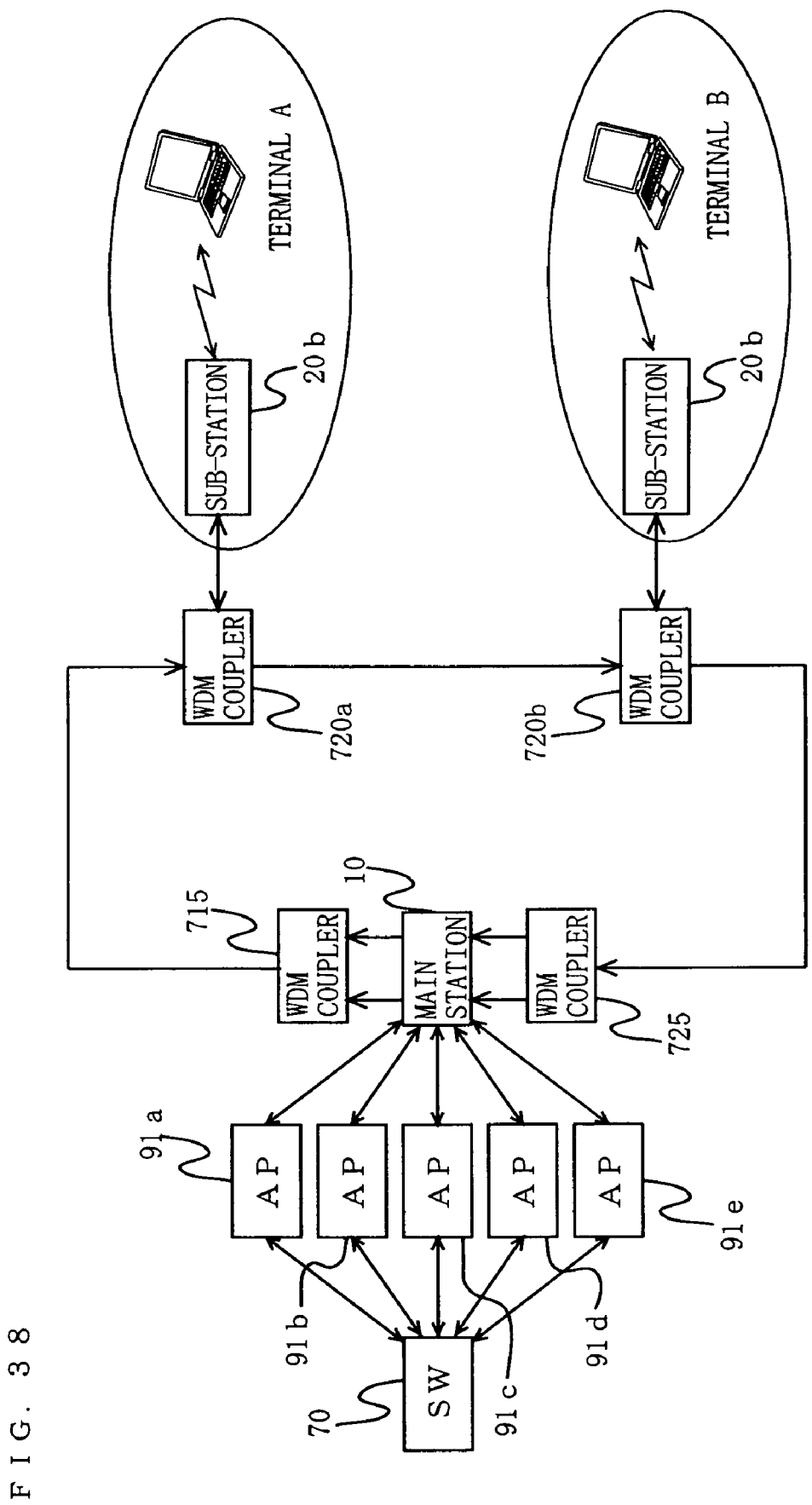
FIG. 38 is a block diagram showing a configuration of a wireless communication system, in which sub-stations 20a and 20b are connected in a loop configuration using WDM couplers 720a and 720b.

Next, a wireless communication system, in which a main station 10 and sub-stations 20 are connected in a loop configuration, will be described with reference to the drawings. FIG. 38 is a block diagram showing a configuration of the wireless communication system in which the main station 10 and the sub-stations 20 are connected in a loop configuration.

The wireless communication system of FIG. 38 comprises the main station 10, the sub-stations 20*a* and 20*b*, a SW 70, the APs 91*a* to 91*e*, a WDM coupler 715, WDM couplers 720*a* and 720*b*, terminals A and B, and a WDM coupler 725. In the wireless communication system, a different wavelength is allocated for each of the sub-stations 20, and the main station 10 and the sub-stations 20 are logically connected in a wavelength division multiplex (WDM) scheme.

The SW 70, the sub-stations 20*a* and 20*b*, and the APs 91*a* to 91*e* are similar to those of Embodiment 1 and will not be explained. Here, for example, the main station 10 of FIG. 13 is conceived. Note that the operation of each portion of the main station 10 of FIG. 13 is basically similar to that of Embodiment 2, and therefore, only a difference from Embodiment 2 will be described.

As described above, in the wireless communication system, a different wavelength is allocated for each of the sub-stations 20, and the sub-stations 20 are logically connected in the wavelength division multiplex scheme. More specifically, each main station optical signal transmitting section 102*a* of the main station 10 of FIG. 13 converts an input electrical signal type wireless LAN signal to an optical signal having a wavelength of λa, which is in turn output. Each main station optical signal transmitting section 102*b* of the main station 10 of FIG. 13 converts an input electrical signal type wireless LAN signal to an optical signal having a wavelength of λb, which is in turn output. The WDM coupler 715 combines the optical signal having a wavelength of λa and the optical signal having a wavelength of λb, which are output from the main station 10, by wavelength multiplexing. The WDM coupler 720a separates an optical signal having a wavelength of λa from an optical signal input from the WDM coupler 715 and outputs the separated signal to the sub-station 20a, and combines an optical signal output from the WDM coupler 715, from which the optical signal having a wavelength of λa is removed, with an optical signal having a wavelength of λa output from the sub-station 20a by wavelength multiplexing. The WDM coupler 720b separates an optical signal having a wavelength of λb from an optical signal input from the WDM coupler 720a, and combines an optical signal obtained by removing an optical signal having a frequency of λa from the optical signal output from the WDM coupler 715 with an optical signal having a frequency of λa output from the sub-station 20a by wavelength multiplexing, and outputs the resultant signal to the WDM coupler 720b. Also, the WDM coupler 720b separates an optical signal having a wavelength of λb from the optical signal input from the WDM coupler 720a and outputs the resultant signals to the sub-station 20a, and also combines an optical signal having a wavelength of λb output from the sub-station 20b with an optical signal obtained by removing an optical signal having a wavelength of λb from the optical signal output from the WDM coupler 720a and outputs the resultant signal to the WDM coupler 725. The WDM coupler 725 separates the optical signal output from the WDM coupler 720b into an optical signal having a wavelength of λa and an optical signal having a wavelength of λb.

An operation of the thus-constructed wireless communication system of FIG. 38 will be described. Here, a signal flow at a loop portion of the wireless communication system will be described. Note that the operations of the terminals A and B, the sub-stations 20a and 20b, the SW 70, the APs 91a to 91e, and the transmitted signal processing section 121 are similar to those of Embodiment 2 and will not be explained.

The main station optical signal transmitting section 102a converts an electrical signal type wireless LAN signal output from the transmitted signal processing section 121 to an optical signal having a wavelength of λa. The main station optical signal transmitting section 102b converts an electrical signal type wireless LAN signal output from the transmitted signal processing section 121 to an optical signal having a wavelength of λb.

Next, the WDM coupler 715 wavelength multiplexes the optical signals having wavelengths of λa and λb output from the main station optical signal transmitting sections 102a and 102b, and outputs the resultant signal to the WDM coupler 710a.

The WDM coupler 720a outputs only an optical signal having a wavelength of λa of the received optical signals to the sub-station 20a, and wavelength multiplexes an optical signal obtained by removing an optical signal having a wavelength of λa from the optical signal output from the WDM coupler 715, with optical signal having a wavelength of λa output from the sub-station 20a, and outputs the resultant signal to the WDM coupler 720b.

The WDM coupler 720b outputs only an optical signal having a wavelength of λb of the received optical signals to the sub-station 20b, and wavelength multiplexes an optical signal obtained by removing an optical signal having a wavelength of λb from the optical signal output from the WDM coupler 715, with optical signal having a wavelength of λb output from the sub-station 20b, and outputs the resultant signal to the WDM coupler 725.

Next, the WDM coupler 725 separates the optical signal output from the WDM coupler 720b into an optical signal having a wavelength of λa and an optical signal having a wavelength of λb, and outputs the resultant signals to the main station optical signal receiving sections 112a and 112b. The subsequent operations of the main station 10 are similar to those of Embodiment 2 and will not be explained.

As described above, when the main station 10 and the sub-stations 20 are connected in the loop configuration as shown in FIG. 38, the total length of the optical fiber transmission paths is advantageously shorter than that of the star configuration. Further, by adding a loop back or a mechanism of transmission in a reverse direction, the reliability can be advantageously improved against the transmission failure of an optical fiber.

The number of the sub-stations 20 is two in each of FIGS. 37 and 38, but is not limited to this. Similarly, the number of the APs 91 is not limited to this.

INDUSTRIAL APPLICABILITY

The wireless communication system of the present invention has the following effect. When a plurality of communication areas are present, the accommodation capacity of an AP can be effectively utilized in each communication area. The wireless communication system is useful as, for example, a system which enables a wireless communication terminal present in a local area to communicate with a network outside the local area.

The invention claimed is:

1. A system for enabling a plurality of wireless communication terminals present in a local area to communicate with a network outside the local area, the system comprising:
   a plurality of sub-stations for forming respective wireless communication areas individually in the local area, and performing wireless communication with the wireless communication terminals in the respective corresponding wireless communication areas;
   a main station connected to each of the plurality of sub-stations via an optical fiber transmission path; and
   a plurality of access points, connected to the main station via a wireless transmission path, for converting signals to be input from an outside of the local area to an inside of the local area to a signal form for use in the local area, and converting signals to be output from the inside of the local area to the outside of the local area to a signal form for use in the outside of the local area,
   wherein the main station comprises:
      a managing section operable to determine one of the plurality of access points to which a first one of the wireless communication terminals is accessible; and
      a selecting section operable to select and output one of the signals to be input from the outside of the local area, whose form is converted in the one of the plurality of access points determined by the managing section, and which is input to the local area, to the first wireless communication terminal via a corresponding one of the sub-stations.

2. The wireless communication system according to claim 1,
   wherein each of the plurality of access points uses a frequency different from one another,
   wherein the selecting section further comprises:
   a plurality of splitting sections corresponding to the respective access points;
   a plurality of switching sections corresponding to the respective sub-stations; and
   a plurality of multiplexing sections corresponding to the respective switching sections,
   wherein each of the splitting sections splits and outputs a signal out of the plurality of signals to be input to the local area whose form has been converted in a corresponding one of the access points, to all of the switching sections, wherein each of the switching sections is switched to determine which of the signals output from the splitting sections is output to the first wireless communication terminal via the corresponding sub-station, and wherein each of the multiplexing sections frequency-multiplexes the signals output from the corresponding switching section to create a multiplexed signal to be input to the local area and outputs the multiplexed signal to the corresponding sub-station.

3. The wireless communication system according to claim 1, further comprising a network switch provided between the access points and the network outside the local area, wherein the network switch is operable to manage a state of connection between each of the access points and the wireless communication terminals present in the local area, to specify the first wireless communication terminal present in the local area with reference to a signal input to the network switch, and based on the connection state, to output the signal input to the network switch to the access point connected to the first wireless communication terminal.

4. The wireless communication system according to claim 3, wherein the first wireless communication terminal present in the local area transmits a signal to be transmitted to a second wireless communication terminal present in the local area, to the sub-station of the communication area to which the first wireless communication terminal belongs, wherein the signal to be transmitted to the second wireless communication terminal is input via the sub-station of the communication area to which the first wireless communication terminal belongs and the main station to the access point connected to the first wireless communication terminal, is converted to a signal for use in the outside of the local area in the access point connected to the first wireless communication terminal, and is output to the network switch, and wherein the network switch specifies the second wireless communication terminal present in the local area with reference to the signal whose form has been converted in the access point connected to the first wireless communication terminal, and based on the connection state, outputs the signal input to the network switch from the access point connected to the first wireless communication terminal to the access point connected to the second wireless communication terminal.

5. The wireless communication system according to claim 1, wherein the sub-stations receive the signals to be output from the inside of the local area to the outside of the local area, the signals being transmitted from the wireless communication terminals, and output the received signals to the main station, wherein the main station outputs the signals received from the sub-stations to the access points, and wherein the access points convert the signals to be output from the inside of the local area to the outside of the local area, the signals being output from the main station, to the signal form for use in the outside of the local area, and output the converted signals to the outside of the local area.

6. The wireless communication system according to claim 5, wherein the main station further comprises:

a plurality of main station signal receiving sections corresponding to the respective sub-stations, for receiving the signals to be output from the inside of the local area to the outside of the local area, the signals being output from the sub-stations; and a main station combining section operable to combine the signals to be output from the inside of the local area to the outside of the local area, the signals being received by the plurality of the main station signal receiving sections, and to output the combined signal to the access points.

7. The wireless communication system according to claim 5, wherein each of the access points further comprises:

an intensity detecting section operable to detect an intensity of a signal transmitted from the main station; and a request section operable to request the main station to switch from a first signal being transmitted to the access point to a different signal when the intensity of the first signal transmitted from the main station, the intensity being detected by the intensity detecting section, is lower than a predetermined value, wherein when the request from the request section is present and the main station receives a second signal having the same contents as the first signal, the main station outputs the second signal to the access point instead of the first signal, and wherein the first signal is transmitted to the main station from a first one of the plurality of sub-stations, and the second signal is transmitted to the main station from a second one of the plurality of sub-stations.

8. The wireless communication system according to claim 5, wherein each of the sub-stations further comprises a crosstalk canceling section operable to create a signal having the same intensity as that of crosstalk occurring in a signal to be output from the inside of the local area to the outside of the local area due to an influence of a signal to be input to the local area, based on the signal to be input to the local area, to invert the signal having the same intensity as that of the crosstalk, and to add the inverted signal to the crosstalk.

9. The wireless communication system according to claim 8, wherein the crosstalk canceling section comprises:

a first coupler section for splitting a portion of the signal to be input to the local area; and a second coupler section for combining the portion of the signal to be input to the local area which has been split by the first coupler section, with the signal to be output from the inside of the local area to the outside of the local area, wherein the first coupler section changes a phase of a signal to be output to the second coupler section by 90° when splitting the signal to be input to the local area, and wherein the second coupler section changes a phase of the signal to be input to the local area which has been output from the first coupler section, by 90°, when combining the two signals.

10. The wireless communication system according to claim 5, wherein each of the sub-stations includes a signal transmitting/receiving system for outputting the signals to be output from the inside of the local area to the outside of the local area, the signals being output from the wireless communication terminals, to the main station, and a signal transmitting/receiving system for transmitting the signals to be input to the local area, the signals being output from the main station, to the wireless communication terminals, wherein each of the signal transmitting/receiving systems are accommodated in separate housings.

11. The wireless communication system according to claim 1,
wherein the main station is connected to each of the plurality of sub-stations via a respective optical transmission line,
wherein the main station further comprises an optical signal conversion section operable to convert the signal selected by the selecting section to an optical signal, and
wherein each of the sub-stations converts the optical signal output from the main station to an electrical signal in a form for use in the local area, and transmits the electrical signal in the form of a wireless radio wave in the corresponding wireless communication areas.

12. The wireless communication system according to claim 11,
wherein each of the sub-stations further comprises a sub-station frequency-converting section operable to convert a frequency of the converted electrical signal in the form for use in the local area from an intermediate frequency to a frequency which is used when the one of the plurality of access points has output the electrical signal,
wherein the signal frequency-converted by the sub-station frequency-converting section is transmitted in the form of a wireless radio wave to the first wireless communication terminal in the corresponding wireless communication area,
wherein the main station further comprises a main station frequency-converting section operable to convert a frequency of the signal to be input to the local area, a form of the signal having been converted by the one of the access points, to the intermediate frequency, and
wherein the selecting section selects the signal to be input to the local area whose form has been converted by the one of the access points and which has been frequency-converted by the main station frequency-converting section.

13. The wireless communication system according to claim 11,
wherein the access points output the converted signals to be input to the local area as signals having a first intermediate frequency to the main station,
wherein the main station further comprises a main station frequency-converting section operable to convert a frequency of the signals to be input to the local area, the signals being output from the access points, to a second intermediate frequency, and
wherein the selecting section selects the signals to be input to the local area which have been converted by the access points and which have been frequency-converted by the main station frequency-converting section.

14. The wireless communication system according to claim 11, wherein the optical transmission lines connecting the respective sub-stations and the main station have lengths substantially equal to one another.

15. The wireless communication system according to claim 1,
wherein the main station is connected to each of the plurality of sub-stations via a respective optical transmission line,
wherein the main station further comprises an optical signal conversion section operable to convert the signals to be input to the local area, a form of the signals having been converted by the access points, to optical signals, and
wherein the selecting section selects and outputs the optical signals converted by the optical signal conversion section to the corresponding sub-stations.

16. The wireless communication system according to claim 1,
wherein the main station further comprises a plurality of signal receiving sections corresponding to the respective sub-stations, for receiving all signals which are output from the respective access points,
wherein the selecting section comprises:
a plurality of splitting sections corresponding to the respective sub-stations; and
a plurality of selecting/outputting sections provided between the respective sub-stations and the respective splitting sections,
wherein the splitting sections split all of the signals to be input to the local area which have been output from the respective access points and have been received by the respective signal receiving sections, into signals to be input to the local area for the respective access points, and
wherein the selecting/outputting sections output the signals to be input to the local area which are to be output to the corresponding sub-stations, among the signals to be input to the local area which have been split by the corresponding splitting sections, to the wireless communication terminals via the corresponding sub-stations.

17. The wireless communication system according to claim 1,
wherein the selecting section comprises:
a plurality of signal receiving sections corresponding to the respective sub-stations; and
a plurality of selecting/outputting sections provided between the respective sub-stations and the respective signal receiving sections,
wherein each of the signal receiving sections receives only the signal to be input to the local area which is to be transmitted to the corresponding sub-station, among the signals to be input to the local area which have been output from the respective access points, and
wherein the selecting/outputting sections transmit the signals to be input to the local area which have been received by the respective signal receiving sections, to the respective corresponding sub-station.

18. The wireless communication system according to claim 1,
wherein each of the wireless communication terminals present in the local area comprises a communication start request section operable to request for staffing communication via a corresponding one of the access points to the sub-station in the communication area to which the respective wireless communication terminals belong,
wherein the communication start requests reach the main station via the corresponding sub-stations, and
wherein the main station comprises:
a communication request signal receiving section operable to receive the communication start requests transmitted from the communication staff request sections; and
a communication starting section operable to start communication via the access points corresponding to the sub-stations based on the communication start requests received by the communication request signal receiving sections.

19. The wireless communication system according to claim 1,
wherein the selecting section does not select or output the signal output by the one of the plurality of access points to the corresponding one of the sub-stations when the sub-station has not transmitted a signal to the one of the plurality of access points for a predetermined period of time or more.

20. A system for enabling a plurality of wireless communication terminals present in a local area to communicate with a network outside the local area, the system comprising:
   a plurality of sub-stations for forming respective wireless communication areas individually in the local area, and performing wireless communication with the wireless communication terminals in the respective corresponding wireless communication areas;
   a main station connected to each of the plurality of the sub-stations via an optical fiber transmission path; and
   a plurality of access points, connected to the main station via a wireless transmission path, for converting signals to be input from an outside of the local area to an inside of the local area to a signal form for use in the local area, and converting signals to be output from the inside of the local area to the outside of the local area to a signal form for use in the outside of the local area,
   wherein the main station comprises:
      a multiplexing section operable to frequency-multiplex the signals converted by the plurality of access points to be input to the local area, and
      a selecting section operable to select and output the signals to be input to the local area, which have been multiplexed by the multiplexing section, to all of the sub-stations.

* * * * *

UNITED STATES PATENT AND TRADEMARK OFFICE
CERTIFICATE OF CORRECTION

PATENT NO.      : 7,650,112 B2
APPLICATION NO. : 10/530651
DATED           : January 19, 2010
INVENTOR(S)     : Kuniaki Utsumi et al.

It is certified that error appears in the above-identified patent and that said Letters Patent is hereby corrected as shown below:

On the Title Page

In Item (56) References Cited, under the "OTHER PUBLICATIONS" heading, please insert the following reference:

--"Nikkei Communications", Nikkei Business Publications, Inc., issued on September 2, 2002, pp 87-91.--.

In the Claims

In column 74, claim 18, line 46, "staffing" should read --starting--.
In column 74, claim 18, line 56, "staff" should read --start--.

Signed and Sealed this

Fifteenth Day of June, 2010

David J. Kappos
*Director of the United States Patent and Trademark Office*